(12) United States Patent
Murakami

(10) Patent No.: US 9,628,222 B2
(45) Date of Patent: *Apr. 18, 2017

(54) TRANSMISSION METHOD USING PARITY PACKETS, TRANSMITTER AND REPEATER

(71) Applicant: Panasonic Intellectual Property Corporation of America, Torrance, CA (US)

(72) Inventor: Yutaka Murakami, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/046,939

(22) Filed: Feb. 18, 2016

(65) Prior Publication Data

US 2016/0164640 A1 Jun. 9, 2016

Related U.S. Application Data

(60) Continuation of application No. 14/079,988, filed on Nov. 14, 2013, now Pat. No. 9,300,437, which is a
(Continued)

(30) Foreign Application Priority Data

Oct. 28, 2009 (JP) ................................. 2009-248021
Feb. 22, 2010 (JP) ................................. 2010-035763

(51) Int. Cl.
*G08C 25/02* (2006.01)
*H04L 1/18* (2006.01)
(Continued)

(52) U.S. Cl.
CPC ................ *H04L 1/08* (2013.01); *G06F 11/10* (2013.01); *H04L 1/0041* (2013.01);
(Continued)

(58) Field of Classification Search
CPC ....... H04L 1/08; H04L 1/0061; H04L 1/0068; H04L 1/0041; G06F 11/10
See application file for complete search history.

(56) References Cited

U.S. PATENT DOCUMENTS

| 5,719,883 A | 2/1998 | Ayanoglu |
| 2003/0014709 A1 | 1/2003 | Miyoshi et al. |
| (Continued) | | |

FOREIGN PATENT DOCUMENTS

| JP | 09-200188 | 7/1997 |
| JP | 2004-236095 | 8/2004 |
| (Continued) | | |

OTHER PUBLICATIONS

J. Hagenauer, "Rate-compatible punctured convolutional codes(RCPC codes) and their applications", IEEE Transaction on Communications, vol. 36, No. 4, Apr. 1988.
(Continued)

*Primary Examiner* — Shelly A Case
(74) *Attorney, Agent, or Firm* — Wenderoth, Lind & Ponack, L.L.P.

(57) ABSTRACT

Provided is a transmission method executed by a transmitting apparatus to transmit a content to a plurality of terminals. The content having transmission count information indicating a number of times the content is to be transmitted by the transmitting apparatus. The transmission method including a first transmission step of generating and transmitting a first transmission signal which transfers at least a first portion of a plurality of data packets including a plurality of content packets, storing data of the content therein, and a plurality of parity packets, generated from the content packets, and a second transmission step of, when the transmission count information of the content indicates a plurality of times, generating a second transmission signal including at least a second portion of the plurality of data packets, and transmitting the second transmission signal
(Continued)

during a period which differs from a period during which the first transmission signal is transmitted.

4 Claims, 59 Drawing Sheets

Related U.S. Application Data division of application No. 12/913,031, filed on Oct. 27, 2010, now Pat. No. 8,612,816.

(51) Int. Cl.
  *H04L 1/08* (2006.01)
  *H04L 1/00* (2006.01)
  *G06F 11/10* (2006.01)
  *H04L 1/16* (2006.01)

(52) U.S. Cl.
  CPC .......... *H04L 1/0061* (2013.01); *H04L 1/0068* (2013.01); *H04L 1/1607* (2013.01); *H04L 1/1819* (2013.01); *H04L 1/1825* (2013.01); *H04L 1/1845* (2013.01); *H04L 1/1887* (2013.01); *H04L 1/0071* (2013.01); *H04L 2001/0093* (2013.01); *H04L 2001/0097* (2013.01)

(56) References Cited

U.S. PATENT DOCUMENTS

| | | |
|---|---|---|
| 2005/0053168 A1 | 3/2005 | Song et al. |
| 2006/0190801 A1 | 8/2006 | Shin et al. |
| 2007/0133566 A1 | 6/2007 | Copps |
| 2008/0187136 A1 | 8/2008 | Zhang et al. |
| 2009/0219851 A1 | 9/2009 | Abraham et al. |
| 2009/0327845 A1 | 12/2009 | Currivan et al. |
| 2010/0077276 A1 | 3/2010 | Okamura et al. |
| 2010/0214970 A1 | 8/2010 | Brunner et al. |
| 2010/0218066 A1 | 8/2010 | Okamura et al. |

FOREIGN PATENT DOCUMENTS

| | | |
|---|---|---|
| JP | 2007-510363 | 4/2007 |
| JP | 2009-055603 | 3/2009 |
| WO | 2005/046125 | 5/2005 |

OTHER PUBLICATIONS

D. Chase, Code combining-A-maximum-likelihood decoding approach for combining an arbitrary number of noisy packet<, IEEE Transaction on Communications, vol. 33, No. 5, May 1985.

Argyriou, Antonios, "Cross-Layer Error Control for Multimedia Streaming in Wireless/Wireline Packet Networks", 2008, IEEE.

Polyzos et al., "Enhancing Wireless Internet Links for Multimedia Services", 1998, Proceedings of the MOMUC, pp. 379-384.

Tan et al., "Application Layer Hybrid Error Correction with Reed-Solomon Code for DVB Services over Wireless LANs", 2007, IEEE.

Seiki Shibata et al., "Data service over IP network and its applications", Multimedia, Distributed, Cooperative, and Mobile Symposium, Jul. 2002, pp. 515-527, with partial English translation.

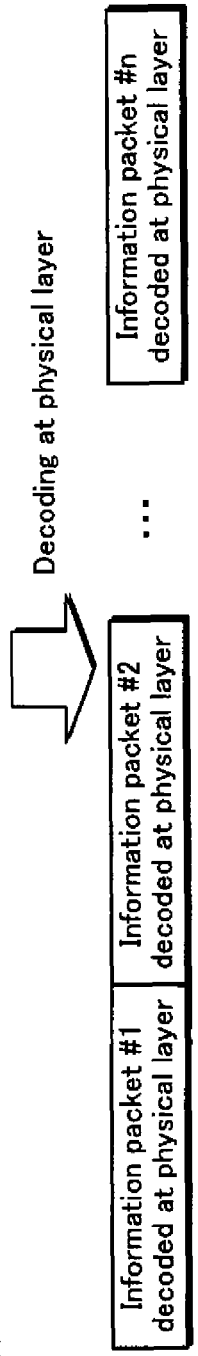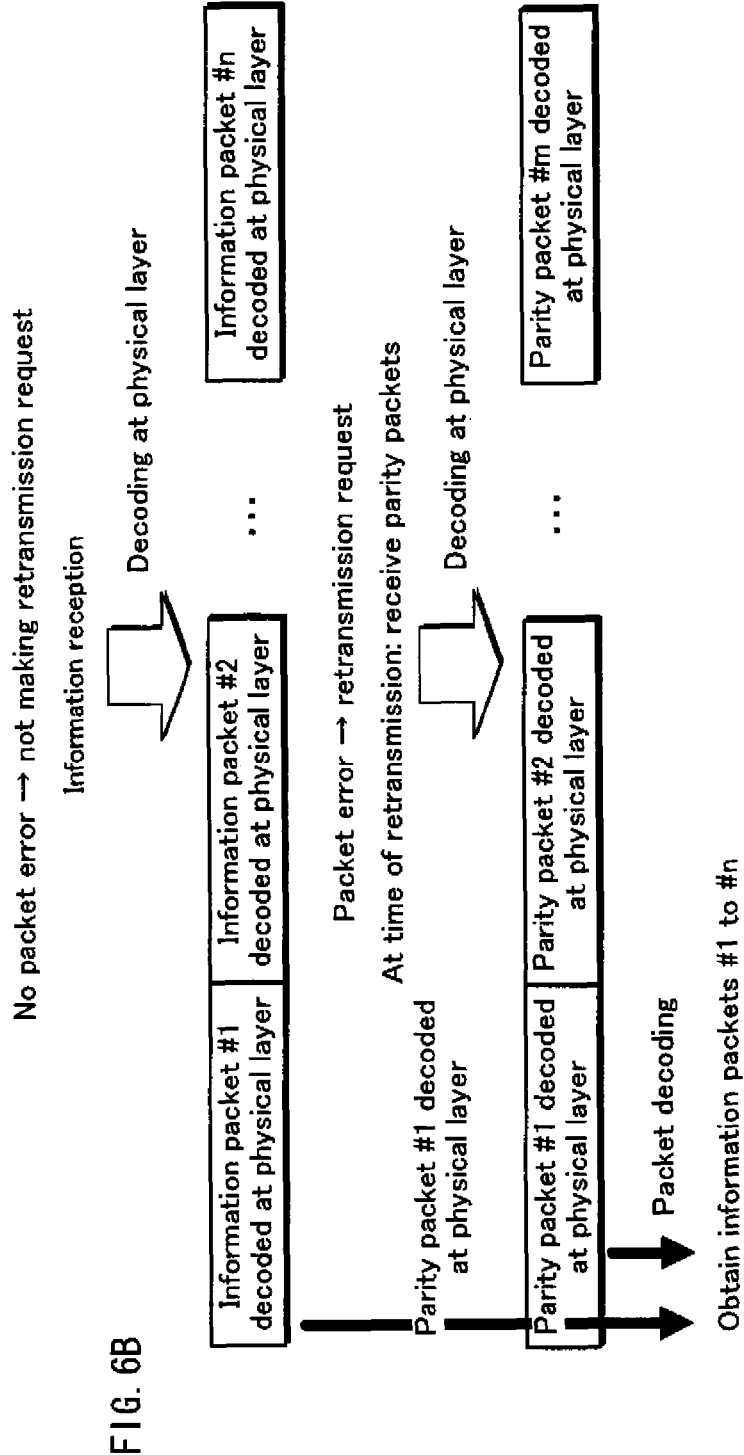
FIG. 6A
FIG. 6B

FIG. 14

| | Decoded information packet #1 | Decoded information packet #2 | Decoded information packet #3 | Decoded information packet #4 | Decoded information packet #5 | Decoded information packet #6 | Decoded information packet #7 |
|---|---|---|---|---|---|---|---|
| Receiver 33A | O | × | O | O | × | O | × |
| Receiver 33B | × | × | O | O | O | O | O |
| Receiver 33C | O | O | × | × | O | × | O |

O : Packet that is not missing
× : Missing packet (Example of Hybrid ARQ)

FIG. 26

| | Decoded information packet #1 | Decoded information packet #2 | Decoded information packet #3 | Decoded information packet #4 | Decoded information packet #5 | Decoded information packet #6 | Decoded information packet #7 |
|---|---|---|---|---|---|---|---|
| Receiver A | ○ | × | ○ | ○ | × | ○ | × |
| Receiver B | × | × | ○ | ○ | × | ○ | ○ |
| Receiver C | ○ | ○ | × | × | ○ | × | ○ |
| Receiver D | × | × | ○ | × | × | ○ | × |

○ : Packet that is not missing
× : Missing packet

Prior Art
FIG. 27

Coding rate of 1/2:

X1  P1  X2  P2  X3  P3  X4  P4  X5  P5  X6  P6  X7  P7  X8  P8  ......

Initial transmission (coding rate of 2/3):

X1  P1  X2  ~~P2~~  ~~X3~~  P3  X4  P4  X5  P5  X6  ~~P6~~  ~~X7~~  P7  X8  P8  ......

Retransmission :

P2  X3                           P6  X7

FIG. 40A Packets to be transmitted from base station to repeater

FIG. 40B Packets that are missing before decoding at packet level in repeater

FIG. 40C Packets to be initially transmitted by repeater

FIG. 40D Packets to be retransmitted by repeater (packets restored by decoding at packet level)

FIG. 41A Packets to be transmitted from base station to repeater

| Information packet #1 coded at physical layer after CRC insertion | Information packet #2 coded at physical layer after CRC insertion | ... | Information packet #99 coded at physical layer after CRC insertion | Information packet #100 coded at physical layer after CRC insertion | Parity packet #1 coded at physical layer after CRC insertion | Parity packet #2 coded at physical layer after CRC insertion | ... | Parity packet #24 coded at physical layer after CRC insertion | Parity packet #25 coded at physical layer after CRC insertion |

FIG. 41B Packets that are missing before decoding at packet level in repeater

4101

| Information packet #1 | Information packet #6 | Information packet #21 | Information packet #29 | Information packet #34 | Information packet #68 | Information packet #79 | Information packet #90 |
| Parity packet #4 | Parity packet #24 | | | | | | |

FIG. 41C Packets to be initially transmitted by repeater 110 packets other than packets of 4101:

| Information packet #2 | ... | Information packet #5 | Information packet #9 | Information packet #21 | ... | Information packet #89 | Information packet #91 | ... | Information packet #100 | Parity packet #1 | Parity packet #2 | Parity packet #3 | ... | Parity packet #19 |

FIG. 41D Packets to be retransmitted by repeater (packets restored by decoding at packet level)

15 packets other than initially transmitted packets:

| Information packet #1 | Information packet #6 | Information packet #21 | Information packet #29 | Information packet #34 | Information packet #68 | Information packet #79 | Information packet #90 |
| Parity packet #4 | Parity packet #20 | Parity packet #21 | Parity packet #22 | Parity packet #23 | Parity packet #24 | Parity packet #25 | |

FIG. 47A Packets to be transmitted from base station to repeater

| Packet #1 coded at physical layer after CRC insertion | Packet #2 coded at physical layer after CRC insertion | ... | Packet #99 coded at physical layer after CRC insertion | Packet #100 coded at physical layer after CRC insertion | Packet #101 coded at physical layer after CRC insertion | Packet #102 coded at physical layer after CRC insertion | ... | Packet #124 coded at physical layer after CRC insertion | Packet #125 coded at physical layer after CRC insertion |

FIG. 47B Packets that are missing before decoding at packet level in repeater

Packet #1, #5, #6, #8, #21, #29, #33, #34, #45, #47, #53, #57, #68, #79, #83, #90
Packet #104, #108, #109, #124

FIG. 47C Packets to be initially transmitted by repeater
Packets other than packets of 4701:

Packet #2, #3, #4, #7, #9, ..., #89, #91, #100, #101, #102, #103, #105, ..., #123, #125

FIG. 47D Packets to be retransmitted by repeater (packets restored by decoding at packet level)

Packet #1, #5, #6, #8, #21, #29, #33, #34, #45, #47, #53, #57, #68, #79, #83, #90
Packet #104, #108, #109, #124

FIG. 48A Packets to be transmitted from base station to repeater

| Packet #1 coded at physical layer after CRC insertion | Packet #2 coded at physical layer after CRC insertion | ... | Packet #99 coded at physical layer after CRC insertion | Packet #100 coded at physical layer after CRC insertion | Packet #101 coded at physical layer after CRC insertion | Packet #102 coded at physical layer after CRC insertion | ... | Packet #124 coded at physical layer after CRC insertion | Packet #125 coded at physical layer after CRC insertion |

FIG. 48B Packets that are missing before decoding at packet level in repeater

| Packet #1 | Packet #6 | Packet #21 | Packet #29 | Packet #34 | Packet #68 | Packet #79 | Packet #90 |
| Packet #104 | Packet #124 |

(4801 — dashed box around Packet #104 and Packet #124)

FIG. 48C Packets to be initially transmitted by repeater 110 packets other than packets of 4801:

| Packet #2 | ... | Packet #5 | Packet #9 | ... | Packet #89 | Packet #91 | ... | Packet #100 | Packet #101 | Packet #102 | Packet #103 | ... | Packet #105 | ... | Packet #119 |

FIG. 48D Packets to be retransmitted by repeater (packets restored by decoding at packet level)

15 packets other than initially transmitted packets:

| Packet #1 | Packet #6 | Packet #21 | Packet #29 | Packet #34 | Packet #68 | Packet #79 | Packet #90 |
| Packet #104 | Packet #120 | Packet #121 | Packet #122 | Packet #123 | Packet #124 | Packet #125 |

FIG. 49A

| Information regarding type of data | Information regarding need for real-time processing | Relay number information | Information regarding relay/ transmission interval | Packet #1 coded at physical layer after CRC insertion | Packet #2 coded at physical layer after CRC insertion | ... | Packet #n coded at physical layer after CRC insertion |
|---|---|---|---|---|---|---|---|
| 4901 | 4902 | 4903 | 4904 | | | | |

FIG. 49B

| Indication of relay method in repeater | Packet #1 coded at physical layer after CRC insertion | Packet #2 coded at physical layer after CRC insertion | Packet #n coded at physical layer after CRC insertion | ... | Packet #n coded at physical layer after CRC insertion |
|---|---|---|---|---|---|
| 4905 | | | | | |

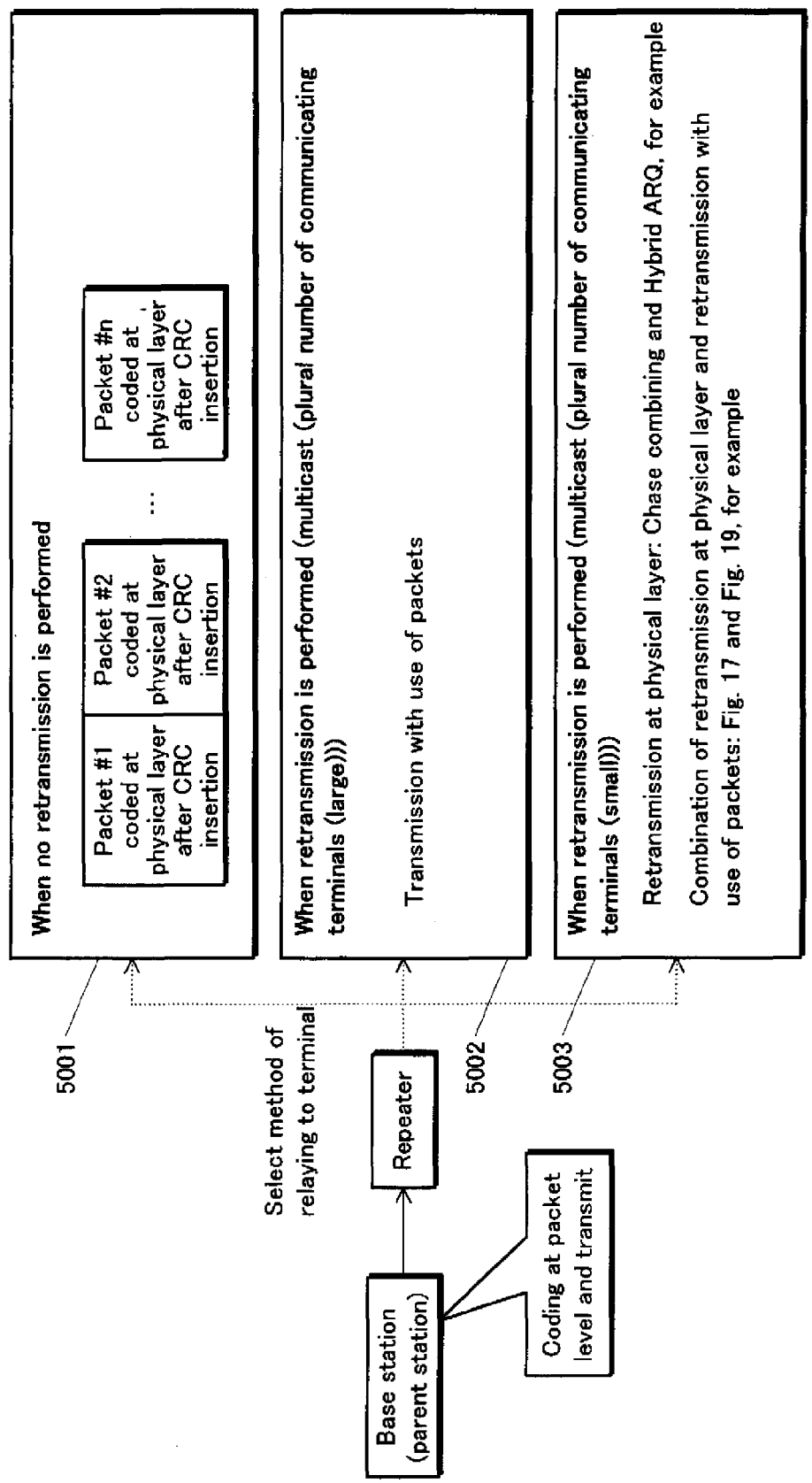

TRANSMISSION METHOD USING PARITY PACKETS, TRANSMITTER AND REPEATER

The present application is a Continuation of application Ser. No. 14/079,988, filed Nov. 14, 2013. The entire disclosure of the above-identified application, including the specification, drawings and claims are incorporated herein by reference in its entirety.

TECHNICAL FIELD

The disclosure of Japanese Patent Application No. 2009-248021 filed on Oct. 28, 2009 including specification, drawings claims and abstract, and the disclosure of Japanese Patent Application No. 2010-35763 filed on Feb. 22, 2010 including specification, drawings claims and abstract are incorporated herein by reference in their entirety.

The present invention relates to a transmission method using parity packets, a transmitter and a repeater. For example, each of the transmission method, the transmitter and the repeater realizes improvement in reception quality at a time of retransmission by performing coding with use of LDPC Codes (Low Density Parity Check Codes) to generate the parity packets, and using the parity packets as data to be transmitted (retransmission data).

BACKGROUND ART

One of methods used by a transmitter to reliably transmit information to a receiver is a method of performing retransmission at a physical layer. The method of performing retransmission at the physical layer is technology that, even when the receiver cannot obtain information that has been transmitted, reliably provides the information to the receiver by transmitting some data that is based on the information again. When the number of retransmissions increases, data transmission efficiency decreases. Therefore, it is important to realize a retransmission method that can transmit information to the receiver while keeping the number of retransmissions small. Note that the following describes general retransmission. When the receiver cannot properly decode some information (or packets) received from the transmitter, the transmitter transmits data corresponding to the information (or packets) again in response to a retransmission request made by the receiver. However, the transmitter may transmit, to the receiver, data that is different from the initially transmitted information (or packets), in response to the retransmission request as long as the transmitted information (or packets) can be restored with use of the data. In the present Description, the retransmission includes a case where the transmitter transmits, in response to the retransmission request, data that is different data from information (or packets) initially transmitted to the receiver and is data with which the initially transmitted information (or packets) can be restored.

FIG. 27 shows an exemplary retransmission method recited in Non Patent Literature 1. In FIG. 27, each Xi indicates information at a time point i, and each Pi indicates a parity at the time point i. When a coding rate is ½, a transmit sequence is composed of the information pieces Xi and the parities Pi. When the coding rate is ⅔, the transmit sequence is composed of bits excluding P2, X3, P6, X7, . . . , P2k+4, X3k+4, . . . (puncture), for example.

The transmitter initially transmits, to the receiver, the transmit sequence that is composed according to a method using the puncture at the coding rate of ⅔. Then, upon receiving a request from the receiver for retransmission, the transmitter transmits, to the receiver, bits that have not been initially transmitted (i.e. P2, X3, P6, X7, . . . , P2k+4, X3k+4, . . . ).

The receiver performs decoding at the coding rate of ½, with use of a received log likelihood ratio of the initially transmitted bits and a reception likelihood ratio of the retransmitted bits. In this case, the coding rate is lower at the time of the decoding for the retransmission than at the time of the initial decoding. Therefore, a packet error is less likely to occur at the time of retransmission.

PRIOR ART REFERENCES

Non Patent Literature

Non Patent Literature 1: J. Hagenauer, "Rate-compatible punctured convolutional codes (RCPC codes) and their applications", IEEE Transaction on Communications, vol. 36, No. 4, April 1988

Non Patent Literature 2: D. Chase, "Code combining-A maximum-likelihood decoding approach for combining an arbitrary number of noisy packet", IEEE Transaction on Communications, vol. 33, No. 5, May 1985.

SUMMARY OF INVENTION

Technical Problem

However, according to the coding rate for the puncture, the number of codes having high error correcting ability is limited. Therefore, it is difficult to realize flexible design. Also, the above-mentioned retransmission method of Non Patent Literature 1 can be adopted in a unicast communication mode. However, it is effective, in many cases, to adopt another retransmission method that is different from the above-mentioned retransmission method in order to reliably reduce the possibility of packet error occurrence when a plurality of receivers make retransmission requests in a multicast communication mode.

In the method of performing retransmission at the physical layer, it is difficult to set flexible retransmission data. In the multicast communication mode, in particular, it is desirable to adopt a retransmission method that can reliably reduce a packet error rate by more flexibly setting retransmission data in accordance with the number of receivers that have made the retransmission requests.

Also, few suggestions are made for realizing a multicast relay method with use of a repeater when packets for the multicast (broadcast and MBMS (Multimedia Broadcast and Multicast Service)) are transmitted to terminals through the repeater. Therefore, a multicast retransmission method is desired that is used in the repeater and has fine data transfer efficiency.

In view of the above-described problems, the present invention has an aim to provide a transmitter and a transmission method using parity packets. Here, the transmission method and the transmitter make it possible to generate flexible retransmission data by generating the retransmission data in units of packets, and effectively reduce the packet error rate by the retransmission. The present invention also has an aim to provide a multicast retransmission method that has fine data transfer efficiency and is used in a repeater and a repeater for the multicast retransmission.

Solution to Problems

In order to achieve the above aim, a transmission method of the present invention is a transmission method of performing transmission with use of parity packets, the transmission method comprising: a first error detection code insertion step of inserting, at a certain layer, error detection codes into information packets on a one-to-one basis to obtain first information packets, the certain layer being a layer at which signal processing is performed earlier than at a first layer; a parity packet generation step of generating, at the certain layer, parity packets by coding the information packets; a second error detection code insertion step of inserting, at the certain layer, error detection codes into the parity packets on a one-to-one basis to obtain first parity packets; a first layer coding step of coding, at the first layer, the first information packets and the first parity packets to obtain second information packets and second parity packets, respectively, a transmission step of initially transmitting the second information packets; and a parity packet transmission step of transmitting the second parity packets to each of one or more receivers with reference to feedback information obtained from the receiver.

Advantageous Effects of Invention

According to the above-described transmission method using the parity packets, the parity packets are generated with use of the information packets at the layer at which signal processing is performed earlier than at the first layer, and the parity packets are retransmitted. Thus, flexible retransmission data can be generated. The packet error rate can be effectively reduced by retransmitting the parity packets.

In order to achieve the above aim, a repeater of the present invention receives a first packet group, and transmits the first packet group to a terminal device, the first packet group including a plurality of information packets and parity packets, the parity packets being generated by coding the information packets at a packet level, the repeater comprising: a first reception unit operable to receive the first packet group; a first transmission unit operable to transmit, to the terminal device, some packets of the received first packet group as a second packet group; a second reception unit operable to receive feedback information from the terminal device that has received the second packet group; and a second transmission unit operable, when the second reception unit receives the feedback information from the terminal device, to transmit, to the terminal device, one or more packets of the first packet group other than the packets included in the second packet group, as a third packet group.

Also, a communication method of the present invention is used in a repeater that receives a first packet group, and transmits the first packet group to a terminal device, the first packet group including a plurality of information packets and parity packets, the parity packets being generated by coding the information packets at a packet level, the communication method comprising: a first reception step of receiving the first packet group; a first transmission step of transmitting, to the terminal device, some packets of the received first packet group as a second packet group; a second reception step of receiving feedback information from the terminal device that has received the second packet group; and a second transmission step of, when the feedback information is received from the terminal device in the second reception step, transmitting, to the terminal device, one or more packets of the first packet group other than the packets included in the second packet group, as a third packet group.

According to the above-described repeater that uses the parity packets, the parity packets are generated with use of the information packets at the layer at which signal processing is performed earlier than at the first layer, and the parity packets are retransmitted. Thus, flexible retransmission data can be generated, and the packet error rate can be effectively reduced by retransmitting the parity packets. Also, it is possible to provide a multicast retransmission method that has fine data transfer efficiency and is used in the repeater.

BRIEF DESCRIPTION OF DRAWINGS

FIG. 6A shows an example of reception operations of the receiver in FIG. 4, and FIG. 6B shows another example of the reception operations of the receiver in FIG. 4;

FIG. 14 shows a concrete example of how the transmission method determination unit shown in FIG. 11 determines the number of parity packets to be retransmitted;

FIG. 26 shows an example of retransmission in the multicast communication mode;

FIG. 27 shows an example of conventional retransmission methods;

FIGS. 40A, 40B, 40C and 40D show an example of a structure of packets to be transmitted by a base station, repeaters and terminals in a twelfth embodiment;

FIGS. 41A, 41B, 41C and 41D show another example (part II) of a structure of packets to be transmitted by the base station, the repeaters and the terminals in the twelfth embodiment;

FIGS. 47A, 47B, 47C and 47D show another example (part III) of a structure of packets to be transmitted by the base station, the repeater and the terminal of the twelfth embodiment;

FIGS. 48A, 48B, 48C and 48D show another example (part IV) of a structure of packets to be transmitted by the base station, the repeater and the terminal of the twelfth embodiment;

FIGS. 49A and 49B show an example of a frame structure of a signal transmitted by a base station of a thirteenth embodiment;

FIG. 50 is a conceptual diagram showing switching between transmission methods in the repeater;

DESCRIPTION OF EMBODIMENTS

Figure 1:
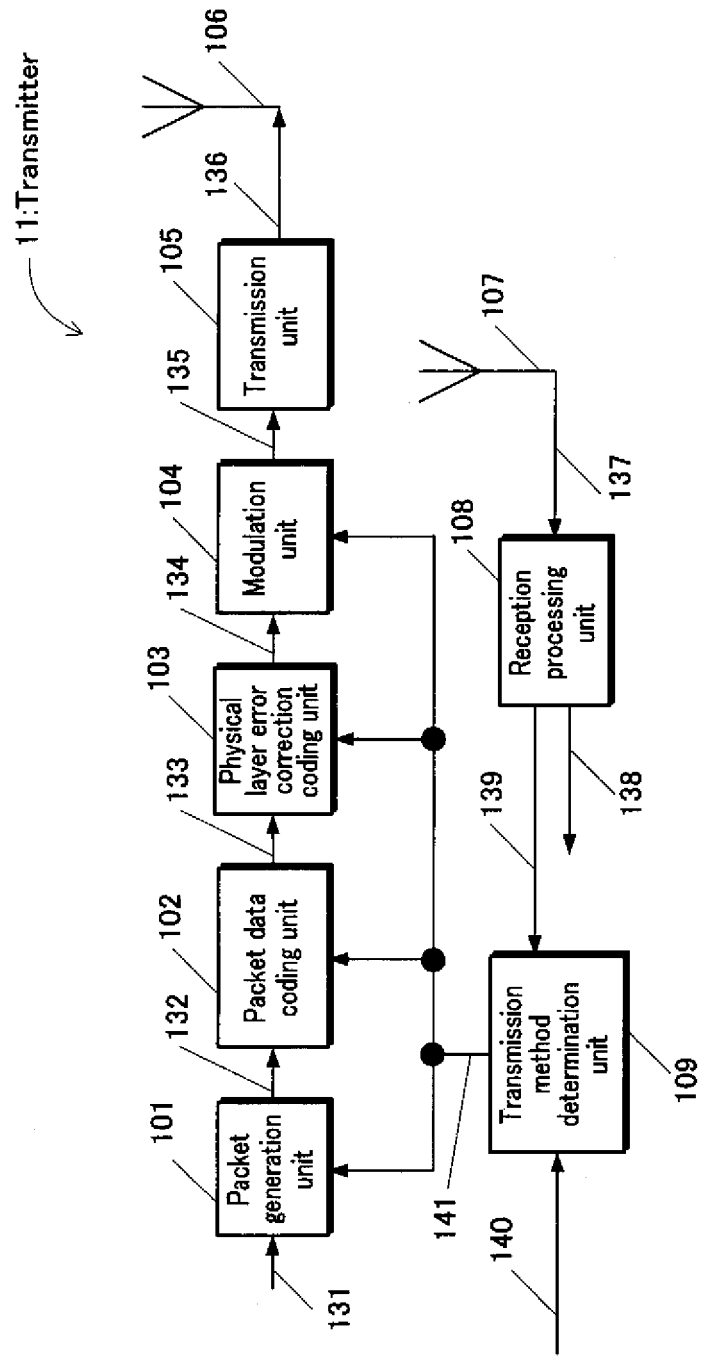
FIG. 1 is a structural diagram of a communication apparatus on a transmitting side (transmitter) in a first embodiment.

One aspect of the present invention is a first transmission method of performing transmission with use of parity packets, the transmission method comprising: a first error detection code insertion step of inserting, at a certain layer, error detection codes into information packets on a one-to-one basis to obtain first information packets, the certain layer being a layer at which signal processing is performed earlier than at a first layer; a parity packet generation step of generating, at the certain layer, parity packets by coding the information packets; a second error detection code insertion step of inserting, at the certain layer, error detection codes into the parity packets on a one-to-one basis to obtain first parity packets; a first layer coding step of coding, at the first layer, the first information packets and the first parity packets to obtain second information packets and second parity packets, respectively, a transmission step of initially transmitting the second information packets; and a parity packet transmission step of transmitting the second parity packets to each of one or more receivers with reference to feedback information obtained from the receiver One aspect of the present invention is a first transmitter that comprises a first error detection code insertion unit operable to insert, at a certain layer, error detection codes into information packets on a one-to-one basis to obtain first information packets, the certain layer being a layer at which signal processing is performed earlier than at a first layer; a parity packet generation unit operable to generate, at the certain layer, parity packets by coding the information packets; a second error detection code insertion unit operable to insert, at the certain layer, error detection codes into the parity packets on a one-to-one basis to obtain first parity packets; a first layer coding unit operable to code, at the first layer, the first information packets and the first parity packets to obtain second information packets and second parity packets, respectively, a transmission unit operable to initially transmit the second information packets; and a parity packet transmission unit operable to transmit the second parity packets to each of one or more receivers with reference to feedback information obtained from the receiver.

According to the above, the parity packets are generated with use of the information packets at the layer at which signal processing is performed earlier than at the first layer, and the parity packets are retransmitted. Thus, flexible retransmission data can be generated. The packet error rate can be effectively reduced by retransmitting the parity packets.

One aspect of the present invention which is a second transmission method that performs transmission with use of parity packets according to the first transmission method further comprises a determination step of determining, based on numbers of erroneous information packets in the one or more receivers, a coding rate of codes that are to be used for coding the information packets in the parity packet generation step, wherein in the parity packet generation step, the information packets are coded with use of the determined coding rate According to the above, the coding rate of codes in the parity packet generation step can be changed based on the number of erroneous information packets in each of one or more receivers. Therefore, it is possible to reduce the amount of retransmission data. Thus, it is possible to realize both the improvement of the data transmission efficiency and the reduction of the packet error rate at the time of retransmission.

One aspect of the present invention which is a third transmission method that performs transmission with use of parity packets according to the first transmission method further comprises a first layer retransmission step of performing, at the first layer, retransmission based on erroneous information packets in each of the one or more receivers, with reference to the feedback information obtained from the receiver.

One aspect of the present invention which is a second transmitter according to the first transmitter further comprises a first layer retransmission unit operable to perform, at the first layer, retransmission based on erroneous information packets in each of the one or more receivers, with reference to the feedback information obtained from the receiver.

According to the above, the retransmission of the parity packets is performed in the first layer. Therefore, the number of retransmissions can be reduced.

One aspect of the present invention which is a fourth transmission method that performs transmission with use of parity packets according to the third transmission method further comprises a selection step of selecting, as a retransmission method, with reference to the feedback information obtained from each of the one or more receivers, one of (i) the transmission method of claim 1, (ii) a first layer retransmission method of performing, at the first layer, retransmission based on erroneous information packets in the receiver, and (iii) a combination of the transmission method of claim 1 and the first layer retransmission method.

One aspect of the present invention which is a third transmitter according to the first transmitter further comprises a selection unit operable to select, as a retransmission method, with reference to the feedback information obtained from each of the one or more receivers, one of (i) the transmission method of claim 1, (ii) a first layer retransmission method of performing, at the first layer, retransmission based on erroneous information packets in the receiver, and (iii) a combination of the transmission method of claim 1 and the first layer retransmission method.

According to the above, it is possible to realize improvement of the data reception quality and improvement of the data transfer efficiency.

According to one aspect of the present invention which is a fifth transmission method that performs transmission with use of parity packets according to the first transmission method, the first layer is a physical layer.

One aspect of the present invention is a first repeater that receives a first packet group, and transmits the first packet group to a terminal device, the first packet group including a plurality of information packets and parity packets, the parity packets being generated by coding the information packets at a packet level, the repeater comprising: a first reception unit operable to receive the first packet group; a first transmission unit operable to transmit, to the terminal device, some packets of the received first packet group as a second packet group; a second reception unit operable to receive feedback information from the terminal device that has received the second packet group; and a second transmission unit operable, when the second reception unit receives the feedback information from the terminal device, to transmit, to the terminal device, one or more packets of the first packet group other than the packets included in the second packet group, as a third packet group.

One aspect of the present invention is a first communication method used in a repeater that receives a first packet group, and transmits the first packet group to a terminal device, the first packet group including a plurality of information packets and parity packets, the parity packets being generated by coding the information packets at a packet level, the communication method comprising: a first reception step of receiving the first packet group; a first transmission step of transmitting, to the terminal device, some packets of the received first packet group as a second packet group; a second reception step of receiving feedback information from the terminal device that has received the second packet group; and a second transmission step of, when the feedback information is received from the terminal device in the second reception step, transmitting, to the terminal device, one or more packets of the first packet group other than the packets included in the second packet group, as a third packet group.

According to the above, the repeater transmits, from among the packet groups received by the terminal device, the first packet group first. When receiving the feedback information from the terminal device, the repeater transmits, as the third packet group, one or more packets of the first packet group other than the packets included in the second packet group. According to the above-stated structure, setting is made in the repeater such that the amount of information to be initially transmitted to the terminal device is smaller than the amount of the received packet group. In this way, the data transfer efficiency can be enhanced.

According to one aspect of the present invention which is a second repeater according to the first repeater, the first transmission unit transmits, as the second packet group, the information packets included in the first packet group, and the second transmission unit transmits, as the third packet group, some or all of the parity packets included in the first packet group.

According to one aspect of the present invention which is a second communication method of the first communication method, the first transmission step transmits, as the second packet group, the information packets included in the first packet group, and the second transmission step transmits, as the third packet group, some or all of the parity packets included in the first packet group.

According to the above, the repeater transmits the information packets first. In this way, processing in the terminal device can be reduced compared to a case where the parity packets are transmitted first. This is because when the information packets are transmitted first, the decoding at a packet level does not have to be executed while the decoding at a packet level needs to be executed when the parity packets are transmitted first.

According to one aspect of the present invention which is a third repeater according to the first repeater, the first transmission unit transmits, as the second packet group, one or more packets of the first packet group that have no error before decoding at a packet level is performed.

According to one aspect of the present invention which is a third communication method according to the first communication method, the first transmission step transmits, as the second packet group, one or more packets of the first packet group that have no error before decoding at a packet level is performed.

According to the above, the packets that have been received without an error before the decoding at a packet level (e.g. when the decoding at the physical layer is performed) is transmitted to the terminal device first. The erroneous packets can be restored by the decoding at a packet level without wasting time, after such transmission is performed and before the feedback information for the transmission is transmitted.

According to one aspect of the present invention which is a fourth repeater according to the third repeater, the first transmission unit transmits, as the second packet group, a number of packets that are equal to or greater than a predetermined number of packets, the predetermined number of packets being enough to restore, when received by the external terminal without an error and decoded at a packet level, original information of the information packets.

According to one aspect of the present invention which is a fourth communication method according to the third communication method, the first transmission step transmits, as the second packet group, a number of packets that are equal to or greater than a predetermined number of packets, the predetermined number of packets being enough to restore, when received by the external terminal without an error and decoded at a packet level, original information of the information packets.

According to the above, the terminal device receives the transmission data initially transmitted by the repeater. In this way, it is possible to increase the possibility of restoring information on which the transmission data is based, in the terminal device.

According to one aspect of the present invention that is a fifth repeater according to one of the third and fourth repeaters, the second transmission unit transmits, as the third packet group, a packet group including the one or more packets of the first packet group other than the packets included in the second packet group, the one or more packets being generated based on information restored by performing decoding at a packet level.

According to one aspect of the present invention which is a fifth transmission method according to the third and fourth transmission methods, the second transmission step transmits, as the third packet group, a packet group including the one or more packets of the first packet group other than the packets included in the second packet group, the one or more packets being generated based on information restored by performing decoding at a packet level.

One aspect of the present invention is a coder that generates third packets by: obtaining first packets and second packets, the first and second packets being respectively obtained by coding first information and second information at a packet level; extracting the first information and the second information respectively from the first packets and the second packets; and coding the first information and the second information at a packet level One aspect of the present invention is a coding method that generates third packets by: obtaining first packets and second packets, the first and second packets being respectively obtained by coding first information and second information at a packet level; extracting the first information and the second information respectively from the first packets and the second packets; and coding the first information and the second information at a packet level.

The following describes embodiments of the present invention with reference to drawings.

First Embodiment

The following describes a first embodiment of the present invention with reference to drawings.

<Transmitter>

FIG. 1 is a structural diagram of a communication apparatus 11 on a transmitting side (transmitter 11) in the first embodiment.

The transmitter 11 includes a packet generation unit 101, a packet data coding unit 102, a physical layer error correction coding unit 103, a modulation unit 104, a transmission unit 105, a transmission antenna 106, a reception antenna 107, a reception processing unit 108 and a transmission method determination unit 109. Here, the packet generation unit 101 and the packet data coding unit 102 are functional units that function at a layer (e.g. application layer) at which signal processing is performed earlier than at the physical layer. Also, the physical layer error correction coding unit 103, the modulation unit 104 and the transmission unit 105 are functional units that function at the physical layer.

The packet generation unit 101 receives information 131 and a control signal 141 as inputs. The packet generation unit 101 generates information packets 132 with use of the information 131 based on the control signal 141, and outputs the generated information packets 132 to the packet data coding unit 102. Here, the control signal 141 shows the transmission method (e.g. a coding rate of codes in the packet data coding unit 102, a coding rate of error correction codes at the physical layer, a modulation method and whether or not retransmission data is to be transmitted or not). Note that the transmission method is not limited to the above-shown methods, and may be any method as long as the method includes information necessary for controlling processing in each of the units included in the transmitter 11.

The packet data coding unit 102 receives the information packets 132 and the control signal 141 as inputs. The packet data coding unit 102 codes data of the information packets 132 based on the control signal 141 to obtain transmission packets 133, and outputs the transmission packets 133 to the physical layer error correction coding unit 103. Note that the packet generation unit 101 and the packet data coding unit 102 are described in detail later with reference to FIG. 2.

The physical layer error correction coding unit 103 receives transmission packets 133 and the control signal 141 as inputs. The physical layer error correction coding unit 103 codes data of the transmission packets 133 based on the coding rate of the error correction codes at the physical layer, for example, shown by the control signal 141 to obtain transmission data 134, and outputs the transmission data 134 to the modulation unit 104.

The modulation unit 104 receives the transmission data 134 and the control signal 141 as inputs. The modulation unit 104 modulates the transmission data 134 based on the modulation method shown by the control signal 141 to obtain a base band signal 135, and outputs the resultant base band signal 135 to the transmission unit 105.

The transmission unit 105 receives the base band signal 135 as an input. The transmission unit 105 performs processing (e.g. frequency conversion and amplification) on the base band signal 135 to obtain a transmission signal 136, and outputs the resultant transmission signal 136 to the transmission antenna 106. Then, the transmission antenna 106 outputs the transmission signal 136. Note that the transmission signal 136 outputted from the transmission antenna 106 is received by a receiver with which the transmitter communicates.

The reception processing unit 108A receives, as an input, a reception signal 137 received in the reception antenna 107 from the receiver. The reception processing unit 108 demodulates and decodes the reception signal 137 to obtain data 138. Then, the reception processing unit 108 outputs the data 138 and feedback information 139 (received from the receiver) to a functional block (not depicted) and the transmission method determination unit 109, respectively. Here, the feedback information 139 includes the following examples: information on packet numbers of erroneous packets, information on received signal strength indicator when the receiver receives a modulation signal transmitted by the transmitter 11; Channel State Information (CSI); a packet error rate; a bit error rate; and information on a retransmission request. Note that the feedback information 139 is not limited to the above-described content.

The transmission method determination unit 109 receives, as inputs, the feedback information 139 and information 140 on a transmission method set by a user of the transmitter 11. The transmission method determination unit 109 determines a transmission method (e.g. a coding rate of codes in a coding unit (parity packet generation unit) 152, a coding rate of error correction codes at the physical layer, a modulation method and whether or not retransmission data is to be transmitted or not) with use of the feedback information 139 and the information 140. Then, the transmission method determination unit 109 outputs the control signal 141 that is based on the determined content. As described in the above, the transmission method may be determined based on the feedback information received from the receiver. However, the transmission method does not necessarily have to be based on the feedback information received from the receiver. For example, when the transmitter recognizes a communication environment (e.g. communication traffic and a state of a channel), the transmission method determination unit 109 may determine the transmission method without referring to the feedback information received from the receiver.

Figure 2:
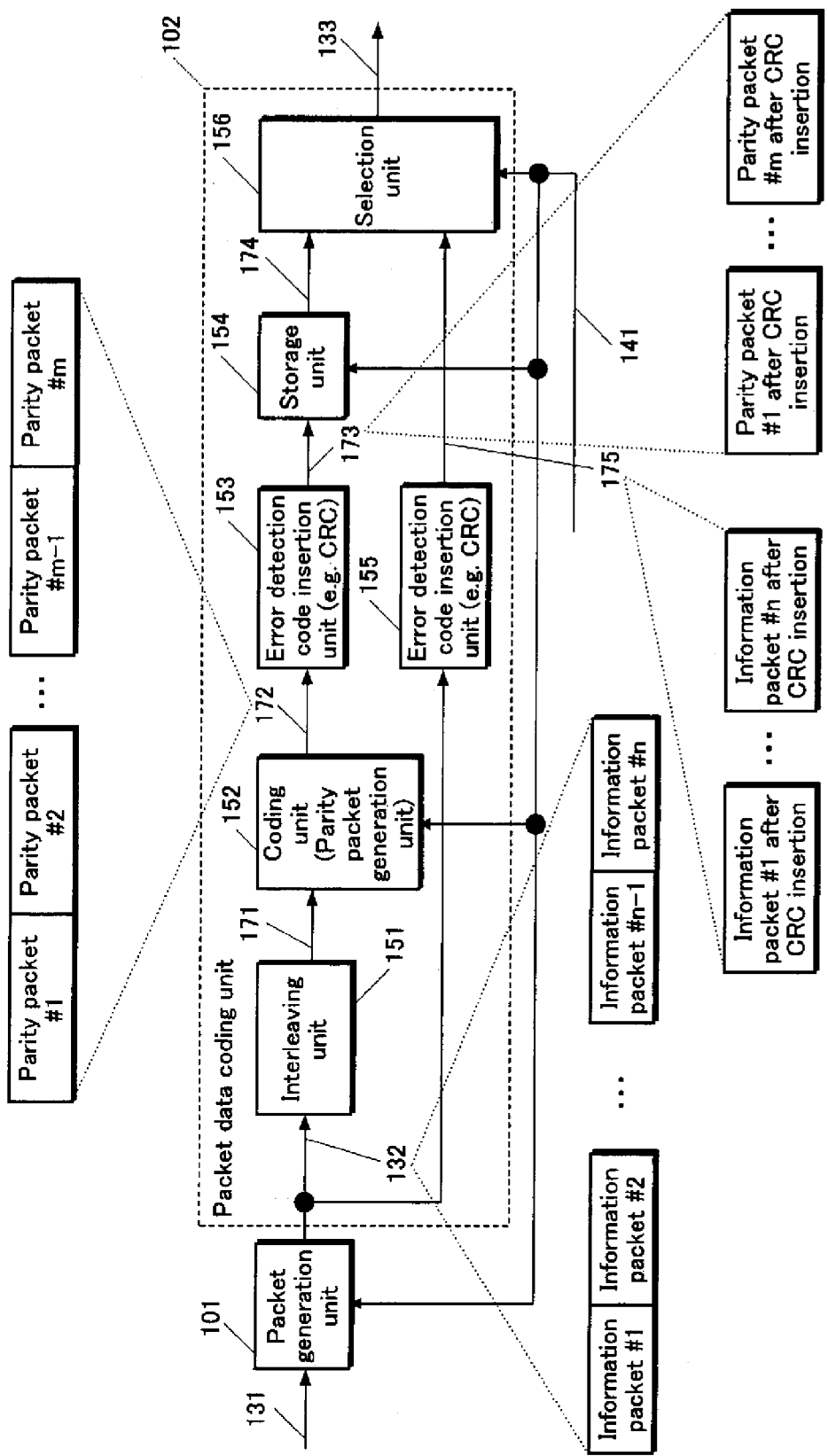
FIG. 2 is a structural diagram of a packet generation unit and a packet data coding unit in FIG. 1.

FIG. 2 is a structural diagram of the packet generation unit 101 and the packet data coding unit 102 shown in FIG. 1.

The packet generation unit 101 receives information 131 and the control signal 141 as inputs. The packet generation unit 101 generates the information packets 132 (e.g. information packets #1 to #n) with use of the information 131 based on the number of bits composing packets and a method as to how control information (to be transmitted together with the information in the packets) is configured, for example. Then, the packet generation unit 101 outputs the generated information packets 132 to the packet data coding unit 102.

As shown in FIG. 2, the packet data coding unit 102 includes an interleaving unit 151, the coding unit 152, an error detection code insertion unit 153, a storage unit 154, an error detection code insertion unit 155 and a selection unit 156.

The interleaving unit 151 receives the information packets 132 as inputs. The interleaving unit 151 interleaves bits of the information packet 132 in units of bits or in units of sets of plural bits, for example, and outputs interleaved data 171 to the coding unit 152.

The coding unit (parity packet generation unit) 152 receives the interleaved data 171 and the control signal 141 as inputs. The coding unit 152 generates parities by coding the interleaved data 171 based on the coding rate of codes or a coding method, for example, shown by the control signal 141. The coding unit (parity packet generation unit) 152 generates parity packets 172 (e.g. parity packets #1 to #m) with use of the generated parities, and outputs the generated parity packets 172 to the error detection code insertion unit 153. Note that the coding unit 152 codes the interleaved data 171 with use of the following examples: LDPC (Low-Density Parity Check Codes); convolution codes; block codes; turbo codes; and Raptor codes. The coding method is not limited to the above-described codes. Also, examples of the LDPC codes include LDPC block codes and LDPC convolution codes.

The error detection code insertion unit 153 receives the parity packets 172 as inputs. The error detection code insertion unit 153 inserts CRC (Cyclic Redundancy Check), for example, into each of the parity packets 172 (e.g. parity packets #1 to #m) in order to judge if a packet error occurs in the receiver. Then, the error detection code insertion unit 153 outputs parity packets 173 after the CRC insertion (e.g. parity packets #1 to #m after the CRC insertion) into the storage unit 154. Here, error detection codes other than the CRC may be used. For example, the error detection may be performed with the block codes (e.g. the LDPC codes).

The storage unit 154 receives the parity packets 173 after the CRC insertion as inputs and stores therein the parity packets 173. The storage unit 154 receives the control signal 141 as an input. When the control signal 141 indicates transmission of the retransmission data, the storage unit 154 transmits, to the selection unit 156, stored parity packets 174 after the CRC insertion.

The error detection code insertion unit 155 receives the parity packets 132 as inputs. The error detection code insertion unit 155 inserts the CRC (Cyclic Redundancy Check), for example, into each of the information packets 132 (e.g. information packets #1 to #n) in order to judge whether or not the packet error occurs in the receiver. Then, the error detection code insertion unit 155 outputs information packets 175 (e.g. information packets #1 to #n after the CRC insertion) to the selection unit 156. Here, error detection codes other than the CRC may be used. For example, the error detection may be performed with the block codes (e.g. LDPC codes).

The selection unit 156 receives, as inputs, the parity packets 174 after the CRC insertion, the information packets 175 after the CRC insertion and control signal 141. The selection unit 156 selects packets to be outputted based on the control signal 141, and outputs the selected packets as the transmission packets 133 to the physical layer error correction coding unit 103. Here, when the control signal 141 does not indicate transmission of the retransmission data, the selection unit 156 selects and outputs the information packets 175 after the CRC insertion. When the control signal 141 indicates the transmission of the retransmission data, the selection unit 156 selects and outputs the parity packets 174 after the CRC insertion. Processing such as coding and modulation at the physical layer is performed on the transmission packets 133 outputted from the selection unit 156. Then, the transmission packets 133 are transmitted to the receiver.

Figure 3:
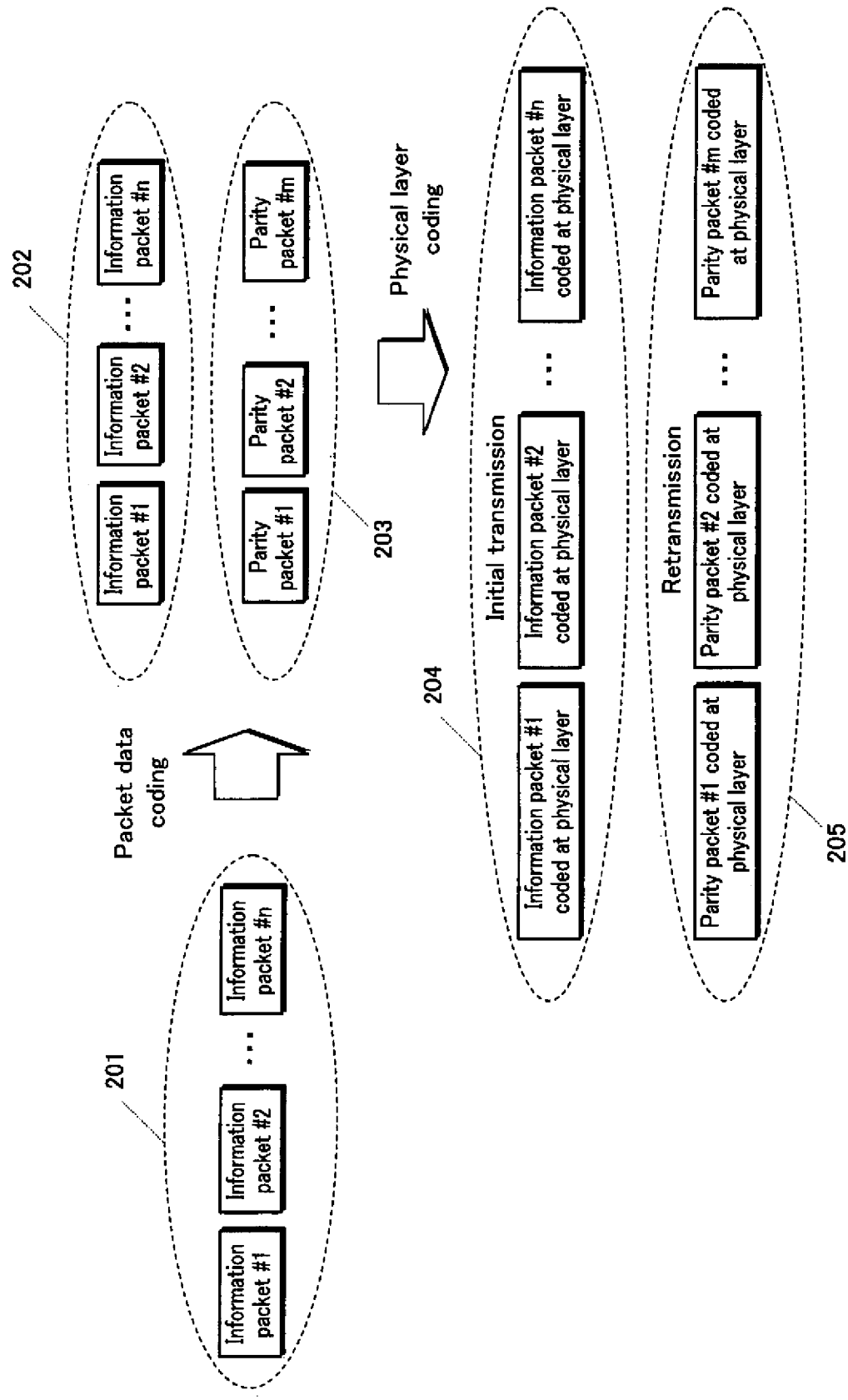
FIG. 3 shows an example of transmission operations of the transmitter in FIG. 1.

FIG. 3 shows an example of transmission operations of the transmitter 11 in FIG. 1. The following describes a relation between the layer at which signal processing is performed earlier than the physical layer (e.g. application layer) and the physical layer, and especially matters that relate to coding.

An information packet group 201 is a group of information packets inputted in the packet data coding unit 102 of the transmitter 11. As shown in FIG. 3, the information packet group 201 is composed of information packets #1 to #n.

The packet data coding unit 102 of the transmitter 11 receives information packets #1 to #n as inputs. The packet data coding unit 102 generates the parity packets #1 to #m by coding the information packets #1 to #n. At a time of initial transmission, the packet data coding unit 102 outputs an information packet group 202 (information packets #1 to #n). At a time of retransmission, the packet data coding unit 102 outputs a parity packet group 203 (parity packets #1 to #m). Note that although the CRC is inserted into each of the information packets and the parity packets outputted from the packet data coding unit 102, descriptions regarding the CRC is omitted here.

The following describes an exemplary case where the information packets #1 to #n of the information packet group 201 and the information packets #1 to #n of the information packet group 202 are identical. However, the structure of the information packets of the information packet group 201 and the structure of the information packets of the information packet group 202 do not have to be identical as long as all information pieces on the information packet group 201 are transmitted to a receiver without an error. Therefore, although FIG. 3 shows an example where the number of bits composing the information packets of the information packet group 201 and the number of bits composing the information packets of the information packet group 202 are identical, it is possible that the number of bits composing the information packets of the information packet group 201 and the number of bits composing the information packets of the information packet group 202 are different.

Next, the physical layer error correction coding unit 103 generates an information packet group 204 (information packets #1 to #n coded at the physical layer) by coding the information packet group 202 (information packets #1 to #n) at the physical layer at the time of initial transmission. The information packet group 204 (information packets #1 to #n coded at the physical layer) is transmitted from the transmitter 11.

In this case, when an information packet error occurs in the receiver, the receiver makes a retransmission request to the transmitter 11. At the time of retransmission, the physical layer error correction coding unit 103 generates a parity packet group 205 (parity packets #1 to #m coded at the physical layer) by coding the parity packet group 203 (parity packets #1 to #m) at the physical layer. The transmitter 11 transmits parity packet group 205 (parity packets #1 to #m coded at the physical layer).

<Receiver>

Figure 4:
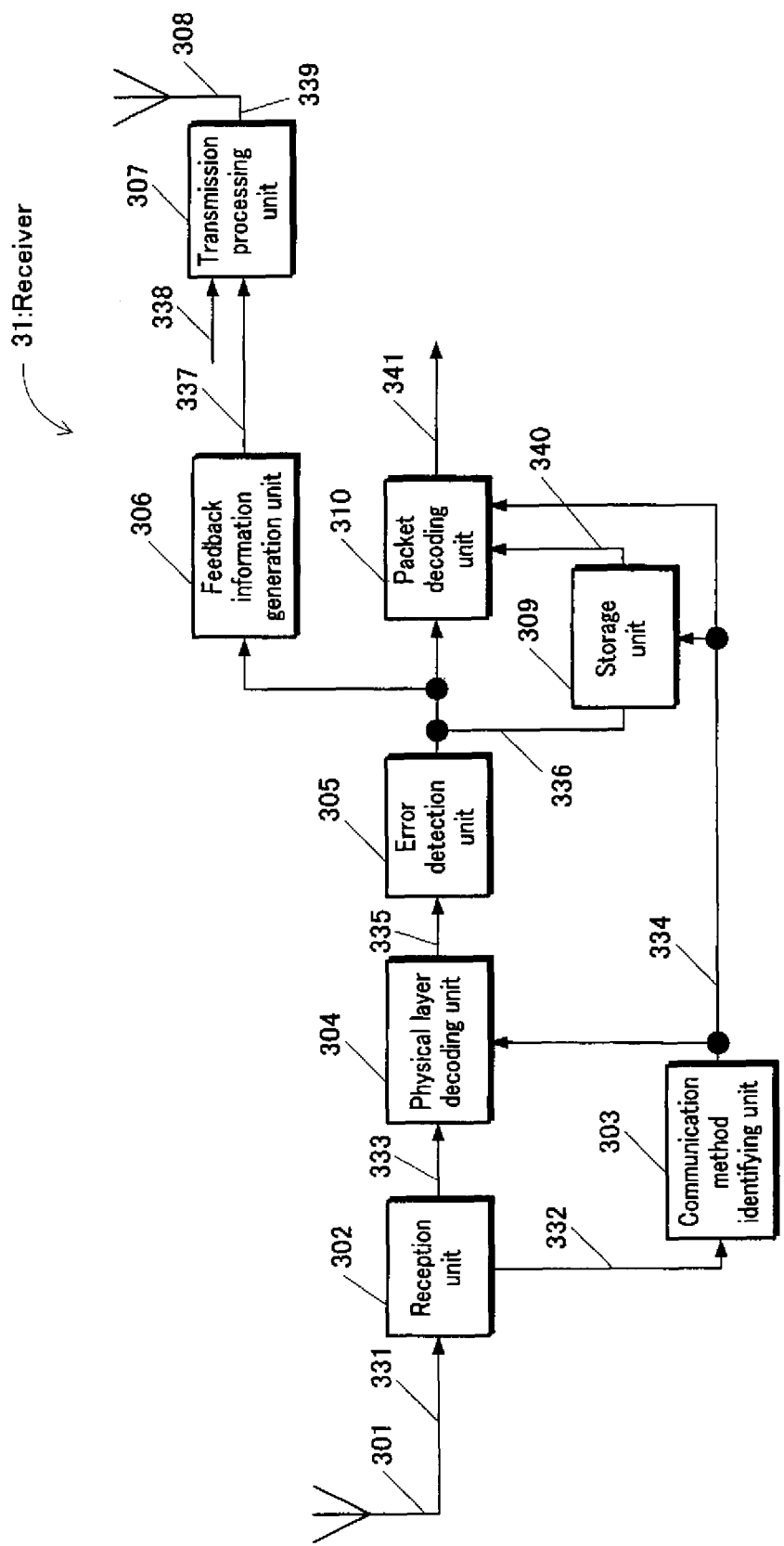
FIG. 4 is a structural diagram of a communication apparatus on a receiving side (receiver) with which the transmitter in FIG. 1 communicates.

FIG. 4 is a structural diagram of a communication apparatus 31 on a receiving side (receiver 31) that communicates with the transmitter 11 in FIG. 1. The receiver 31 includes a reception antenna 301, a reception unit 302, a communication method identifying unit 303, a physical layer decoding unit 304, an error detection unit 305, a feedback information generation unit 306, a transmission processing unit 307, a transmission antenna 308, a storage unit 309 and a packet decoding unit 310.

The reception unit 302A receives, as inputs, a reception signal 331 from the reception antenna 301. The reception unit 302 performs, on the reception signal, processing such as frequency conversion and orthogonal demodulation. Then, the reception unit 302 outputs control information 332 included in the reception signal 331 to the communication method identifying unit 303, and outputs reception data 333 to the physical layer decoding unit 304. Note that a frame structure regarding the reception signal 331 includes, in addition to data symbol, a control symbol for transmitting: information on a modulation signal; information on the error detection codes at the physical layer; information on the coding rate of the error correction codes; information on codes used by the transmitter at a layer (e.g. application layer) at which signal processing is performed earlier than the physical layer; information on a coding rate of the codes; and information on whether data is retransmission data, for example. Note that the control symbol included in the frame structure is not limited to the above, and the frame structure may include some of the above control symbols or may include another control symbol.

The communication method identifying unit 303 receives the control information 332 as an input. The communication method identifying unit 303 extracts: information on a modulation signal; information on the error detection codes at the physical layer; information on the coding rate of the error correction codes; information on codes used by the transmitter at a layer (e.g. application layer) at which signal processing is performed earlier than the physical layer; information on a coding rate of the codes; and information on whether data is retransmission data, for example. The communication method identifying unit 303 outputs communication method information 334 including the extracted information pieces to each of the physical layer decoding unit 304, the storage unit 309 and the packet decoding unit 310.

The physical layer decoding unit 304 receives the reception data 333 and the communication method information 334 as inputs. The physical layer decoding unit 304 performs decoding at the physical layer based on information on the error correction codes at the physical layer and information on the coding rate of the error correction codes, for example, shown by the communication method information 334. Then, the physical layer decoding unit 304 outputs the decoded data 335 to the error detection unit 305.

The error detection unit 305 receives the decoded data 335 as an input. The error detection unit 305 performs error detection on the data 335 after the decoding in units of packets. The error detection unit 305 outputs the result of the error detection and data 336 of the packets to each of the feedback information generation unit 306, the storage unit 309 and the packet decoding unit 310.

The feedback information generation unit 306 receives, as inputs, the result of the error detection and the data 336 of the packets. The feedback information generation unit 306 determines whether or not to make a retransmission request based on the result of the error detection. The feedback information generation unit 306 generates information (information on numbers of erroneous packets and information on a retransmission request, for example) as feedback information 337, and outputs the feedback information 337 to the transmission processing unit 307. Note that the following shows an exemplary case where the transmitter determines the retransmission method (retransmission with use of the parity packet). However, the receiver may determine the retransmission method. In this case, the feedback information includes information on the retransmission method.

The transmission processing unit 307 receives the feedback information 337 and information 338 as inputs. The transmission processing unit 307 performs processing such as coding and modulation on the feedback information 337 and the information 338 to obtain a transmission signal 339, and outputs the transmission signal 339. The transmission signal 339 is outputted from the transmission antenna 308. Note that the transmission signal 339 outputted from the transmission antenna 308 is received by a receiver with which the transmitter communicates.

The storage unit 309 receives the result of the error detection, the data 336 of the packets and the communication method information 334 as inputs. The storage unit 309 stores therein data of packets having no error, based on the result of the error detection. When the communication method information 334 indicates that data is retransmission data, the storage unit 309 outputs the data 340 of the stored packets to the packet decoding unit 310.

The packet decoding unit 310 receives, as inputs, the result of the error detection, data 336 of the packets, data 340 of the packets and the communication method information 33. When the communication method information 334 indicates that data is not retransmission data, the packet decoding unit 310 outputs, as packets 341, the packets inputted by the error detection unit 305 without performing a decoding operation. When the communication method information 334 indicates that data is retransmission data, on the other hand, the packet decoding unit 310 performs decoding on both the data 340 of the packets, and a set of the retransmitted result of the error detection and the data 336 of the packets. Then, the packet decoding unit 310 outputs packets obtained as a result of the decoding, as the packets 341.

Figure 5:
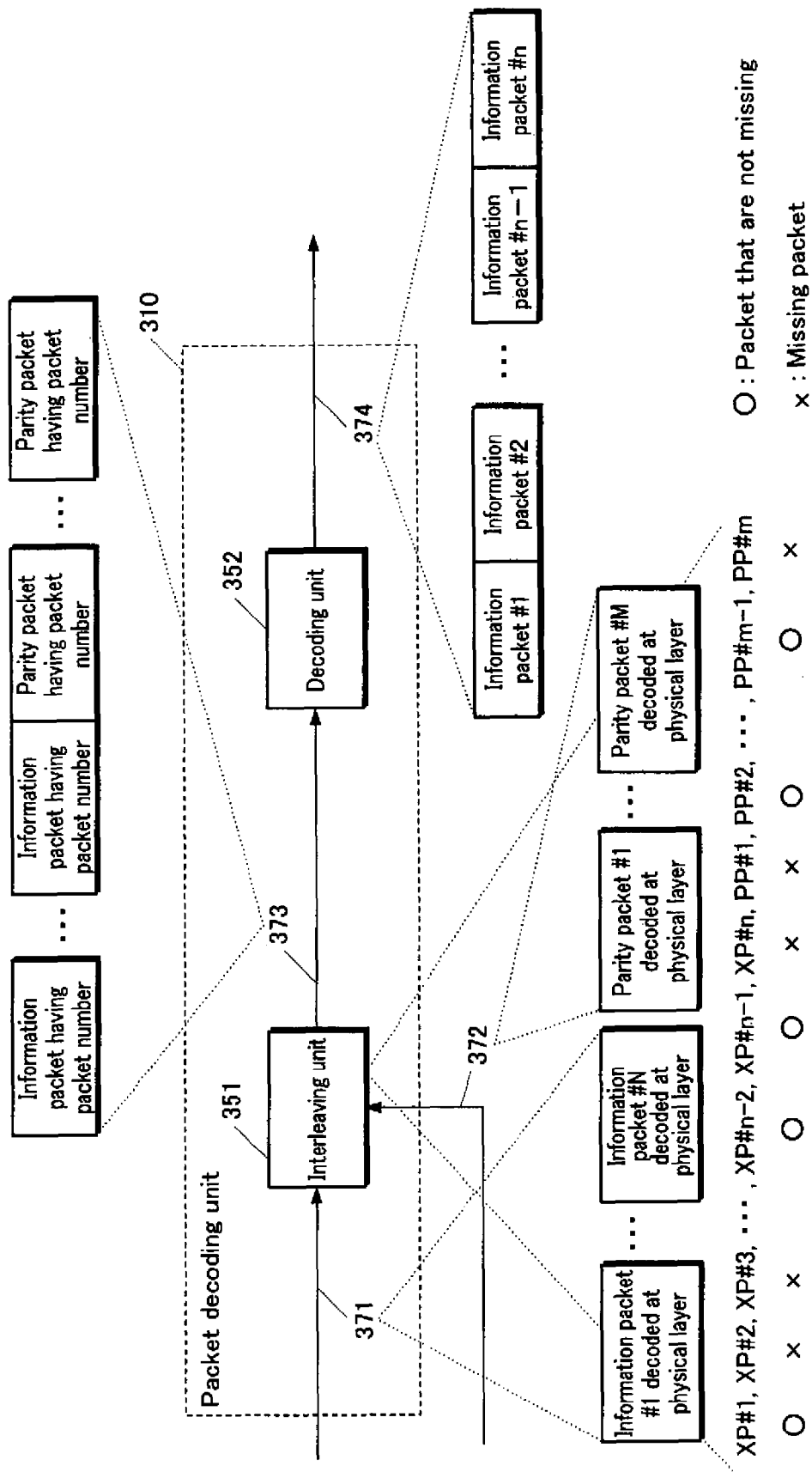
FIG. 5 is a structural diagram of a packet decoding unit shown in FIG. 4.

The following describes the packet decoding unit 310 with reference to FIG. 5. FIG. 5 is a structural diagram of the packet decoding unit 310 in FIG. 4. The packet decoding unit 310 includes an interleaving unit 351 and a decoding unit 352.

The interleaving unit 351 receives, as inputs, the information packets 371 decoded at the physical layer and parity packets 372 decoded at the physical layer. Note that when the communication method information 334 indicates that data is not retransmission data, only the information packets 371 decoded at the physical layer are inputted in the interleaving unit 351. When the communication method information 334 indicates that data is retransmission data, the interleaving unit 351 receives, as inputs, the information packets 371 decoded at the physical layer and the parity packets 372 decoded at the physical layer.

The interleaving unit 351 interleaves the information packets 371 decoded at the physical layer (e.g. the information packets #1 to #N decoded at the physical layer) and the parity packet 372 decoded at the physical layer (e.g. parity packets #1 to #M decoded at the physical layer). Then, the interleaving unit 351 outputs the interleaved data 373 (e.g. information packets each having a packet number and parity packets each having a packet number) to the decoding unit 352. At this time, some of the information packets and some of the parity packets are missing while the other information packets and the other parity packets are not missing, as shown in one example in FIG. 5. Note that each XP in FIG. 5 shows an information packet while each PP shows a parity packet.

The decoding unit 352 receives the interleaved data 373 as an input. When the communication method information 334 indicates that data is retransmission data, the decoding unit 352 obtains information packets 374 by restoring missing data with use of the information packets and the parity packets that are not missing. However, when some of the information packets are missing, a retransmission request is made. Note that when the communication method information 334 indicates that data is not retransmission data, the decoding unit 352 does not perform a particular decoding operation FIG. 6A shows an example of reception operations of the transmitter 31 in FIG. 4.

The receiver 31 receives the information packets (coded at the physical layer after the CRC insertion) initially transmitted by the transmitter 11. The physical layer decoding unit 304 of the receiver 31 performs, at the physical layer, the error correction decoding on the received data to obtain the information packets #1 to #n decoded at the physical layer. Then, the error detection unit 305 performs the error detection on the information packets #1 to #n decoded at the physical layer.

When the result of the error detection by the error detection unit 305 indicates that no erroneous information packets exist, the receiver 31 does not make a retransmission request to the transmitter 11.

FIG. 6B shows another example of reception operations of the transmitter 31 in FIG. 4.

The receiver 31 receives the information packets (coded at the physical layer after the CRC insertion) initially transmitted by the transmitter 11. The physical layer decoding unit 304 of the receiver 31 performs, at the physical layer, the error correction decoding on the received data to obtain the information packets #1 to #n decoded at the physical layer. Then, the error detection unit 305 performs the error detection on the information packets #1 to #n decoded at the physical layer.

When the result of the error detection by the error detection unit 305 indicates that erroneous packets exist, the receiver 31 makes a retransmission request to the transmitter 11. When the retransmission request is made, the transmitter 11 transmits the parity packets #1 to #m (coded at the physical layer after the CRC insertion).

Then, the receiver 31 receives the parity packets #1 to #m (coded at the physical layer after the CRC insertion). The physical layer decoding unit 304 of the receiver 31 performs, at the physical layer, the error correction decoding on the received data to obtain the parity packets #1 to #m decoded at the physical layer. Then, the error detection unit 305 performs the error detection on the parity packets #1 to #m decoded at the physical layer. Then, parity packets having no error, for example, are extracted.

Then, the packet decoding unit 310 obtains information packets #1 to #n by decoding packets with use of the information packets having no error and parity packets having no error. Here, the information packets having no error are stored in the storage unit 309. However, when the receiver 31 is unable to obtain all the information packets #1 to #n, the receiver 31 makes another retransmission request in some cases.

<Communication Between Transmitter and Receiver>

Figure 7:
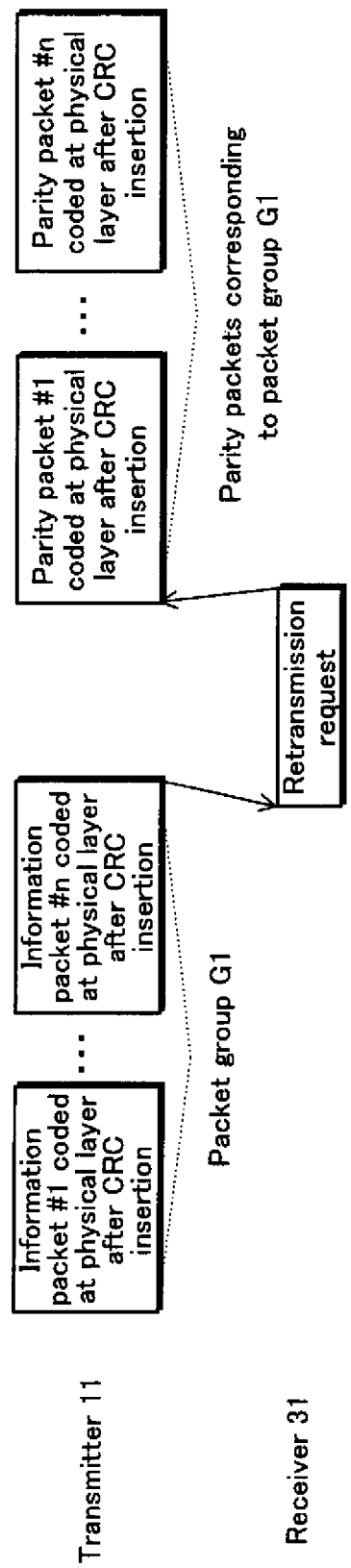
FIG. 7 shows an example of communication between the transmitter shown in FIG. 1 and the receiver shown in FIG. 4.

FIG. 7 shows an example of communication between the transmitter 11 shown in FIG. 1 and the receiver 31 shown in FIG. 4.

The transmitter 11 inserts the CRC into each of the information packets #1 to #n with use of the packet data coding unit 102, and codes, at the physical layer, the information packets #1 to #n after the CRC insertion with use of the physical layer error correction coding unit 103. Then, the transmitter 11 transmits the information packets #1 to #n (coded at the physical layer after the CRC insertion). These packets are referred to as a packet group G1. At this time, the packet group G1 does not include parity packets obtained by coding the information packets with use of the coding unit 152 shown in FIG. 2.

The receiver 31 receives the information packets #1 to #n (coded at the physical layer after the CRC insertion). Then, the receiver 31 performs, on the information packets #1 to #n, the decoding processing at the physical layer with use of the physical layer decoding unit 304, and performs the error detection processing with use of the error detection unit 305. Here, the receiver 31 transmits, to the transmitter 11, feedback information including a retransmission request, when it is presumed that the erroneous information packets exist. At this time, the storage unit 309 of the receiver 31 stores therein the information packets having no error.

The transmitter 11 generates parity packets #1 to #m by coding the information packets #1 to #n, and inserts the CRC into each of the parity packets #1 to #m, with use of the packet data coding unit 102. The transmitter 11 codes, at the physical layer, the parity packets #1 to #m after the CRC insertion with use of the physical layer error correction coding unit 103. Then, the transmitter 11 transmits the parity packets #1 to #m (coded at the physical layer after the CRC insertion).

By the time when the transmitter 11 transmits the information packets #1 to #n, the parity packets #1 to #m after the CRC insertion have been generated by the packet data coding unit 102 shown in FIG. 2, and stored in the storage unit 154. When the retransmission request is made, the packet data coding unit 102 outputs the parity packets #1 to #m after the CRC insertion that have been stored in the storage unit 154. The physical layer error correction coding unit 103 codes, at the physical layer, the parity packets #1 to #m after the CRC insertion. Then, the parity packets #1 to #m (coded at the physical layer after the CRC insertion) are transmitted.

The receiver 31 receives the parity packets #1 to #m (coded at the physical layer after the CRC insertion). Then, the receiver 31 performs, on the parity packets #1 to #m, the decoding processing at the physical layer with use of the physical layer decoding unit 304, and the error detection processing with use of the error detection unit 305. The packet decoding unit 310 obtains information packets by performing packet decoding processing on the information packets having no error and the parity packets having no error. Here, the information packets having no error are stored in the storage unit 309.

According to the present embodiment, the receiver 31 generates the parity packets with use of the information packets at a layer at which signal processing is performed earlier than at the physical layer (generates retransmission data at a packet level), and retransmits the parity packets. Thus, flexible retransmission data can be generated. This makes it possible to effectively reduce the packet error rate by retransmitting the parity packets.

Second Embodiment

The following describes a second embodiment of the present invention with reference to drawings. A communication apparatus on a transmitting side (transmitter) in the second embodiment has, in addition to the functions of the transmitter 11 of the first embodiment, a function of changing the coding rate of the codes at a layer at which signal processing is performed earlier than at the physical layer (the number of parity packets to be retransmitted), in accordance with the number of erroneous packets. However, a communication apparatus on a receiving side (receiver) in each of the present embodiment and the third embodiment has the structures as shown in FIG. 4 and FIG. 5. Such a receiver transmits, to the transmitter, feedback information including information on a retransmission request and information (e.g. the number of erroneous packets). Note that the same reference numerals are given to elements of the present embodiment that are substantially the same as the elements of the first embodiment. Since the descriptions thereof can be applied to the elements of the present embodiment, the descriptions are omitted or are kept brief.

<Transmitter>

The transmitter of the present embodiment includes a packet data coding unit 102a and the transmission method determination unit 109 respectively having different functions from the packet data coding unit 102 and the transmission method determination unit 109 that are included in the transmitter 11 of the first embodiment. The following describes the packet data coding unit 102a and the transmission method determination unit 109.

Figure 8:
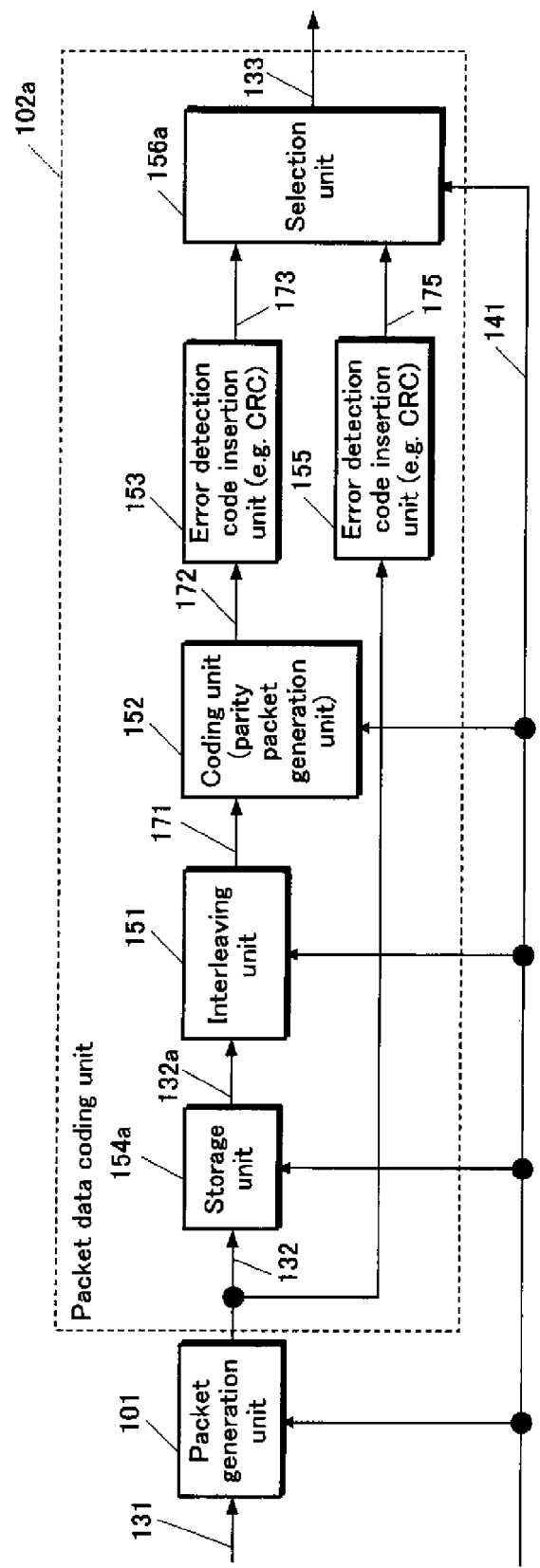
FIG. 8 is a structural diagram of the packet generation unit and the packet data coding unit that are included in a transmitter of a second embodiment.

The following describes the packet data coding unit 102a with reference to FIG. 8. FIG. 8 is a structural diagram of the packet generation unit 101 and the packet data coding unit 102a that are included in the transmitter shown in FIG. 8.

The packet data coding unit 102a is different from the packet data coding unit 102 in that the packet data coding unit 102a has a selection unit 156a instead of the selection unit 156, does not include the storage unit 154 between the error detection code insertion unit 153 and the selection unit 156a, and includes a storage unit 154a between the packet generation unit 101 and the interleaving unit 151. The reasons for this are as follows. The transmitter determines the coding rate of codes in the coding unit 152 (the number of parity packets to be retransmitted) in accordance with the number of erroneous packets. It is difficult to determine the coding rate of the codes in the coding unit 152 before obtaining, from the receiver, the feedback information including the number of erroneous packets.

The storage unit 154a receives the parity packets 132 as inputs. The storage unit 154a receives the control signal 141 as an input. When the control signal 141 indicates transmission of the retransmission data (when the feedback information including the retransmission request is received from the receiver), the storage unit 154a outputs the stored information packets 132a to the interleaving unit 151. The interleaving unit 151 interleaves bits composing the information packets 132a in units of bits or in units of sets of plural bits, for example, in accordance with information regarding a interleaving method, for example, shown by the control signal 141. The coding unit (parity packet generation unit) 152 generates the parity packets by coding interleaved data 171 based on the coding rate of codes or a coding method, for example, shown by the control signal 141.

The selection unit 156a receives, as inputs, the information packets 175 after the CRC insertion, the parity packets 173 after the CRC insertion and control signal 141. Here, when the control signal 141 does not indicate transmission of retransmission data, the selection unit 156a selects and outputs the information packets 175 after the CRC insertion. When the control signal 141 indicates the transmission of the retransmission data, the selection unit 156a selects and outputs the parity packets 173 after the CRC insertion.

Figure 9:
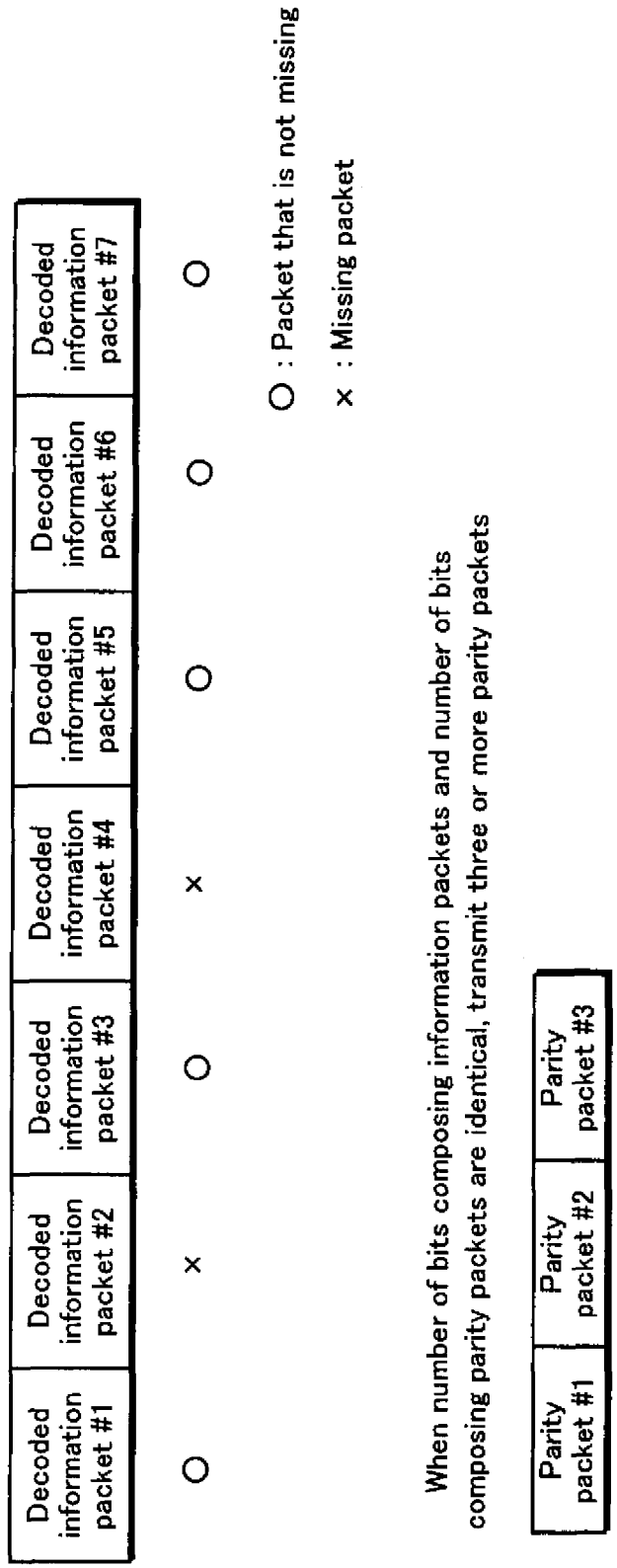
FIG. 9 shows an example of how a transmission method determination unit included in the transmitter of the second embodiment determines the number of parity packets to be retransmitted.

The following describes an example of determining the number of parity packets to be retransmitted (the coding rate of the codes in the coding unit 152) with use of the transmission method determination unit 109, with reference to FIG. 9. FIG. 9 describes the example of determining the number of parity packets to be retransmitted with use of the transmission method determination unit 109.

Suppose that the transmitter transmits information packets #1 to #7 to the receiver, and two information packets #2 and #4 from among the received information packets are missing in the receiver. In this case, the receiver transmits, to the transmitter, the feedback information including information such as the number of erroneous information packets and the retransmission request.

The transmission method determination unit 109 determines, as the number of parity packets to be retransmitted, a number (three or more in this example) that is larger than the number of erroneous information packets (two in this example) based on the number of erroneous information packets that is indicated by the feedback information 139. Then, the transmission method determination unit 109 outputs the control signal 141 showing the coding rate of the codes in the coding unit 152 (corresponding to the number of parity packets to be retransmitted). Thus, the transmitter transmits three or more parity packets. Here, the number of bits composing the information packets and the number of bits composing the parity packets are identical.

The decoding operation by the packet decoding unit 310 of the receiver is equivalent, for example, to solving simultaneous equations with use of the Gauss elimination method. Therefore, when two information packets are missing, an unknown value exists that corresponds to the number of bits composing two information packets. In this case, the number of equations that is large enough to solve the number of bits composing the two information packets is necessary. Therefore, when the number of bits composing the information packets and the number of bits composing the parity packets are identical, it is necessary to transmit three or more parity packets. In addition, when the number of bits composing the information packets and the number of bits composing the parity packets are identical and L information packets are missing (L being an integer equal to or greater than one), it is necessary to transmit the number of parity packets that is equal to or greater than (L+1).

Note that the number of parity packets to be retransmitted (the coding rate of the codes in the coding unit 152) may be determined so that the total number of bits composing parity packets to be retransmitted is greater than the total number of bits composing the erroneous information packets from among the information packets received by the receiver.

<Communication Between Transmitter and Receiver>

Figure 10:
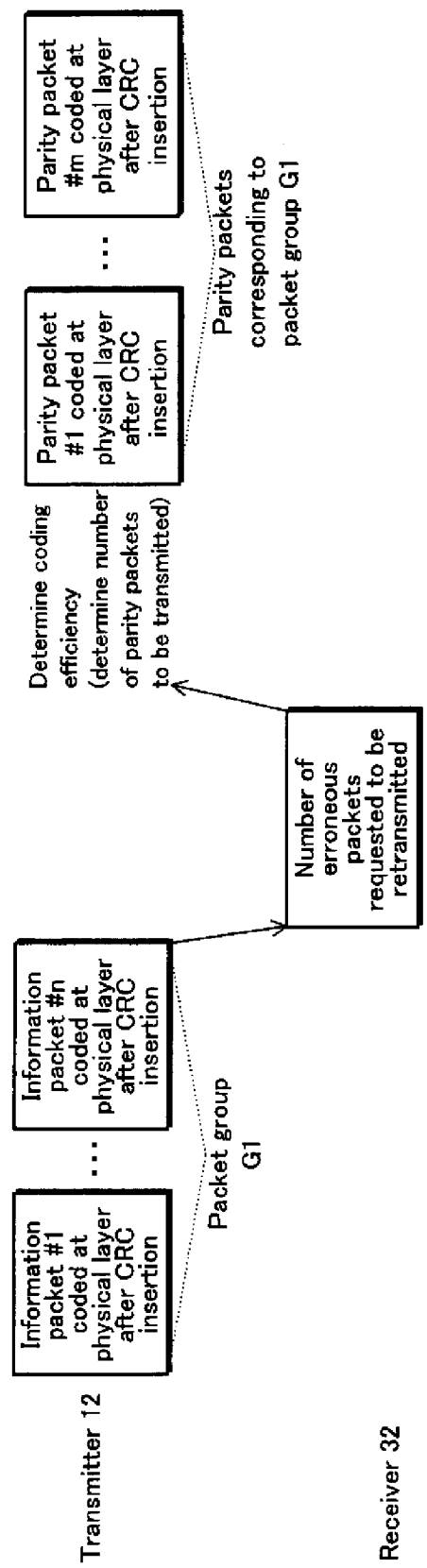
FIG. 10 shows an example of communication between the transmitter and the receiver in the second embodiment.

FIG. 10 shows an example of communication between a communication apparatus 12 on a transmitting side (transmitter 12) and a communication apparatus 32 on a receiving side (receiver 32) in the present embodiment.

The transmitter 12 transmits the information packets #1 to #n (coded at the physical layer after the CRC insertion). These packets are referred to as a packet group G1. At this time, the packet group G1 does not include parity packets that can be obtained by coding the information packets with use of the coding unit 152 shown in FIG. 8.

The receiver 32 receives the information packets #1 to #n (coded at the physical layer after the CRC insertion). Then, the receiver 32 performs, on the information packets #1 to #n, the decoding processing at the physical layer with use of the physical layer decoding unit 304, and the error detection processing with use of the error detection unit 305. Here, the receiver 32 transmits, to the transmitter 12, feedback information including a retransmission request and the number of erroneous information packets, for example, when it is presumed that the erroneous information packets exist. At this time, the storage unit 309 of the receiver 32 stores therein the information packets having no error.

The transmitter 12 receives the feedback information. When the feedback information includes the retransmission request, the transmitter 12 determines, with use of the transmission method determination unit 109, the coding rate of the codes in the coding unit 152 (the number of parity packets to be retransmitted) in accordance with the number of erroneous information packets included in the feedback information 139. The transmitter 12 generates parity packets #1 to #m by coding the information packets #1 to #n at the determined coding rate of the codes with use of the coding unit 152. Here, the information packets #1 to #n are stored in the storage unit 154a. The transmitter 12 inserts the CRC into each of the parity packets #1 to #m with use of the error detection code insertion unit 153, and codes, at the physical layer, the parity packets #1 to #m after the CRC insertion with use of the physical layer error correction coding unit 103. Then, the transmitter 12 transmits the parity packets #1 to #m (coded at the physical layer after the CRC insertion).

The receiver 32 receives the parity packets #1 to #m (coded at the physical layer after the CRC insertion). The packet decoding unit 310 obtains information packets by performing packet decoding processing with use of the information packets having no error and the parity packet having no error. Here, the information packets having no error are stored in the storage unit 309.

In the present embodiment, it is important that the transmitter 12 determines the coding rate of the codes in the coding unit 152 (the number of parity packets to be retransmitted) in accordance with the number of erroneous information packets. This is because since the number of missing information packets (the number of missing information bits) has been already known, the minimum required number of parity packets (number of parity bits) is clearly known. Even if the number of parity packets that is smaller than the minimum required number of parity packets is transmitted to the receiver 32, the receiver 32 cannot restore the information packets. Accordingly, there is a merit that it is possible to reduce the possibility that the receiver 32 makes another retransmission request, by determining the coding rate of the codes in the coding unit 152 (the number of parity packets to be retransmitted) in accordance with the number of erroneous information packets.

According to the present embodiment, the transmitter 12 generates the parity packets with use of the information packets by changing the coding rate of the codes in the coding unit 152 (the number of parity packets to be retransmitted) in accordance with the number of erroneous information packets, and retransmits the parity packets. Thus, it is possible to reduce the possibility of packet error occurrence by the retransmission. Therefore, data reception quality can be improved. Also, the number of retransmissions can be reduced. Therefore, data transmission efficiency can be improved.

Third Embodiment

The following describes a third embodiment of the present invention with reference to drawings. The above second embodiment describes the change in the coding rate of the codes in the coding unit 152 in the unicast communication mode. The third embodiment describes the change in the coding rate of the codes in a multicast communication mode. Note that a description of the broadcast that relates to the present embodiment can be substantially the same as a description of the multicast. Note that the same reference numerals are provided to elements of the present embodiment that are substantially the same as the elements of the first and second embodiments. Since the descriptions thereof can be applied to the elements of the present embodiment, the descriptions are omitted or are kept brief.

<Transmitter>

The transmitter of the present embodiment includes a transmission method determination unit 109b having different functions from the functions of the transmission method determination unit 109 of the transmitter in the second embodiment. The following describes the transmission method determination unit 109b.

Figure 11:
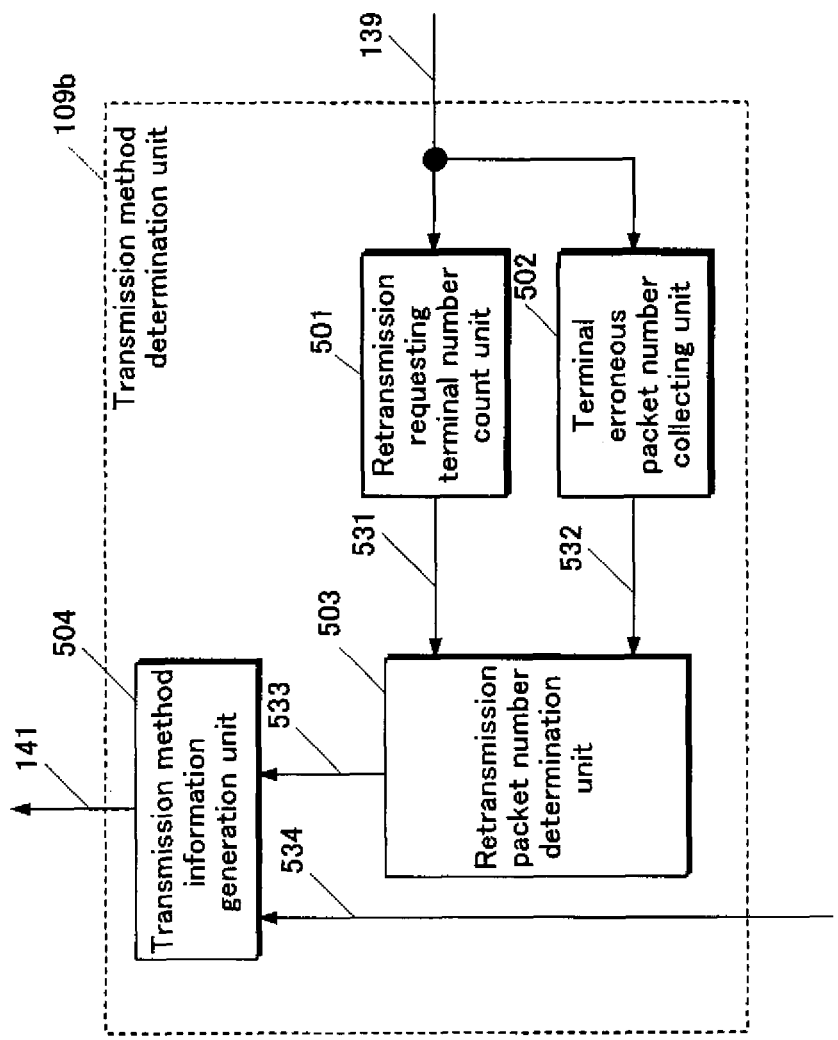
FIG. 11 is a structural diagram of a transmission method determination unit included in a transmitter of a third embodiment.

FIG. 11 is a structural diagram of the transmission method determination unit 109b of the transmitter. The transmission method determination unit 109b includes a retransmission requesting terminal number count unit 501, a terminal packet error number collecting unit 502, a retransmission packet number determination unit 503 and a transmission method information generation unit 504. The following describes a function relating in particular to determination of the number of parity packets to be retransmitted from among functions of the transmission method determination unit 109b.

The retransmission requesting terminal number count unit 501 receives the feedback information 139 as an input. The retransmission requesting terminal number count unit 501 counts the number of receivers that make transmission requests, based on the request information for retransmission, for example, included in the feedback information 139 received from each of the receivers. Then, the retransmission requesting terminal number count unit 501 outputs, to the retransmission packet number determination unit 503, retransmission requesting terminal number information 531 showing a counted value.

The terminal packet error number collecting unit 502 receives the feedback information 139 as an input. The terminal packet error number collecting unit 502 collects information on the number of erroneous information packets, for example, included in the feedback information 139 received from each of the receivers. The terminal packet error number collecting unit 502 outputs, to the retransmission packet number determination unit 503, terminal packet error number information 532 showing the number of erroneous information packets in each of the receivers.

The retransmission packet number determination unit 503 receives, as inputs, the retransmission requesting terminal number information 531 and the terminal packet error number information 532. The retransmission packet number determination unit 503 determines the number of parity packets to be retransmitted (the coding rate of the codes in the coding unit 152), and outputs, to the transmission method information generation unit 504, retransmission parity packet number information (the coding rate of the codes in the coding unit 152) 533 indicating the number of parity packets to be retransmitted (the coding rate of the codes in the coding unit 152).

The transmission method information generation unit 504 receives, as inputs, the retransmission parity packet number information 533 and another transmission method information 534. The transmission method information generation unit 504 outputs the control signal 141 including these information pieces.

Note that a concrete example of determining the number of parity packets to be retransmitted with use of the transmission method determination unit 139b is described later with reference to FIG. 14.

<Communication Between Transmitter and Receiver>

Figure 12:
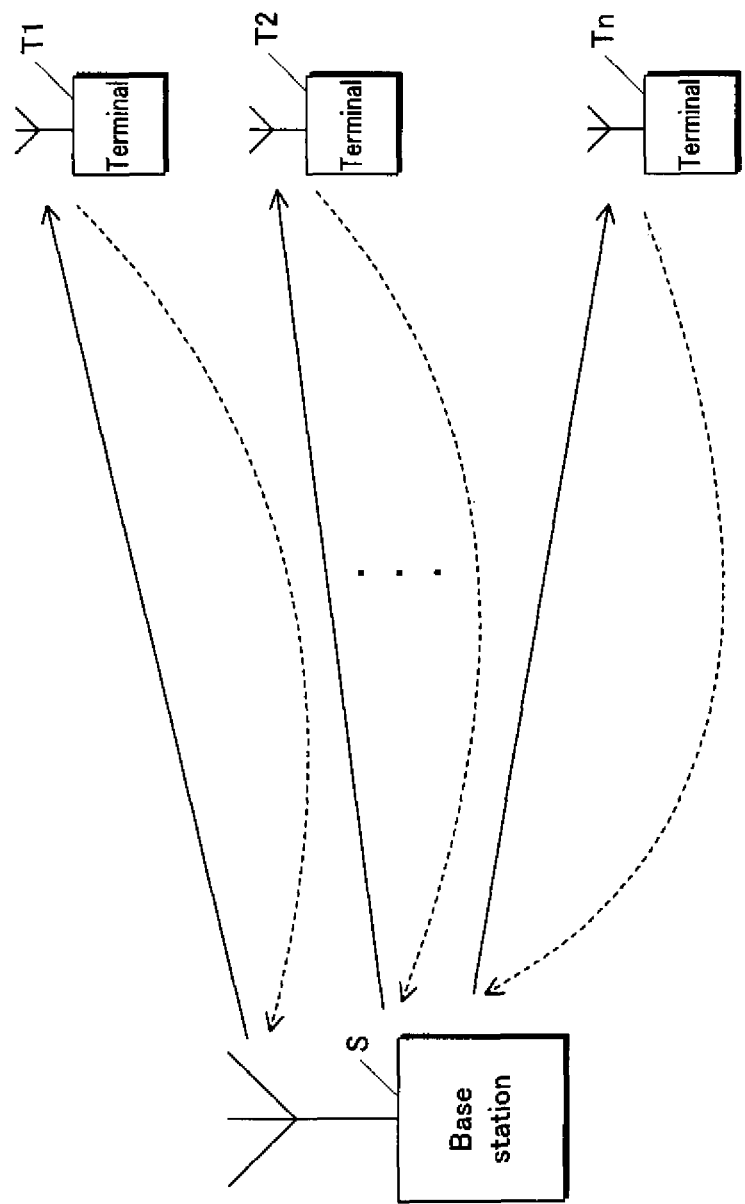
FIG. 12 is a schematic diagram showing a multicast communication.

FIG. 12 shows a conceptual diagram of the multicast communication. A base station (transmitter) S simultaneously transmits the same information to each of a plurality of terminals (receivers) T1 to Tn. Then, each of the terminals T1 to Tn transmits, to the base station S, the feedback information including the request information for retransmission, information on the number of erroneous information packets and indexes of the erroneous information packets, for example.

Figure 13:
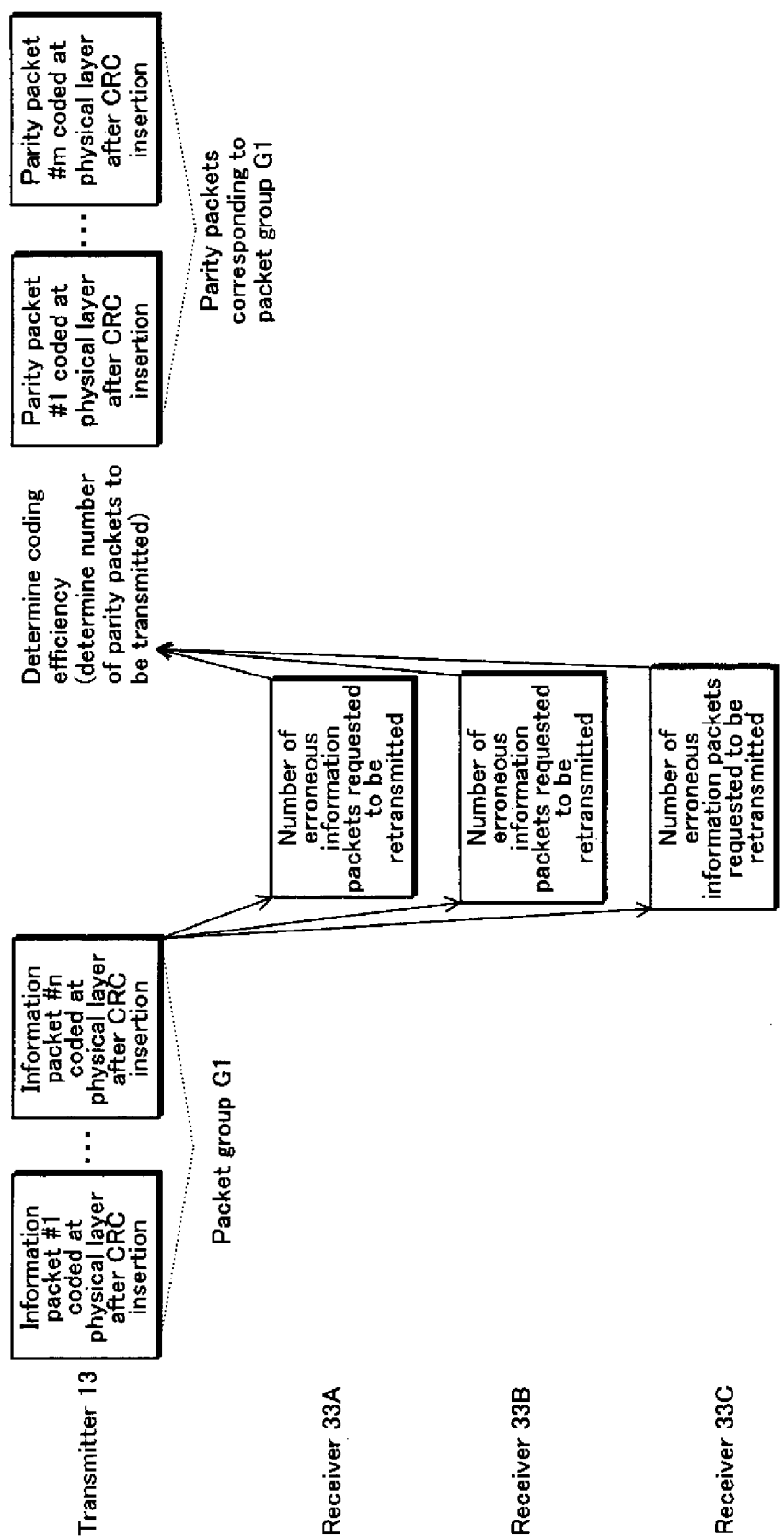
FIG. 13 shows an example of communication between the transmitter and the receiver in the third embodiment.

FIG. 13 shows an example of communication among the transmitter 13 and communication apparatuses 33A, 33B and 33C on a receiving side (receivers 33A, 33B and 33C) in the present embodiment. Note that the transmitter 13 corresponds to the base station S shown in FIG. 12, and the receivers 33A, 33B and 33C correspond to terminals T1 to Tn shown in FIG. 12.

The transmitter 13 simultaneously transmits the same information packets to each of the receivers 33A, 33B and 33C. Here, the transmitter 13 transmits the information packets #1 to #n (coded at the physical layer after the CRC insertion). These packets are collectively referred to as a packet group G1. At this time, the packet group G1 does not include parity packets that can be obtained by coding the information packets with use of the coding unit 152 shown in FIG. 8.

The receiver 33A receives information packets #1 to #n (coded at the physical layer after the CRC insertion), and transmits, to the transmitter 13, the feedback information including, for example, the retransmission request and the number of erroneous information packets, when it is presumed that the erroneous information packets exist.

Each of the receivers 33B and 33C receives information packets #1 to #n (coded at the physical layer after the CRC insertion), and transmits, to the transmitter 13, the feedback information including, for example, the retransmission request and the number of erroneous information packets, when it is presumed that the erroneous information packets exist.

The transmitter 13 receives the feedback information from each of the receivers 33A, 33B and 33C. The transmitter 13 transmits the parity packets when the feedback information includes the retransmission request. Suppose that many receivers receive the information packets from the transmitter 13 (not depicted in FIG. 13). The transmitter 13 counts the number of receivers that have made the retransmission requests, with use of the retransmission requesting terminal number count unit 501. The transmitter 13 collects the number of erroneous information packets in each of the receivers, with use of the terminal packet error number collecting unit 502. Then, the retransmission packet number determination unit 503 determines the coding rate of the codes in the coding unit 152 (the number of parity packets to be retransmitted) in accordance with the number of erroneous information packets in each of the receivers. The transmitter 13 generates parity packets #1 to #m by coding the information packets #1 to #n at the determined coding rate of the codes with use of the coding unit 152. Here, the information packets #1 to #n are stored in the storage unit 154a. The transmitter 13 inserts the CRC into each of the parity packets #1 to #m with use of the error detection code insertion unit 153, and codes, at the physical layer, the parity packets #1 to #m after the CRC insertion with use of the physical layer error correction coding unit 103. Then, the transmitter 13 transmits the parity packets #1 to #m (coded at the physical layer after the CRC insertion).

Each of the receivers 33A, 33B and 33C receives the parity packets #1 to #m (coded at the physical layer after the CRC insertion). Each of the receivers 33A, 33B and 33C obtains information packets by performing packet decoding processing on the information packets having no error and the parity packets having no error. Here, the information packets having no error are stored in the storage unit 309.

<Concrete Example of Determining Number of Parity Packets to be Retransmitted>

FIG. 14 describes a concrete example of determining the number of parity packets to be retransmitted with use of the transmission method determination unit 109b.

Suppose that: the transmitter 13 transmits information packets #1 to #7 to each of the receivers 33A, 33B and 33C; and three packets #2, #5 and #7, two packets #1, #2 and three packets #3, #4 and #6 are missing in the receivers 33A, 33B and 33C respectively. As with the descriptions given of FIG. 9, when the number of bits composing the information packets and the number of bits composing the parity packets to be retransmitted are identical, the transmitter 13 retransmits four or more parity packets, three or more parity packets and four or more parity packets to the receivers 33A, 33B and 33C, respectively. In this way, all the receivers 33A, 33B and 33C can obtain all the information packets as a result of the retransmission. Therefore, if the transmitter 13 retransmits four (that is larger by one than the maximum number of the numbers of erroneous information packets in the receivers 33A, 33b and 33C) or more parity packets, all of the receivers 33A, 33B and 33C are possibly able to obtain all the information packets. Thus, the transmitter 13 determines the number of parity packets to be retransmitted (the total number of bits composing the parity packets to be retransmitted).

Note that the number of parity packets (the coding rate of the codes in the coding unit 152) to be retransmitted may be determined so that the total number of bits composing parity packets to be retransmitted is greater than the total number of bits composing the erroneous information packets in the receiver having the maximum number of erroneous information packets from among the receivers.

According to the present embodiment, the transmitter can estimate the number of erroneous information packets in each of the receivers. Also, the transmitter can estimate the coding rate of the codes in the coding unit 152 (the number of parity packets to be retransmitted). Here, the coding rate can reduce the packet error rate at the time of the retransmission to each of the receivers. Therefore, the packet error rate of the information packets can be reduced after the retransmission in as many receivers as possible.

Note that the following example is possible. A threshold value is provided for the number of receivers that have made retransmission requests. When the number of receivers that have made the retransmission requests is equal to or greater than a first threshold value, the transmitter performs retransmission with use of the parity packets. When the number of receivers that have made the retransmission requests is equal to or smaller than a second threshold value, the transmitter performs retransmission at the physical layer (conventional retransmission). Then, when the number of receivers is equal to or smaller than the first threshold value and is equal to or greater than the second threshold value, the transmitter judges which type of retransmission methods should be adopted in accordance with an error state of the packets in each of the receivers.

Note that when the number of receivers (in each of which the packet error occurs) is small, the coding rate of the codes in the coding unit 152 is increased (the number of parity packets to be retransmitted is reduced). When the number of receivers in which the packet error occurs is large, the coding rate of the codes in the coding unit 152 is reduced (the number of parity packets to be retransmitted is increased). Thus, it is possible to realize both the improvement of the data transmission efficiency and the reduction of the packet error rate at the time of retransmission.

Fourth Embodiment

The following describes a fourth embodiment of the present invention with reference to drawings. A communication apparatus on a transmitting side (transmitter) in the fourth embodiment reduces the number of retransmissions by performing retransmission at the physical layer as well as the retransmission with use of the parity packets as described in the first embodiment. Note that the same reference numerals are provided to elements of the present embodiment that are substantially the same as the elements of the first embodiment. Since the descriptions thereof can be applied to the elements of the present embodiment, the descriptions are omitted or are kept brief.

<Transmitter>

The transmitter of the present embodiment has a physical layer error correction coding unit 103c having different functions from the functions of the physical layer error correction coding unit 103 included in the transmitter 11 of the first embodiment. The following describes the physical layer error correction coding unit 103c.

Figure 15:
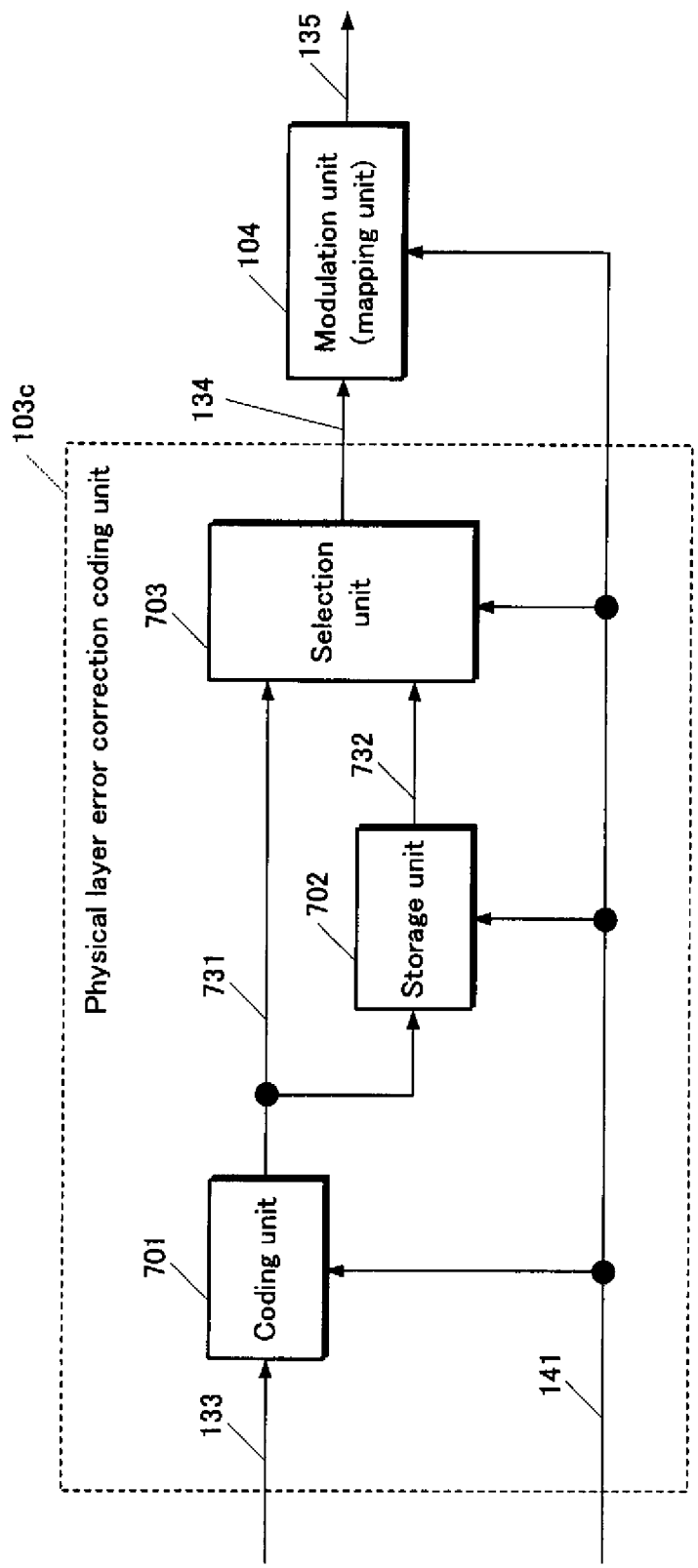
FIG. 15 is a structural diagram of a physical layer error correction coding unit included in a transmitter of a fourth embodiment.

FIG. 15 is a structural diagram of the physical layer error correction coding unit 103c and the modulation unit 104 included in the transmitter. The physical layer error correction coding unit 103c includes a coding unit 701, a storage unit 702 and a selection unit 703.

The coding unit 701 receives the transmission packet 133 and the control signal 141 as inputs. The coding unit 701 codes data of the transmission packets 133 based on the coding rate of the error correction codes at the physical layer, for example, shown by the control signal 141, and outputs coded data 731 to each of the storage unit 702 and the selection unit 703.

The storage unit 702 receives the coded data 731 as an input. The storage unit 702 receives the control signal 141 as an input. When the control signal 141 indicates transmission of the retransmission data, the storage unit 702 outputs, as retransmission data 732, the coded data stored therein to the selection unit 703. Here, the coded data that has been outputted from the storage unit 702 as retransmission data is coded data of the information packet corresponding to the information packet having an erroneous packet number in the receiver.

The election unit 703 receives, as inputs, the coded data 731, the retransmission data 732 and the control signal 141. When the control signal 141 does not indicate transmission of the retransmission data, the selection unit 703 selects and outputs the coded data 731 to the modulation unit 104 as the transmission data 134. When the control signal 141 indicates transmission of the retransmission data, the selection unit 703 selects and outputs the retransmission data 732 (the coded data corresponding to the packet number of each of the erroneous information packets in the receiver) to the modulation unit 104 as the transmission data 134. Also, the selection unit 703 selects and outputs the coded data 731 (the coded data of the parity packets) to the modulation unit 104 as the transmission data 134.

The modulation unit (mapping unit) 104 receives the transmission data 134 and the control signal 141 as inputs. The modulation unit 104 modulates the transmission data 134 based on the modulation method shown by the control signal 141, and outputs the base band signal 135 obtained by the modulation.

<Receiver>

Figure 16:
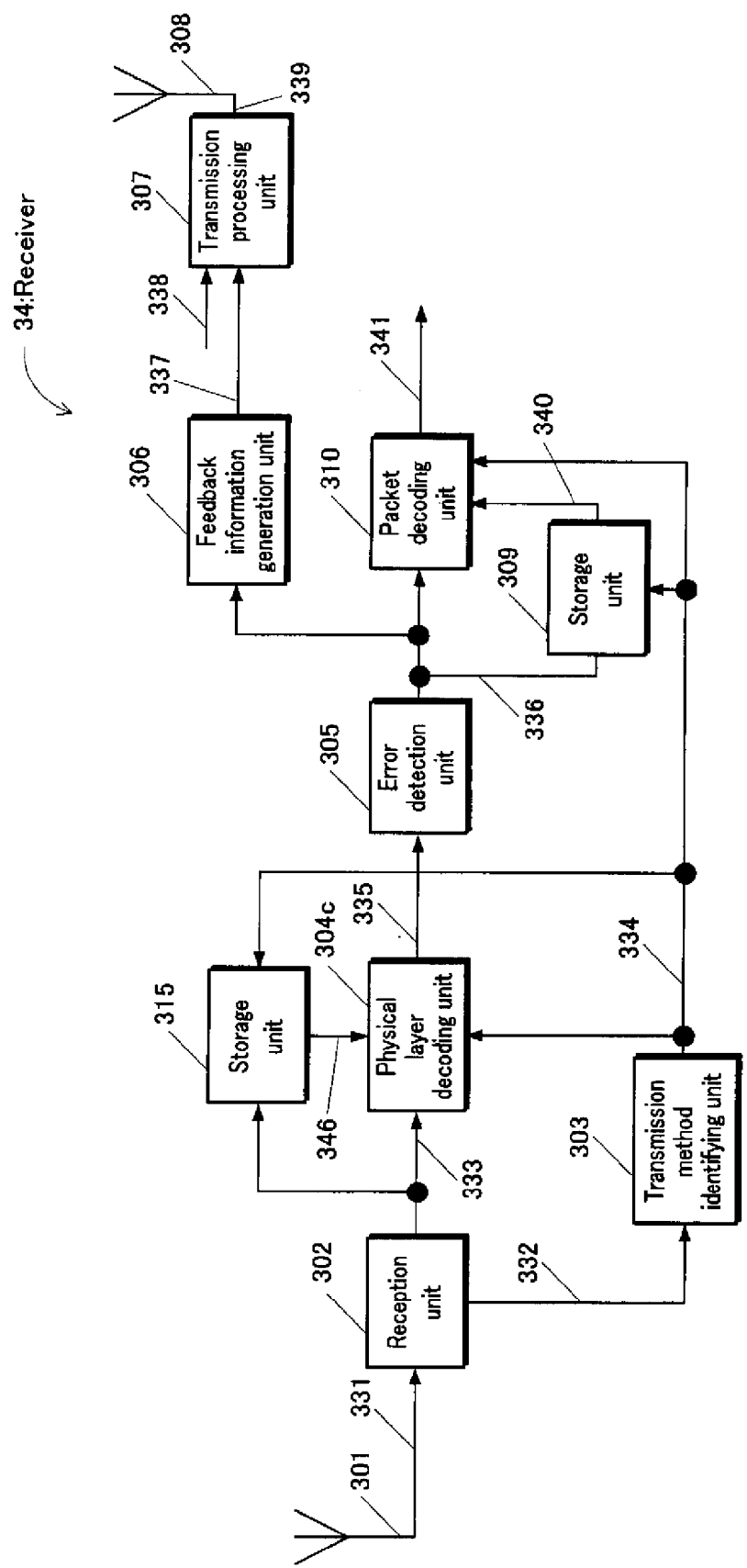
FIG. 16 is a structural diagram of a receiver of the fourth embodiment.

FIG. 16 is a structural diagram of a communication apparatus 34 on a receiving side (receiver 34) in the present embodiment. The receiver 34 shown in FIG. 16 is different from the receiver 31 shown in FIG. 4 in that the receiver 34 has a function for supporting retransmission at the physical layer. That is, the reception unit 34 includes a physical layer decoding unit 304c having different functions from the functions of the physical layer decoding unit 304 of the receiver 31 shown in FIG. 31. The receiver 34 further includes a storage unit 315.

The storage unit 315 receives reception data 333 as an input. Note that the reception data 333 relates to the log likelihood ratio as an input. The storage unit 315 receives the communication method information 334 as an input. When the communication method information 334 indicates that data is retransmission data, the storage unit 315 outputs stored data 346 to the physical layer decoding unit 304c.

The physical layer decoding unit 304c receives, as inputs, the reception data 333, the data 346 and the communication method information 334. When the communication method information 334 indicates that data is not retransmission data, the physical layer decoding unit 304c decodes the reception data 333 of the information packets, and outputs decoded data 307 to the error detection unit 305. When the communication method information 334 indicates that data is retransmission data, on the other hand, the physical layer decoding unit 304c performs decoding processing with use of the reception data 333 of the information packets and data 346 of the information packets to obtain decoded data 335, and outputs the decoded data 335 to the error detection unit 305. The physical layer decoding unit 304c also decodes the reception data 333 of the parity packets, and outputs decoded data 307 to the error detection unit 305.

<Communication Between Transmitter and Receiver>

Figure 17:
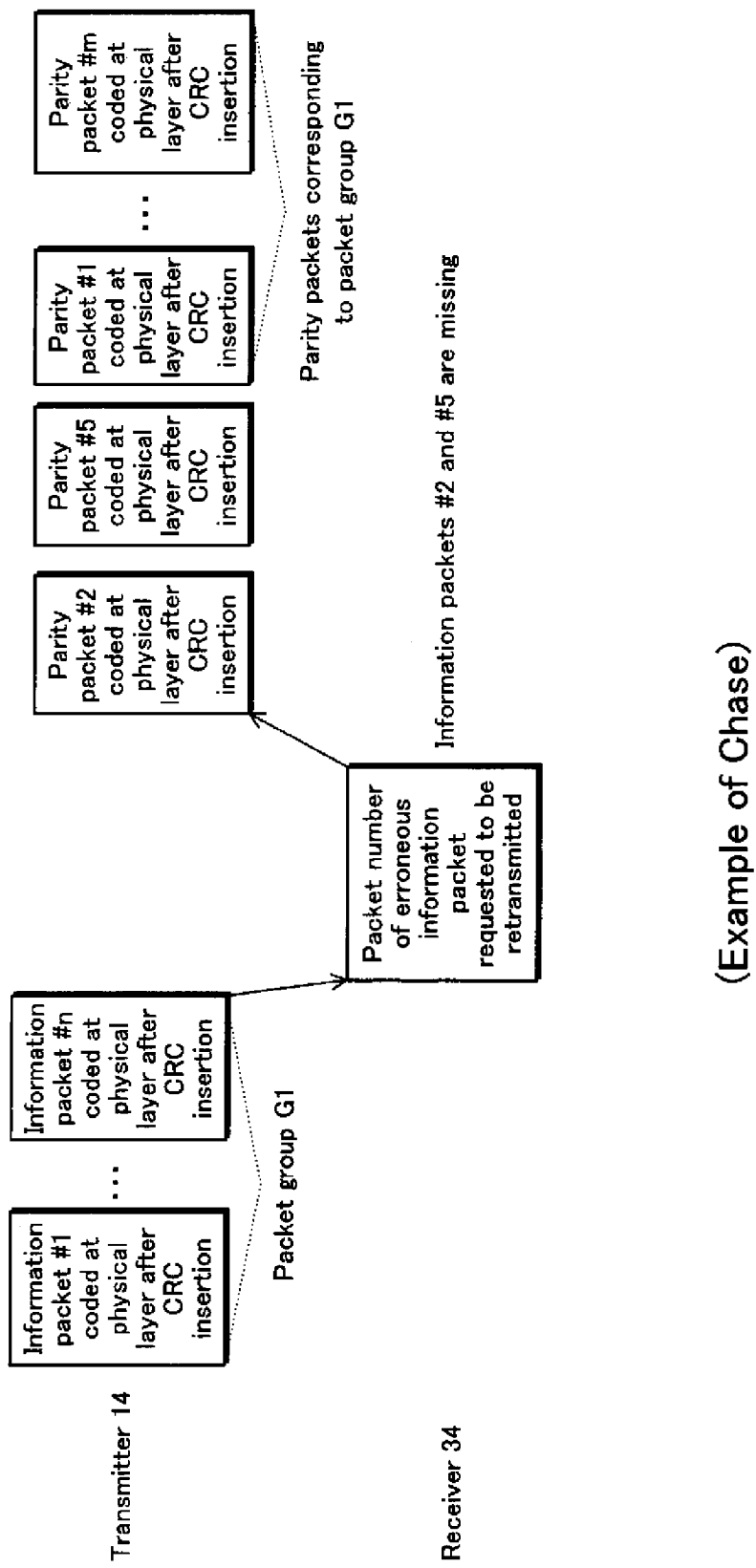
FIG. 17 shows an example of communication between the transmitter and the receiver in the fourth embodiment.

FIG. 17 shows an example of communication between the transmitter 14 and the receiver 34 in the present embodiment.

The transmitter 14 transmits the information packets #1 to #n (coded at the physical layer after the CRC insertion). These packets are collectively referred to as a packet group G1. At this time, the packet group G1 does not include parity packets that can be obtained by coding the information packets with use of the coding unit 152 shown in FIG. 2.

The receiver 34 receives the information packets #1 to #n (coded at the physical layer after the CRC insertion). Then, the receiver 34 performs, on the information packets #1 to #n, the decoding processing at the physical layer with use of the physical layer decoding unit 304c, and the error detection processing with use of the error detection unit 305. In the following, the receiver 34 transmits, to the transmitter 14, the feedback information including, for example, a retransmission request and packet numbers of the erroneous information packets #2 and #5, when it is supposed that that packets #2 and #5 are erroneous.

The transmitter 14 receives the feedback information. When the feedback information includes the retransmission request, the transmitter 14 transmits the parity packets #1 to #m (coded at the physical layer after the CRC insertion) together with the information packets #2 and #5 whose packet numbers are packet numbers of erroneous information packets. Here, the information packets #2 and #5 have been coded at the physical layer after the CRC insertion, and stored in the storage unit 702.

The receiver 34 receives the parity packets #1 to #m (coded at the physical layer after the CRC insertion) as well as the information packets #2 and #5 (coded at the physical layer after the CRC insertion). The receiver 34 performs, on the data 346 stored in the storage unit 315 and the reception data 333 of the information packets #2 and #5, decoding processing at the physical layer the with use of the physical layer decoding unit 304c, and the error detection with use of the error detection unit 305. The receiver 34 performs, on the parity packets #1 to #m (coded at the physical layer after the CRC insertion), the decoding processing at the physical layer with use of the physical layer decoding unit 304c, and the error detection processing with use of the error detection unit 305. Then, the receiver 34 obtains the information packets by performing decoding processing with use of the information packets having no error and the parity packets having no error, with use of the packet decoding unit 310.

According to the present embodiment, even when the packet error occurs in the receiver 34, it is possible to greatly reduce the possibility that the receiver 34 makes a retransmission request, by performing both the retransmission with use of the parity packets and the retransmission at the physical layer. Note that the number of parity packets to be retransmitted (the coding rate of the codes in the coding unit 152) may be changed in accordance with the number of erroneous packets, as described in the second and third embodiments.

Note that it is possible to combine the retransmission method described in the fourth embodiment (combination of the retransmission with use of the parity packets and the retransmission at the physical layer) and the retransmission methods described in the first to third embodiments (retransmission method of performing retransmission with use of the parity packets). In this case, the number of erroneous information packets is important. Therefore, it is preferable that the transmitter selects one method from among the retransmission method described in the fourth embodiment and the retransmission methods described in the first to third embodiments in accordance with the number of erroneous information packets. When the number of erroneous information packets is large, it is preferable to select the retransmission method described in the fourth embodiment in order to reduce the possibility of packet error occurrence after the retransmission. When the number of erroneous information packets is small, on the other hand, it is preferable to select the retransmission method described in the first to third embodiments. It is natural that when the number of erroneous information packets is small, it is possible to select a conventional retransmission method called "chase combining" (shown in the Non Patent Literature 2), that is, the retransmission method of retransmitting the erroneous packets at the physical layer. Note that selection methods and criteria for selecting the retransmission method described in the fourth embodiment and the retransmission methods described in the first to third embodiments are not limited to the above-state methods and criteria.

Fifth Embodiment

The following describes a fifth embodiment of the present invention with reference to drawings. A communication apparatus on a transmitting side (transmitter) in the fifth embodiment is different from the transmitter of the fourth embodiment in a retransmission structure at the physical layer. However, a communication apparatus on a receiving side (receiver) in the fifth embodiment has a structure shown in FIG. 16. Note that the same reference numerals are provided to elements of the present embodiment that are substantially the same as the elements of the first to fourth embodiments. Since the descriptions thereof can be applied to the elements of the present embodiment, the descriptions are omitted or are kept brief.

<Transmitter>

The transmitter of the present embodiment has a physical layer error correction coding unit 103d having different functions from the functions of the physical layer error correction coding unit 103c included in the transmitter of the fourth embodiment. The following describes the physical layer error correction coding unit 103d.

Figure 18:
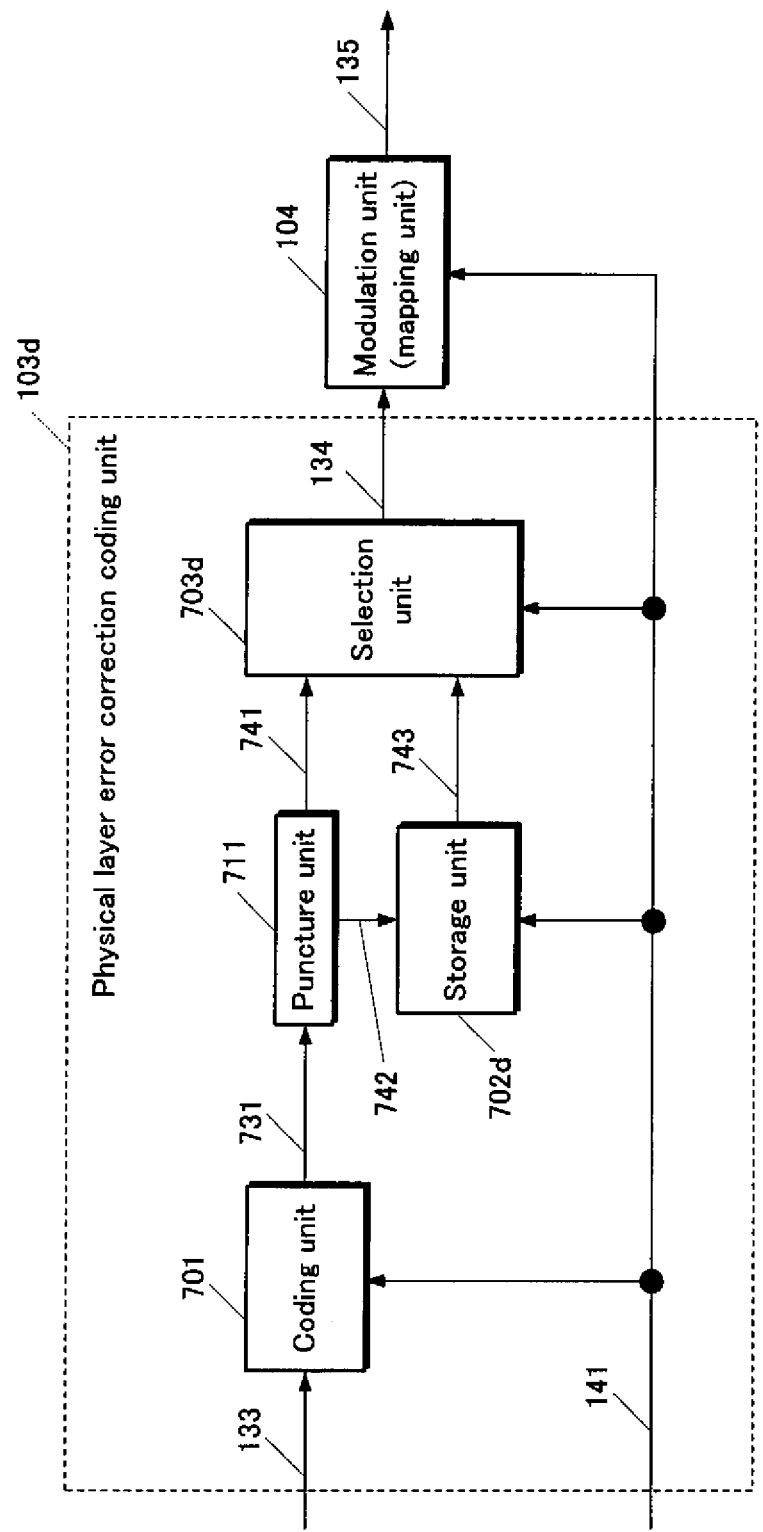
FIG. 18 is a structural diagram of a physical layer error correction coding unit included in a transmitter of a fifth embodiment.

FIG. 18 is a structural diagram showing the physical layer error correction coding unit 103d and the modulation unit 104 included in the transmitter. The physical layer error correction coding unit 103d includes the coding unit 701, a puncture unit 711, a storage unit 702d and a selection unit 703d.

The puncture unit 711 receives the coded data 731 as an input. The puncture unit 711 determines bits that are not to be transmitted, in accordance with a certain standard. The puncture unit 711 outputs, to the selection unit 703, coded data 741 of bits other than the determined bits that are not to be transmitted (hereinafter, also referred to as "coded data after the puncture" in some cases). The puncture unit 711 also outputs, to the storage unit 702d, coded data 742 of the determined bits (hereinafter, also referred to as "thinned data" in some cases).

The storage unit 702 receives thinned data 742 as an input and stores the thinned data 742. The storage unit 702d receives the control signal 141 as an input. When the control signal 141 indicates transmission of the retransmission data, the storage unit 702d outputs the thinned data stored therein to the selection unit 703 as the retransmission data 743 (see FIG. 27). Here, the thinned data that has been outputted from the storage unit 702d as retransmission data is thinned data relating to packet numbers of the erroneous information packets.

The selection unit 703d receives, as inputs, the coded data 741 after the puncture, the retransmission data 743 and the control signal 141. When the control signal 141 does not indicate transmission of the retransmission data, the selection unit 703d selects and outputs the coded data 741 after the puncture as the transmission data 134. When the control signal 141 indicates transmission of the retransmission data, on the other hand, the selection unit 703d selects and outputs the retransmission data 732 (thinned data relating to packet numbers of the erroneous information packets in the receiver) to the modulation unit 104 as the transmission data 134. Also, the selection unit 703d selects and outputs the coded data 731 (relating to the parity packets) after the puncture to the modulation unit 104 as the transmission data 134.

<Communication Between Transmitter and Receiver>

Figure 19:
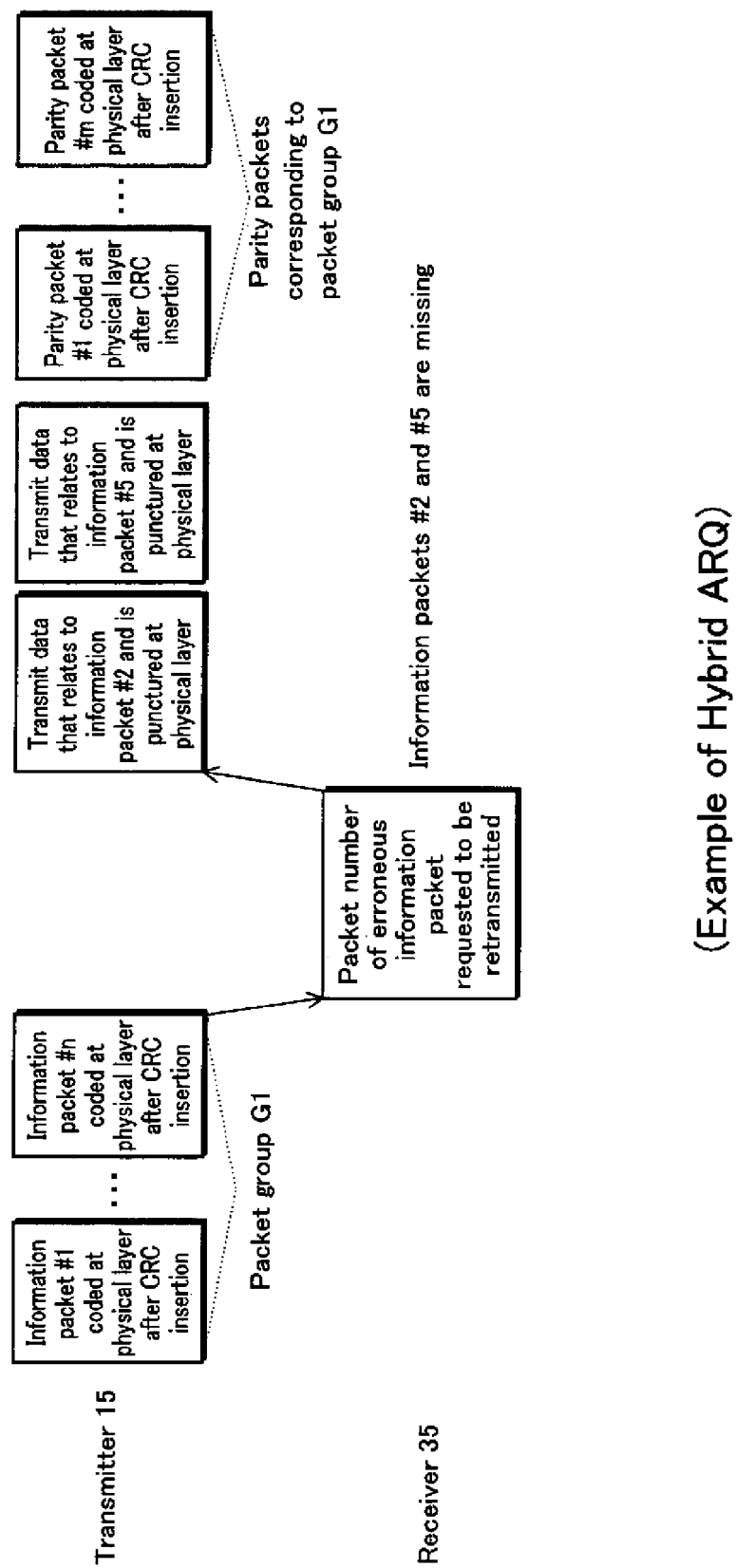
FIG. 19 shows an example of communication between the transmitter and the receiver in the fifth embodiment.

FIG. 19 shows an example of communication between the transmitter 15 and the receiver 35 in the present embodiment.

As shown in FIG. 19, the transmitter 15 transmits the information packets #1 to #n (coded at the physical layer after the CRC insertion). These packets are collectively referred to as a packet group G1. At this time, the packet group G1 does not include parity packets that can be obtained by coding the information packets with use of the coding unit 152 of the packet data coding unit 102 shown in FIG. 2.

The receiver 35 receives the information packets #1 to #n (coded at the physical layer after the CRC insertion). Then, the receiver 35 performs, on the information packets #1 to #n (coded at the physical layer after the CRC insertion), the decoding processing at the physical layer with use of the physical layer decoding unit 304c, and the error detection processing with use of the error detection unit 305. In the following, the receiver 35 transmits, to the transmitter 15, the feedback information including, for example, a retransmission request and packet numbers of the erroneous information packets #2 and #5, when it is presumed that packets #2 and #5 are erroneous.

When the transmitter 15 receives the feedback information including the retransmission request from the receiver 35, the transmitter 14 transmits the parity packets #1 to #m (coded at the physical layer after the CRC insertion) as well as bits relating to the information packets #2 and #5 (stored in the storage unit 702d) whose packet numbers are packet numbers of erroneous information packets. Here, the bits relating to the information packets are bits punctured (not transmitted) at the time of the transmission of the information packets #2 and #5 at the physical layer.

The receiver 35 receives the parity packets #1 to #m (coded at the physical layer after the CRC insertion) as well as data of bits relating to the information packets #2 and #5 (coded at the physical layer after the CRC insertion). The receiver 35 performs, on the data 346 stored in the storage unit 315 and the reception data 333 relating to the information packets #2 and #5, decoding processing at the physical layer with use of the physical layer decoding unit 304c, and the error detection processing with use of the error detection unit 305. The receiver 35 also performs, on the parity packets #1 to #m (coded at the physical layer after the CRC insertion), the decoding processing with use of the physical layer decoding unit 304c, and the error detection processing with use of the error detection unit 305. Then, the receiver 35 obtains the information packets by performing the packet decoding processing on the information packets having no error and the parity packets having no error, with use of the packet decoding unit 310.

According to the present embodiment, even when the packet error occurs in the receiver 35, it is possible to greatly reduce the possibility that the receiver 35 makes a retransmission request, by performing both the retransmission with use of the parity packets and the retransmission at the physical layer. Note that the number of parity packets to be retransmitted (the coding rate of the codes in the coding unit 152) may be changed in accordance with the number of erroneous packets, as described in the second and third embodiments.

Note that it is possible to combine the retransmission method described in the fifth embodiment (combination of the retransmission with use of the parity packets and the retransmission at the physical layer) and the retransmission method described in the first to third embodiments (retransmission method of performing retransmission with use of the parity packets). In this case, the number of erroneous information packets is important. Therefore, it is preferable that the transmitter selects a retransmission method from among the retransmission method described in the fifth embodiment and the retransmission methods described in the first to third embodiments in accordance with the number of erroneous information packets. When the number of erroneous information packets is large, it is preferable to select the retransmission method described in the fifth embodiment in order to reduce the possibility of packet error occurrence after the retransmission. When the number of erroneous information packets is small, on the other hand, it is preferable to select the retransmission method described in the first to third embodiments. It is natural that when the number of erroneous information packets is small, it is possible to select a conventional retransmission method (Incremental redundancy) of transmitting bits punctured (not transmitted) at the time of initial transmission of the erroneous packets at the physical layer (shown in Non Patent Literature 1) (FIG. 27). Note that selection methods and criteria for selecting the retransmission method described in the fifth embodiment and the retransmission methods described in the first to third embodiments are not limited to the above-stated methods and criteria. Also, the method of performing retransmission at the physical layer may be switched to the retransmission method described in the fourth embodiment.

Sixth Embodiment

The following describes a sixth embodiment of the present invention with reference to drawings. The present embodiment relates to a method of configuring packets to be retransmitted in a communication apparatus on a transmitting side (transmitter).

<Method of Configuring Packets to be Retransmitted>

Figure 20:
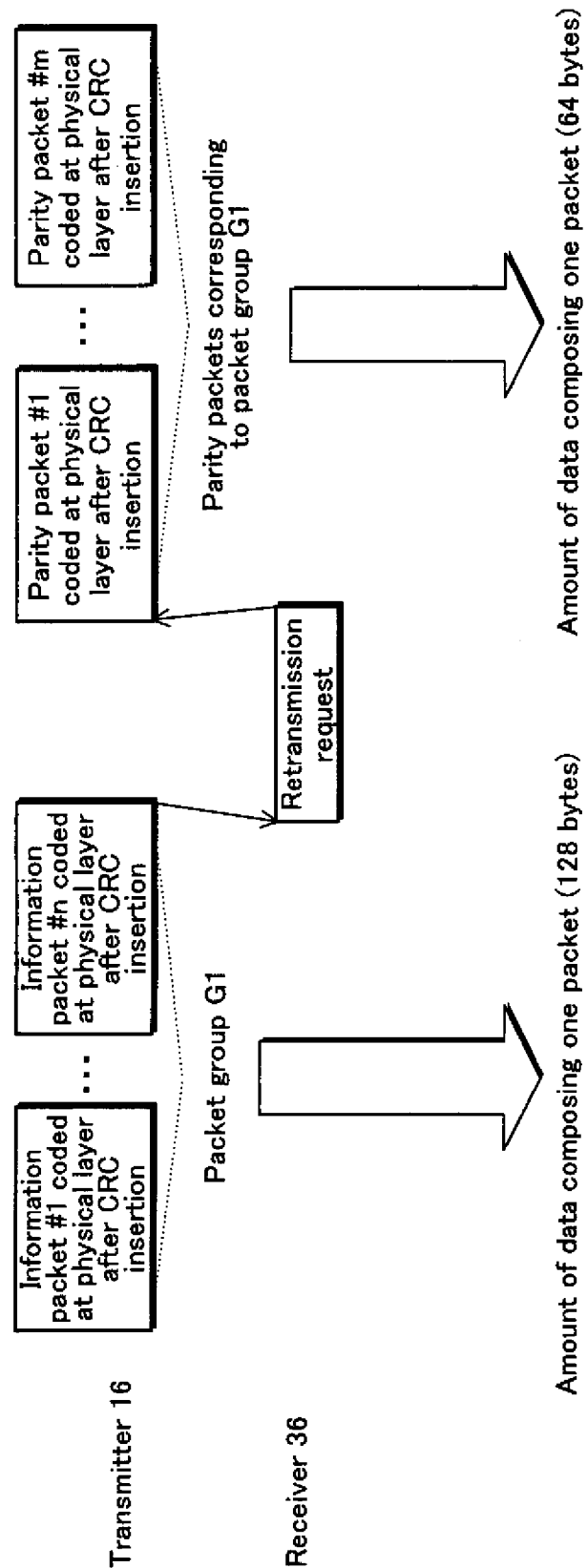
FIG. 20 shows an example of a frame structure when a transmitter of a sixth embodiment performs retransmission.

FIG. 20 shows an example of a frame structure at the time of retransmission in the transmitter of the present embodiment. Note that the transmitter has structures shown in FIGS. 1 and 2.

The transmitter 16 transmits the information packets #1 to #n (coded at the physical layer after the CRC insertion). In this case, suppose that the data amount of each of the information packets #1 to #n before the CRC insertion is 128 bytes, for example.

Then, the transmitter 16 transmits the parity packets #1 to #m (coded at the physical layer after the CRC insertion), when it is presumed that a communication apparatus 36 on a receiving side (receiver 36) has made a retransmission request. In this case, the transmitter 16 generates the parity packets such that a size of one parity packet before the CRC insertion is smaller than a size of one information packet before the CRC insertion in order to maintain reception quality at the time of retransmission. For example, the data amount of one parity packet before the CRC insertion is 64 bytes.

It is possible to reduce the number of bits (to be eliminated) of the retransmission data by making the size of each of the parity packets #1 to #m before the CRC insertion smaller than the size of each of the information packets #1 to #n before the CRC insertion as described in the above. Thus, it is possible to obtain an effect that the packet error is highly likely to be prevented at the time of first retransmission.

Note that the above-stated data amount of one information packet and the data amount of one parity packet are merely examples. Therefore, any data amount is possible as long as the data amount of one parity packet is smaller than the data amount of one information packet.

Also, the present embodiment can be combined with any of the other embodiments. For example, it is possible to adopt the method of transmitting (retransmitting) the parity packets or the method of making the number of bits composing the parity packets smaller than the number of bits composing the information packets. Also, in a case where the parity packets are transmitted (retransmitted) a plurality of times, a method may be adopted of decreasing the number of bits composing the parity packets as the number of retransmissions increases.

Seventh Embodiment

The following describes a seventh embodiment of the present invention with reference to drawings. The present embodiment relates to a method of configuring packets to be retransmitted in a communication apparatus on a transmitting side (transmitter) when the parity packets are retransmitted a plurality of times. Note that the same reference numerals are provided to elements of the present embodiment that are the same as the elements of the first embodiment. Since the descriptions thereof can be applied to the elements of the present embodiment, the descriptions are omitted or are kept brief.

<Transmitter>

The transmitter of the present embodiment includes a packet data coding unit 102*f* having different functions from the functions of the packet data coding unit 102 of the transmitter 11 of the first embodiment, and the transmission method determination unit 109 outputs the control signal 141 including the retransmission number information showing how many times the retransmission has been performed. The following describes the packet data coding unit 102*f*.

Figure 21:
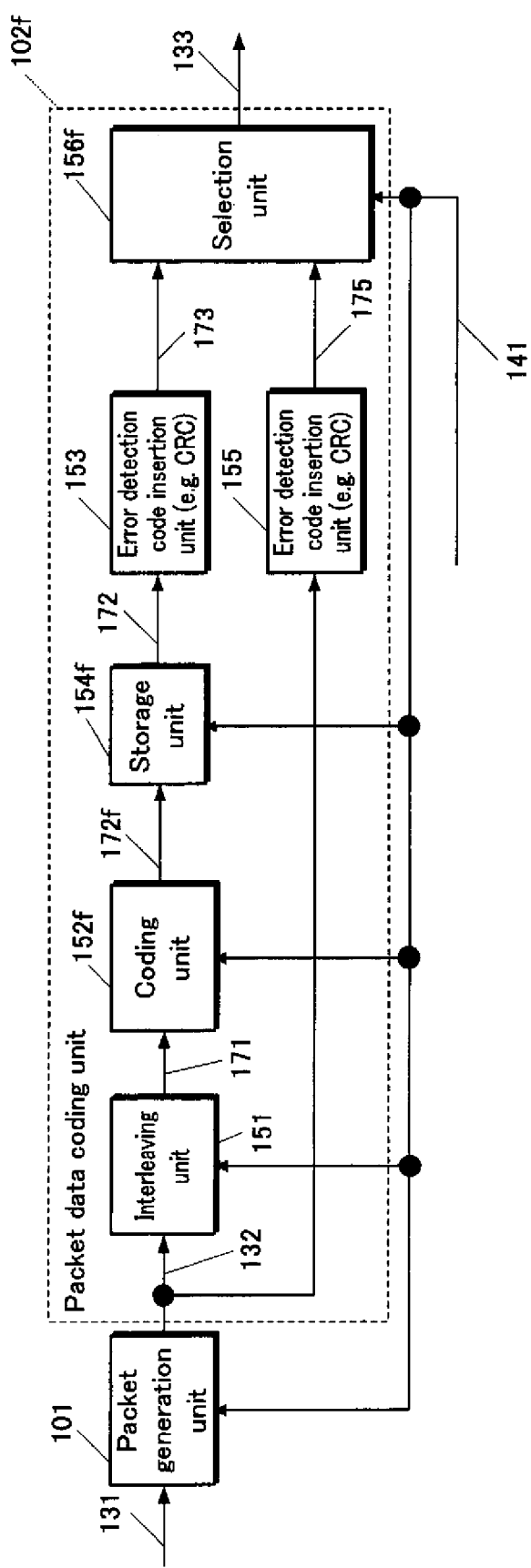
FIG. 21 is a structural diagram of a packet generation unit and a packet data coding unit that are included in a transmitter of a seventh embodiment.

FIG. 21 is a structural diagram of the packet generation unit 101 and the packet data coding unit 102*f* of the transmitter. The following describes how the packet data coding unit 102*f* is different from the packet data coding unit 102 shown in FIG. 2. The packet data coding unit 102*f* has a coding unit 152*f* instead of the coding unit 152. The packet data coding unit 102*f* does not have the storage unit 154 between the error detection code insertion unit 153 and a selection unit 156*f*. Instead, the packet data coding unit 102*f* has a storage unit 154*f* between the coding unit 152*f* and the error detection code insertion unit 153. The reasons for these is to decrease the size of one parity packet each time the transmitter of the present embodiment performs retransmission with use of the parity packet, in a case where the transmitter performs retransmission a plurality of times.

The coding unit 152*f* receives the interleaved data 171 and the control signal 141 as inputs. The coding unit 152*f* generates parities by coding the interleaved data 171 based on the coding rate of codes or the coding method, for example, shown by the control signal 141, and outputs the generated parities 172*f* to the storage unit 154*f*.

The storage unit 154*f* receives the parities 172*f* as inputs and stores therein the parities 172. The storage unit 154*f* receives the control signal 141 as an input. When the control signal 141 indicates transmission of the retransmission data, the storage unit 154f generates parity packets with use of the parities based on the retransmission number information shown by the control signal 141 such that the size of one parity packet decreases as the number of retransmissions increases. The storage unit 154f outputs the generated parity packets 172 to the error detection code insertion unit 153. Here, the size of one parity packet before the CRC insertion at the time of the first retransmission should be equal to or larger than the size of the one information packet before the CRC, for example.

<Method of Configuring Packets to be Retransmitted>

Figure 22:
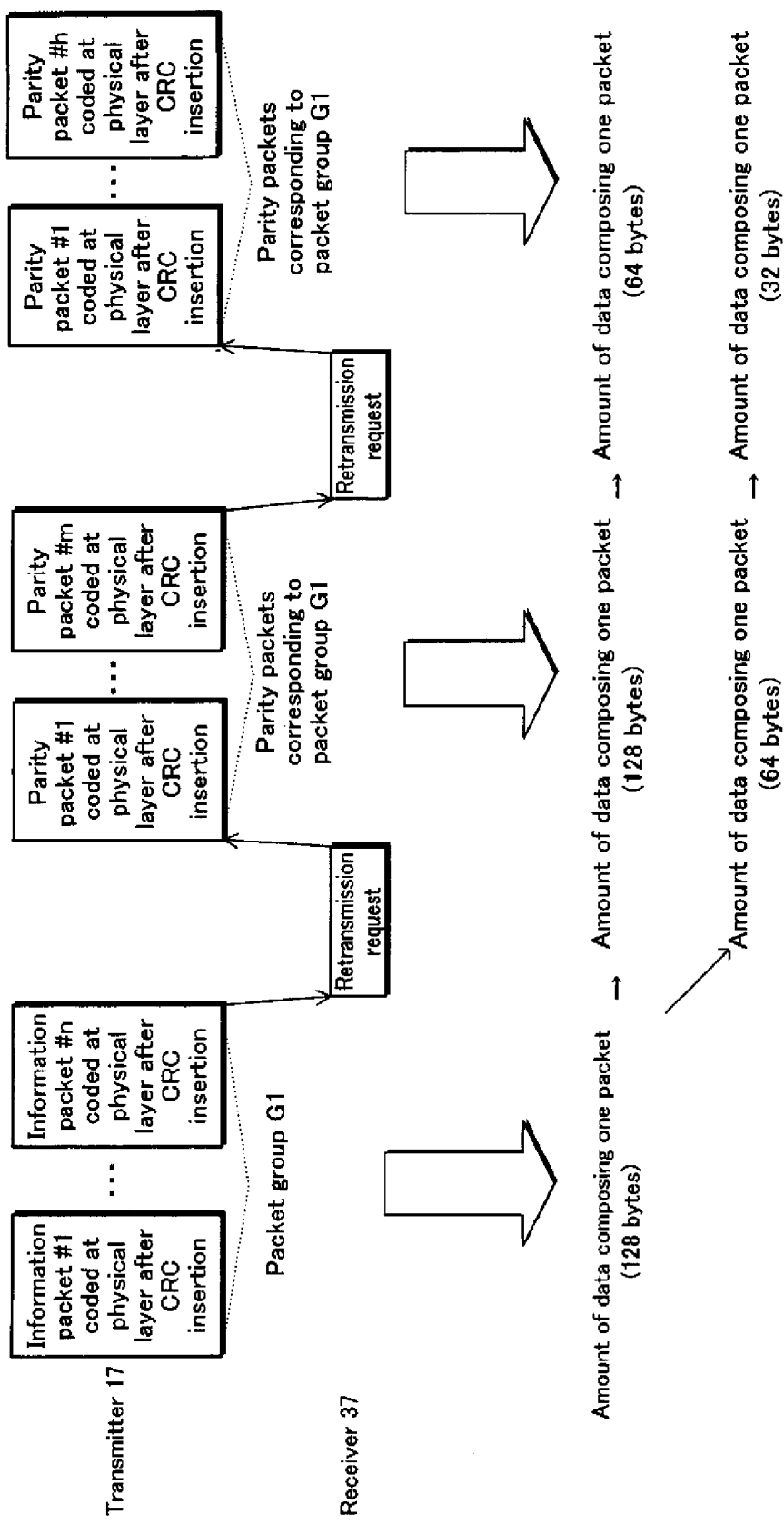
FIG. 22 shows an example of a frame structure when the transmitter of the seventh embodiment performs retransmission.

FIG. 22 shows a concrete example of a frame structure at the time of retransmission in a communication apparatus on a transmitting side (transmitter) in the present embodiment.

The following describes the concrete example.

A transmitter 17 transmits the information packets #1 to #n (coded at the physical layer after the CRC insertion). In this case, suppose that the amount of data composing each of the information packets #1 to #n before the CRC insertion is 128 bytes, for example.

Then, the transmitter 17 generates parity packets with use of the parities stored in the storage unit 154f of the packet data coding unit 102f, and transmits the parity packets #1 to #m (coded at the physical layer after the CRC insertion), when it is presumed that a communication apparatus 37 on a receiving side (receiver 37) has made a retransmission request. In this case, the size of one parity packet before the CRC insertion at the time of initial transmission should be 128 bytes which is equal to the size of one information packet before the CRC.

Then, the transmitter 17 generates parity packets with use of the parities stored in the storage unit 154f of the packet data coding unit 102, and transmits the parity packets #1 to #h (coded at the physical layer after the CRC insertion), when it is presumed that the receiver 37 has made a retransmission request. In this case, it is important that the size of one parity packet before the CRC insertion at the time of the second retransmission is smaller than the size of one parity packet before the CRC insertion at the time of the first retransmission. The size of one parity packet before the CRC insertion at the time of the second retransmission is 64 bytes, for example, that is smaller than the size of one parity packet before the CRC insertion at the time of the first retransmission.

The following describes another concrete example.

The transmitter 17 transmits the information packets #1 to #n (coded at the physical layer after the CRC insertion). In this case, suppose that the amount of data composing each of the information packets #1 to #n before the CRC insertion is 128 bytes, for example.

Then, the transmitter 17 transmits the parity packets #1 to #m (coded at the physical layer after the CRC insertion), when it is presumed that the receiver 37 has made a retransmission request. In this case, the size of one parity packet before the CRC insertion at the time of the first retransmission is 64 bytes that is smaller than the size of one information packet before the CRC insertion.

Then, the transmitter 17 retransmits the parity packets (coded at the physical layer after the CRC insertion), when it is presumed that the receiver 37 has made a retransmission request. In this case, it is important that the size of one parity packet before the CRC insertion at the time of the second retransmission is smaller than the size of one parity packet before the CRC insertion at the time of the first retransmission. The size of one parity packet before the CRC insertion at the time of the second retransmission is 32 bytes, for example, that is smaller than the size of one parity packet before the CRC insertion at the time of the first retransmission.

Note that the above-stated data amount of one information packet and the data amount of one parity packet at the time of each of the first and second retransmissions are merely examples. Therefore, any data amount is possible as long as the data amount of one parity packet at the time of the second retransmission is smaller than the data amount of one parity packet at the time of the first retransmission.

Thus, the number of bits (to be eliminated) of the transmission data can be reduced by making the size of one packet smaller as the number of retransmissions increases as described in the above. This improves the reception quality.

Eighth Embodiment

The following describes an eighth embodiment of the present invention with reference to drawings. The present embodiment relates to a method of configuring packets to be retransmitted in a communication apparatus on a transmitting side (transmitter) in a case of alternately performing retransmission with use of the parity packets and retransmission with use of the information packets. Note that the same reference numerals are provided to elements of the present embodiment that are substantially the same as the elements of the first to seventh embodiments. Since the descriptions thereof can be applied to the elements of the present embodiment, the descriptions are omitted or are kept brief.

<Transmitter>

A transmitter of the present embodiment has a packet data coding unit 102g having different functions from the functions of the packet data coding unit 102f of the transmitter of the seventh embodiment. The transmission method determination unit 109 outputs the control signal 141 including retransmission number information showing how many times the retransmission has been performed, as described in the seventh embodiment. The following describes the packet data coding unit 102g.

Figure 23:
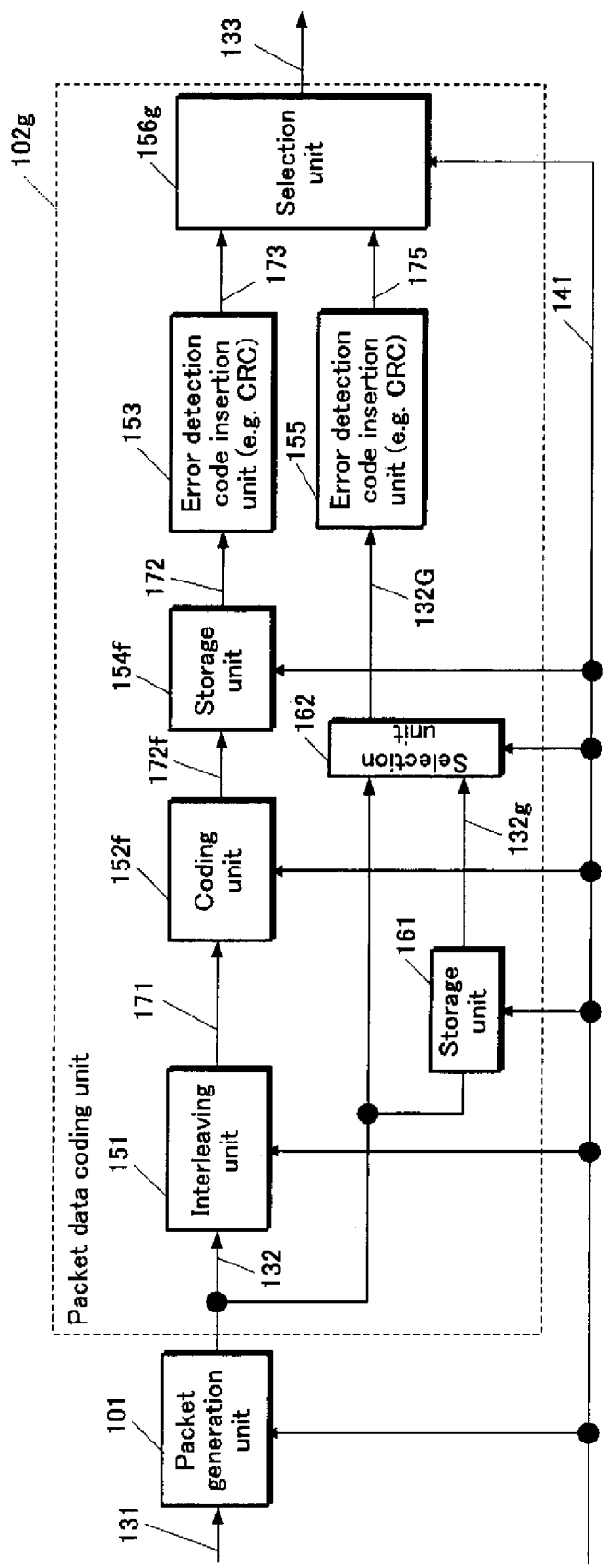
FIG. 23 is a structural diagram of a packet generation unit and a packet data coding unit that are included in a transmitter of an eighth embodiment.

FIG. 23 is a structural diagram of the packet generation unit 101 and the packet data coding unit 102g in the transmitter. The following shows how the packet data coding unit 102g is different from the packet data coding unit 102f shown in FIG. 21. The packet data coding unit 102g has a selection unit 156g instead of the selection unit 156, and further includes a storage unit 161 and a selection unit 162. The reason for these is to retransmit the information packets at a layer at which signal processing is performed earlier than at the physical layer (e.g. application layer) in the transmitter of the present invention. Note that when the control signal 141 indicates transmission of the retransmission data and the retransmission number shown by the retransmission number information of the control signal 141 is an odd number, the storage unit 154f outputs the parity packets 172.

The storage unit 161 receives the information packets 132 as inputs. The storage unit 161 receives the control signal 141 as an input. In a case where: the control signal 141 indicates transmission of the retransmission data; and the retransmission number shown by the retransmission number information of the control signal 141 is an even number, the storage unit 161 reconfigures the stored information packets so that the size of one information packet decreases as the retransmission number increases, and outputs information packets 132g.

The selection unit 162 receives the information packets 132, the information packets 132g and the control signal 141 as inputs. When the control signal 141 does not indicate transmission of the retransmission data, the selection unit 162 selects and outputs the information packet 132 to the error detection code insertion unit 155 as the information packet 132G. In a case where: the control signal 141 indicates transmission of the retransmission data; and the retransmission number shown by the retransmission number information of the control signal 141 is an even number, on the other hand, the selection unit 162 selects and outputs the information packets 132g to the error detection code insertion unit 155 as the information packet 132G.

The selection unit 156g receives, as inputs, the information packets 175 after the CRC insertion, the parity packets 173 after the CRC insertion and the control signal 141. In a case where (1) the control signal 141 does not indicate transmission of the retransmission data or (2): the control signal 141 indicates transmission of the retransmission data; and the retransmission number shown by the retransmission number information of the control signal 141 is an even number, the selection unit 156g selects and outputs the information packets 175 after the CRC insertion. In a case where: the control signal 141 indicates transmission of the retransmission data; and the retransmission number shown by the retransmission number information of the control signal 141 is an odd number, on the other hand, the selection unit 156g selects and outputs the parity packets 173 after the CRC insertion.

<Method of Configuring Packets to be Retransmitted>

Figure 24:
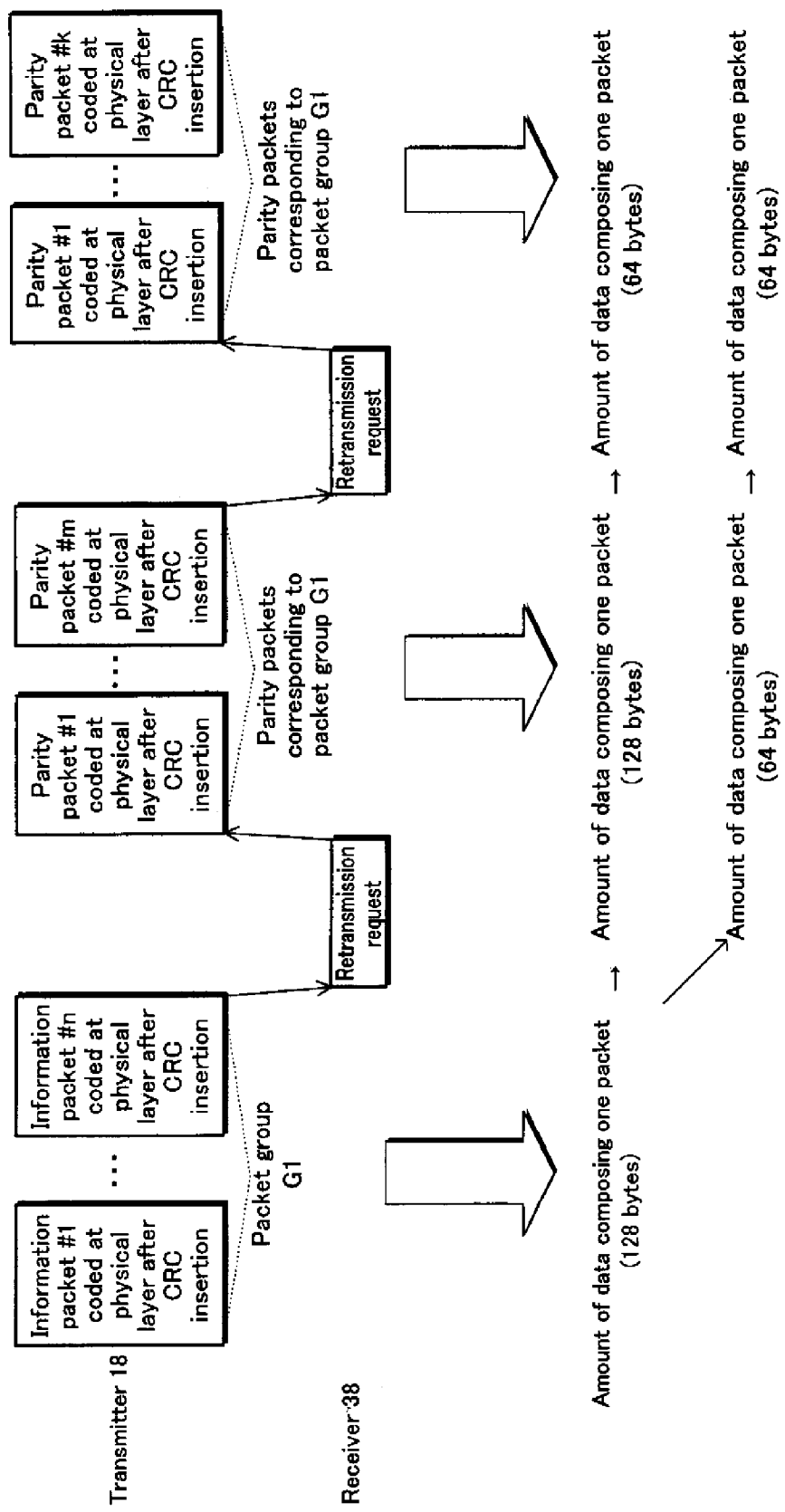
FIG. 24 shows an example of a frame structure when the transmitter of the eighth embodiment performs retransmission.

FIG. 24 shows an example of a frame structure at the time of retransmission in a communication apparatus on a transmitting side (transmitter) in the present embodiment.

The following describes the concrete example.

A transmitter 18 transmits the information packets (coded at the physical layer after the CRC insertion). In this case, suppose that the amount of data composing each of the information packets #1 to #n before the CRC insertion is 128 bytes, for example.

Then, the transmitter 18 transmits the parity packets #1 to #m (coded at the physical layer after the CRC insertion), when it is presumed that a communication apparatus 38 on a receiving side (receiver 38) has made a retransmission request. In this case, the size of one parity packet before the CRC insertion should be 128 bytes which is equal to the size of one information packet before the CRC insertion at the time of the initial transmission.

The transmitter 18 transmits information packets #1 to #k (coded at the physical layer after the CRC insertion) with use of the information packets stored in the storage unit 161 of the packet data coding unit 102g, when it is presumed that the receiver 38 has made the retransmission request. In this case, it is important that the size of one information packet before the CRC insertion at the time of the second retransmission is smaller than the size of one information packet before the CRC insertion at the time of the initial transmission. Thus, the size of one information packet before the CRC insertion at the time of the second retransmission is 64 bytes, for example, which is smaller than the size of one information packet before the CRC insertion at the time of the initial transmission.

The following describes another concrete example.

The transmitter 18 transmits the information packets #1 to #n (coded at the physical layer after the CRC insertion). In this case, suppose that the amount of data composing each of the information packets #1 to #n before the CRC insertion is 128 bytes, for example.

Then, the transmitter 18 transmits the parity packets #1 to #m (coded at the physical layer after the CRC insertion), when it is presumed that the receiver 38 has made a retransmission request. In this case, the size of one parity packet before the CRC insertion should be 64 bytes which is smaller than the size of one information packet before the CRC insertion at the time of the initial transmission.

The transmitter 18 transmits information packets #1 to #k (coded at the physical layer after the CRC insertion) with use of the information packets stored in the storage unit 161 of the packet data coding unit 102g, when it is presumed that the receiver 38 has made the retransmission request. In this case, it is important that the size of one information packet before the CRC insertion at the time of the second retransmission is smaller than the size of one information packet before the CRC insertion at the time of the initial transmission. Thus, the size of one information packet before the CRC insertion at the time of the second retransmission is, for example, 64 bytes which is smaller than the size of one information packet before the CRC insertion at the time of the initial transmission.

Note that the above-stated data amount of one information packet at the time of the initial transmission, and the data amount of one parity packet at the time of each of the initial and second retransmissions are merely examples. Therefore, any data amount is possible as long as the data amount of one information packet at the time of the second retransmission is smaller than the data amount of one information packet at the time of the initial transmission.

Thus, the number of bits (to be eliminated) of the transmission data can be reduced by making the size of one packet to be retransmitted smaller as described in the above. This improves the reception quality.

Ninth Embodiment

The following describes a ninth embodiment of the present invention with reference to drawings. The present embodiment relates to a method for selecting a retransmission method.

<Method for Selecting Retransmission Method>

Figure 25:
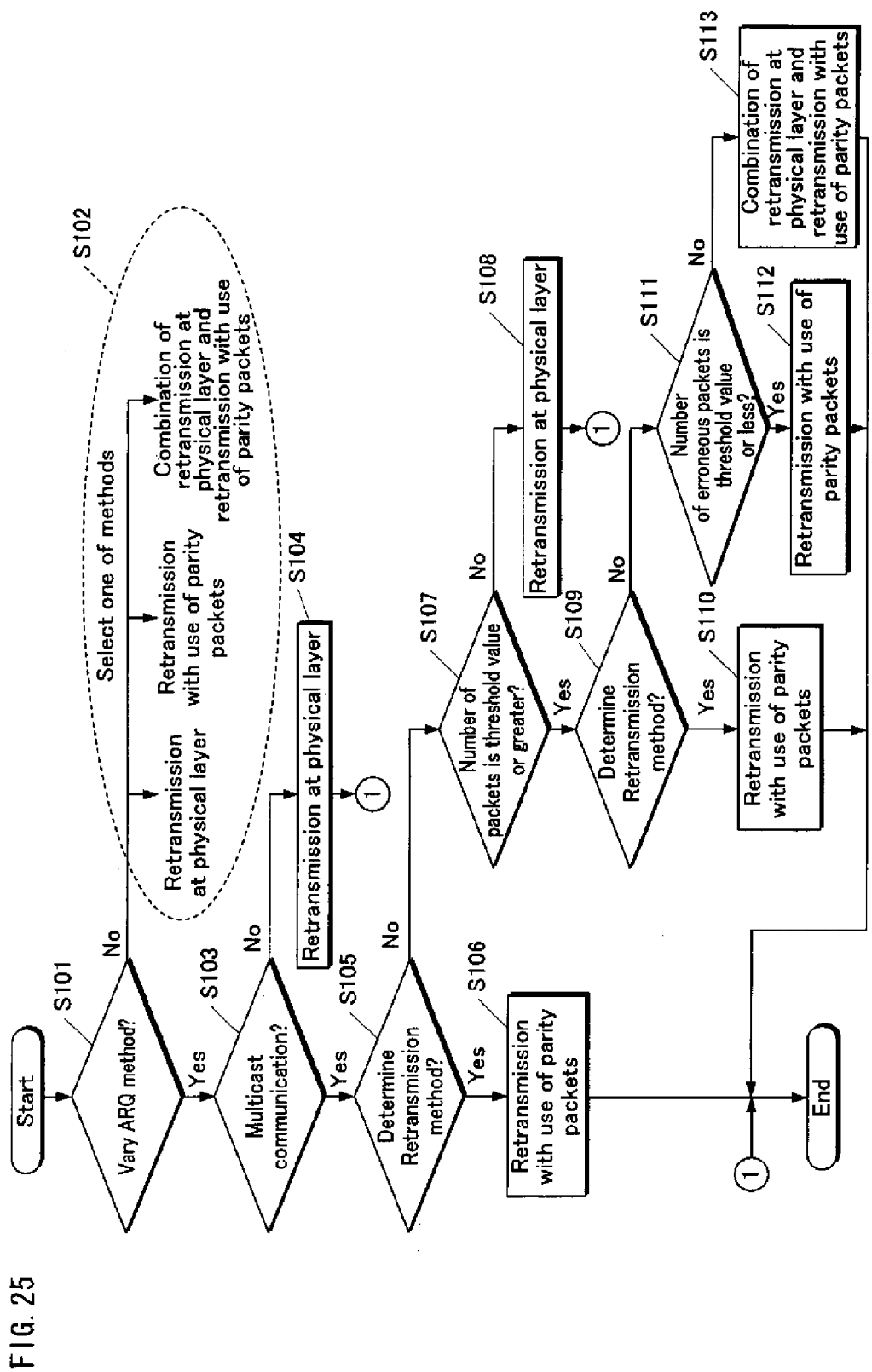
FIG. 25 is a flowchart showing an example of how to select a retransmission method in a ninth embodiment.

FIG. 25 is a flowchart showing an example of how to select a retransmission method pertaining to the present embodiment.

In order to reduce processing delay, for example, the transmission method determination unit may make setting, in view of a state of control processing such as the processing delay and a calculation size, such that the ARQ (Automatic repeat-request) is not changed. When the processing delay is not likely to occur or transmission efficiency is desired to be increased, on the other hand, the ARQ is changed. Therefore, the transmission method determination unit makes a selection as to whether the ARQ is changed or not (Step S101). When the ARQ is not changed as a result of the selection (S101: NO), the transmission method determination unit selects one of: the retransmission at the physical layer; the retransmission with use of the parity packet; and a combination of these retransmissions, as the retransmission method to be executed at the time of retransmission (Step S102).

When the ARQ is changed as a result of the selection (S101: YES), the transmission method determination unit judges whether or not communication to be performed is the multicast communication (Step S103). When the judgment is negative (S103: NO), the transmission method determination unit selects the retransmission with use of the physical layer as the retransmission method to be executed at the time of the retransmission (S104). When the judgment is positive (S103: YES), on the other hand, processing proceeds to Step S105. Note that it is possible to select, at this time, the retransmission with use of the parity packets as the retransmission method to be executed at the time of the retransmission.

The transmission method determination unit judges whether or not to determine the retransmission method in view of the state of control processing such as the processing delay and a calculation size (Step S105). When determining the retransmission method (S105: YES), the transmission method determination unit selects the retransmission with use of the parity packets as the retransmission method to be executed at the time of the retransmission (Step S106). When not determining the retransmission method (S105: NO), the transmission method determination unit judges whether or not the number of packets to be transmitted is equal to or greater than a threshold value (Step S107).

When the number of packets to be transmitted is smaller than the threshold value (S107:NO), the transmission method determination unit selects the retransmission at the physical layer as the retransmission method to be executed at the time of the retransmission (Step S108). This is because when the number of bits to be transmitted is small, the amount of retransmission data itself is small. Therefore, improvement of the transmission efficiency of data is small even if the retransmission with use of the parity packets is adopted. When the number of bits to be transmitted is equal to or greater than the threshold value (S107: YES), processing proceeds to Step S109. Note that it is possible to select, at this time, the retransmission with use of the parity packets as the retransmission method to be executed at the time of the retransmission.

The transmission method determination unit judges whether or not to determine the retransmission method in view of the state of control processing such as the processing delay and the calculation size (Step S109). When determining the retransmission method (S109: YES), the transmission method determination unit selects the retransmission with use of the parity packets as the retransmission method to be executed at the time of the retransmission (Step S110). When not determining the retransmission method (S109: NO), the transmission method determination unit judges whether or not the number of erroneous packets to be transmitted is equal to or greater than a threshold value (Step S111).

When the number of erroneous packets is equal to or smaller than the threshold value (S111: YES), the transmission method determination unit selects the retransmission with use of the parity packets (Step S112). When the number of erroneous packets is equal to or greater than the threshold value (S111: NO), on the other hand, the transmission method determination unit selects the combination of the retransmission at the physical layer and the retransmission with use of the parity packets as the retransmission method to be executed at the time of the retransmission (Step S113).

As described in the above, there is a merit that it is possible to realize both the improvement of the data reception quality and the improvement of the data transmission efficiency, by selecting one of (1) the retransmission at the physical layer, (2) the retransmission with use of the parity packets and (3) the combination of these retransmissions. Note that criterion for selecting the retransmission method to be executed at the time of the retransmission is not limited to the method shown in FIG. 25. Although the example is given of the case where one of the retransmission methods is selected in the above, it is possible to make a selection that the retransmission is not performed.

Also, when the retransmission is performed in the multicast communication mode as shown in FIG. 12, the transmitter initially transmits the same information packets to each of a plurality of receivers. The transmitter receives, form each of the receivers, the feedback information including the information relating to the packet error occurrence. In this case, there are two possible patterns.

A case <1> is a case where the number of erroneous information packets in each of the receivers A, B and C is close to one another as shown in the following. For example, the number of erroneous information packets in a receiver A, the number of erroneous information packets in a receiver B and the number of erroneous information packets in a receiver C are three, two and three, respectively.

A case <2> is a case where the number of erroneous information packets in each of the receivers is not close to one another as shown in the following. For example, the number of erroneous information packets in the receiver A, the number of erroneous information packets in the receiver B, the number of erroneous information packets in the receiver C and the number of erroneous information packets D are three, three, three and five, respectively.

In the case <1>, the number of parity packets to be transmitted can be easily calculated at the time of the retransmission. Thus, selection of the retransmission with use of the parity packets is highly likely to be prioritized (see FIG. 14 and the description for the same for the explanations on the number of parity packets to be retransmitted). However, when the number of erroneous information packets is large in all of the receivers, it is highly likely to combine the retransmission at the physical layer and the retransmission with use of the parity packets.

In the case <2>, the receiver having the large number of erroneous information packets is specified. In the above case <2>, the receiver having the large number of erroneous information packets is the receiver D. Then, the transmitter extracts the erroneous information packets at the receiver D, generates, for the extracted information packets, the retransmission data to be retransmitted at the physical layer, and retransmits the generated retransmission data. However, it is not necessary to retransmit all the erroneous information packets at the physical layer. Thus, since it is assumed that the number of erroneous information packets in each of the receivers is identical, the transmitter transmits four or more parity packets. Thus, it is highly likely that the packet error does not occur at the time of the retransmission in all the receivers. It is presumed in the above case that the number of bits composing the information packets and the number of bits composing the parity packets are identical.

In a case where: the number of terminals is large; and a terminal exists that has the outstandingly large number of erroneous packets, the transmitter may exceptionally perform, at the physical layer, the retransmission to the terminal with use of the information packets as described in the case <2>. However, when the number of terminals is large, it is difficult to dynamically select a terminal to which the exceptional retransmission is performed. Therefore, it is preferable to provide a threshold value for the number of erroneous packets, and to retransmit, at the physical layer, the information packets to the terminals in each of which the number of packet error is larger than the threshold value. However, when the number of terminals (in each of which the number of packet errors is larger than the threshold value) is large, the retransmission at the physical layer needs to be performed for all the information packets in some cases. In this case, since the data transmission efficiency decreases as the parity packets are transmitted, the transmitter does not have to transmit the parity packets. In order to make sure that the packets are transmitted to all the terminals at once without an error, the parity packets may be transmitted. This selection depends on request condition of a communication system.

The following describes one example with reference to FIG. 26. Suppose that the transmitter transmits the information packets #1 to #7 and that three information packets, three information packets, three information packets and five information packets are missing in the receivers A, B, C and D, respectively. That is, suppose that the number of missing information packets in the receiver D is larger than the number of missing information packets in each of the receivers A, B and C. Suppose also that the number of bits composing the information packets and the number of bits composing the parity packets are identical. In this case, when the number of parity packets to be retransmitted is determined in accordance with the same rules as the rules described in FIG. 14, it is necessary to determine the number of parity packets to be retransmitted based on the receiver D. In this case, it is necessary to retransmit six or more parity packets. However, such number of parity packets is an amount of redundant retransmission data for each of the receivers A, B and C. In this case, it is possible to adopt the following method. According to the method, the number of parity packets to be retransmitted is four, and two information packets are transmitted to the receiver D. In this case, it is possible to obtain a merit in terms of data transmission efficiency by using the hybrid ARQ at the physical layer for the information packets to be transmitted to the receiver D.

As described in the above, it is possible to obtain especially an effect of reducing the number of retransmissions by adopting the retransmission method of selecting one of: the retransmission at the physical layer; the retransmission with use of the parity packets; and the combination of these transmissions. Therefore, it is possible to obtain an effect of improving the data transmission efficiency.

Tenth Embodiment

The following describes a tenth embodiment of the present invention with reference to drawings. The tenth embodiment describes details of the coding method (coding method at a packet level) at a layer at which signal processing is performed earlier than at the physical layer.

Figure 28:
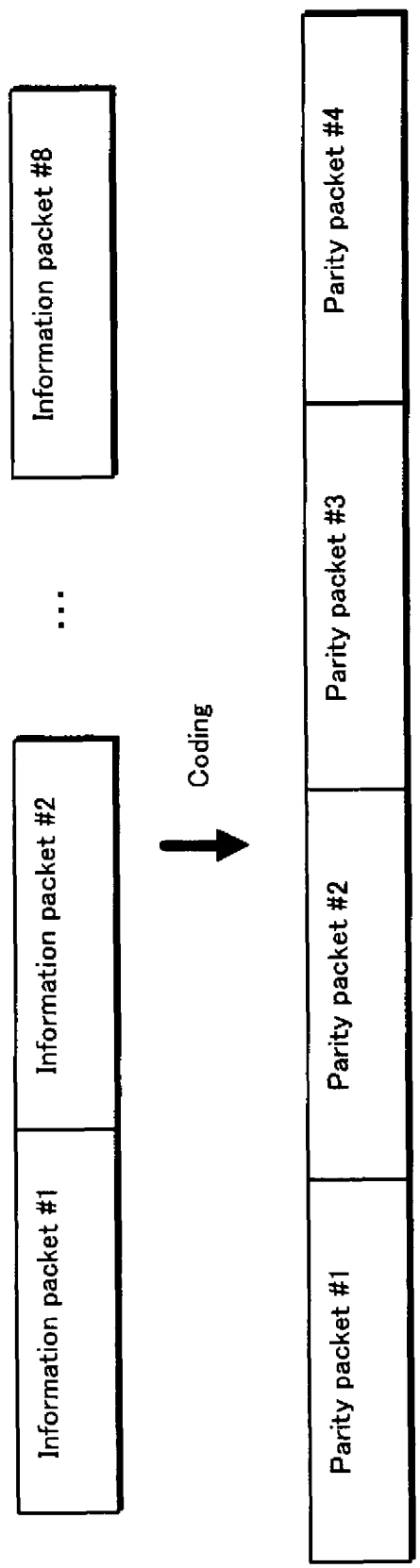
FIG. 28 shows an example of coding methods at a layer at which signal processing is performed earlier than at the physical layer.

FIG. 28 shows an example of coding methods at a layer at which signal processing is performed earlier than at the physical layer. In FIG. 28, the coding rate of the error correction codes is $2/3$, and the size of data of one packet (excluding control information and information on error detection codes etc.) is 512 bits.

In FIG. 28, in the coding processing at a layer at which signal processing is performed earlier than at the physical layer (coding at a packet level), parities are generated by interleaving the information packets #1 to #8 and then coding the information packets #1 to #8. Some of generated parities that correspond to 512 bits compose a group as one parity packet. Here, since the coding rate is $2/3$, the number of parity packets is four. That is, parity packets #1 to #4 are generated. Therefore, the information packets described in the other embodiments correspond to the information packets #1 to #8 in FIG. 28. The parity packets correspond to the parity packets #1 to #4 in FIG. 29. Note that the size of the parity packet is 512 bits which is the same as the size of the information packet for simplifying the descriptions. However, one parity packet does not have to have the same size as the size of the information packet.

Figure 29:
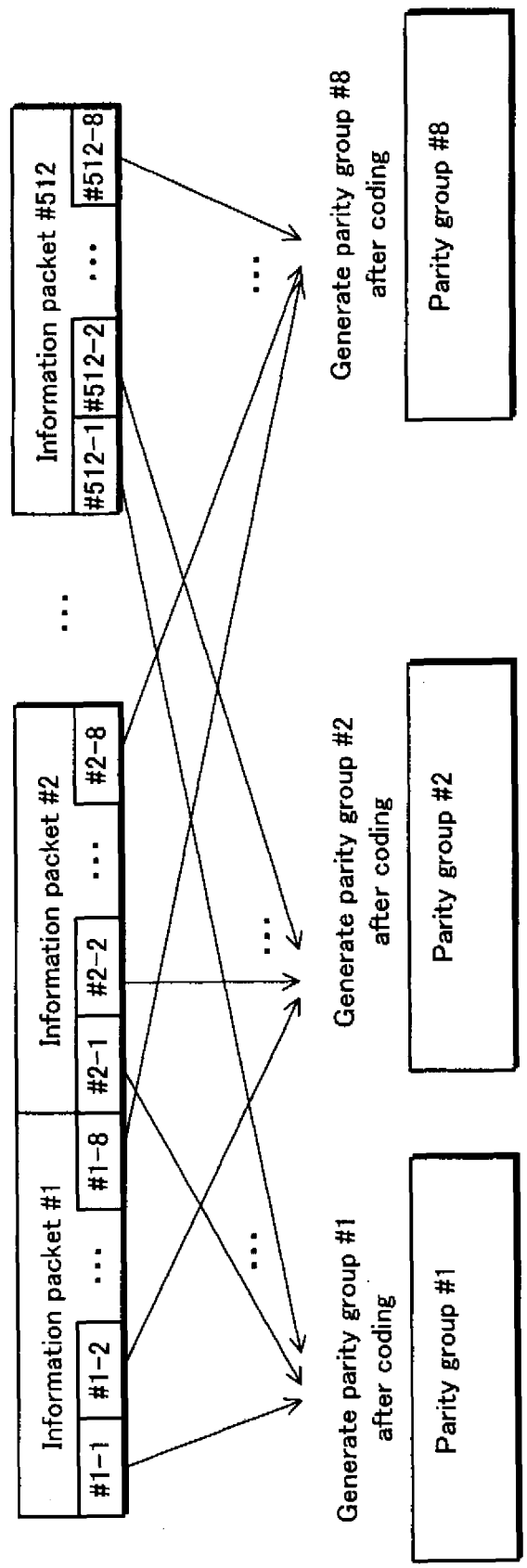
FIG. 29 shows another example of coding methods at a layer at which signal processing is performed earlier than at the physical layer.

FIG. 29 shows an example of coding methods at a layer at which signal processing is performed earlier than at the physical layer, which is different from what is shown in FIG. 28. That is, the transmitter may execute the coding at a layer at which signal processing is performed earlier than at the physical layer with use of the coding method shown in FIG. 29 instead of the coding method shown in FIG. 28. In FIG. 29, the information packets #1 to #512 are original information packets. A size of data of each of these information packets (excluding the control information and information on the error detection code etc.) is 512 bits. Then, each of the information packets #k (k=1, 2, . . . , 511 and 512) is divided into eight to generate the sub information packets #k-1, #k-2, . . . , and #k-8.

Figure 30:
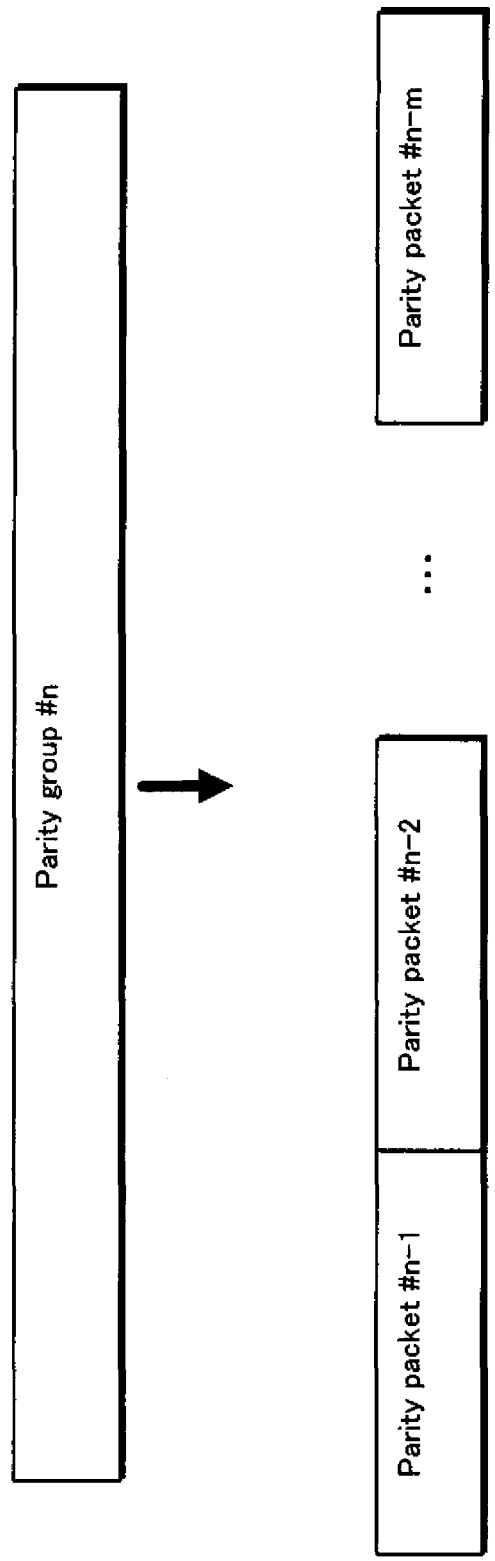
FIG. 30 shows a structure of an n-th parity group.

Then, the generated sub information packets #1-n, #2-n, #3-n, . . . , #511-n and #512-n (n=1, 2, 3, 4, 5, 6, 7 and 8) are coded to form the parity group #n. Then, the parity group #n is divided into m as shown in FIG. 30 so as to form the parity packets #n-1, #n-2, . . . , and #n-m.

Therefore, when the coding is performed in accordance with the coding method shown in FIG. 29, the information packets described in the other embodiments correspond to the information packets #1 to #512 shown in FIG. 29. The parity packets correspond to parity packets #n-1, #n-2, . . . , and #n-m (n=1, 2, 3, 4, 5, 6, 7 and 8) shown in FIG. 30. In this case, although one information packet is 512 bits, one parity packet does not necessarily have to be 512 bits.

Also, the information packets described in the other embodiments correspond to the sub information packets #k-1, #k-2, . . . , and #k-8 (k=1, 2, . . . , 511, and 512) shown in FIG. 29.

Note that each of the sub information packets obtained as a result of the division may be one packet in FIG. 29.

Also, as described in the other embodiments, the error correction codes are inserted into the information packets and the parity packets. The error correction coding is performed on the information packets and the parity packets at the physical layer.

Eleventh Embodiment

The following describes an eleventh embodiment of the present invention with reference to drawings. The eleventh embodiment describes details of multicast relay/retransmission method in a repeater.

Figure 31:
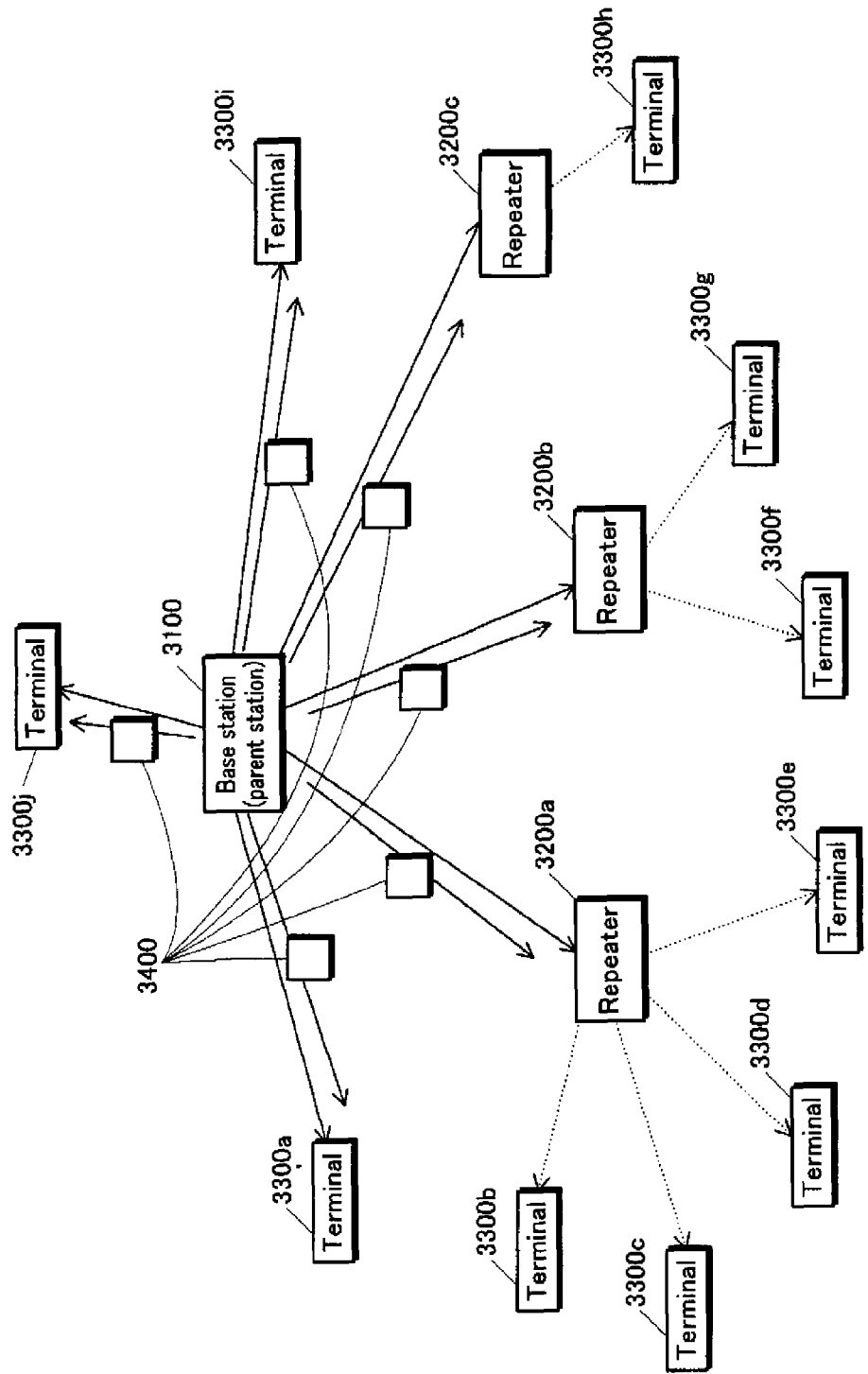
FIG. 31 is a schematic diagram of the multicast communication in a system including a base station, repeaters and terminals in an eleventh embodiment.

FIG. 31 shows a relationship between a base station (or an access point), repeaters and terminals in the present embodiment. As shown in FIG. 31, the base station transmits the same packet group 3400 (hereinafter, referred to as packet group #A) to a plurality of terminals. In this case, the base station either directly transmits the packet group A to each of the terminals, or transmits the packet group #A to each of the terminals through the repeater.

According to an example shown in FIG. 31, a base station 3100 transmits the packet group #A (3400) to each of a terminal 3300a, a terminal 3300i, and a terminal 3300j, a repeater 3200a, a repeater 3200b and a repeater 3200c. Then, the repeater 3200a, the repeater 3200b and the repeater 3200c respectively relay the received packet group #A (3400) to terminals 3300b to 3300e, terminals 3300f to 3300g and a terminal 3300h.

Note that the base station and the terminal respectively correspond to the transmitter and the receiver described in the above embodiments. Also, the repeater is a device that includes the functions of both the transmitters and the receivers described in the above embodiments, and further includes functions unique to the repeater. This applies to the rest of after-mentioned embodiments.

Figure 32:
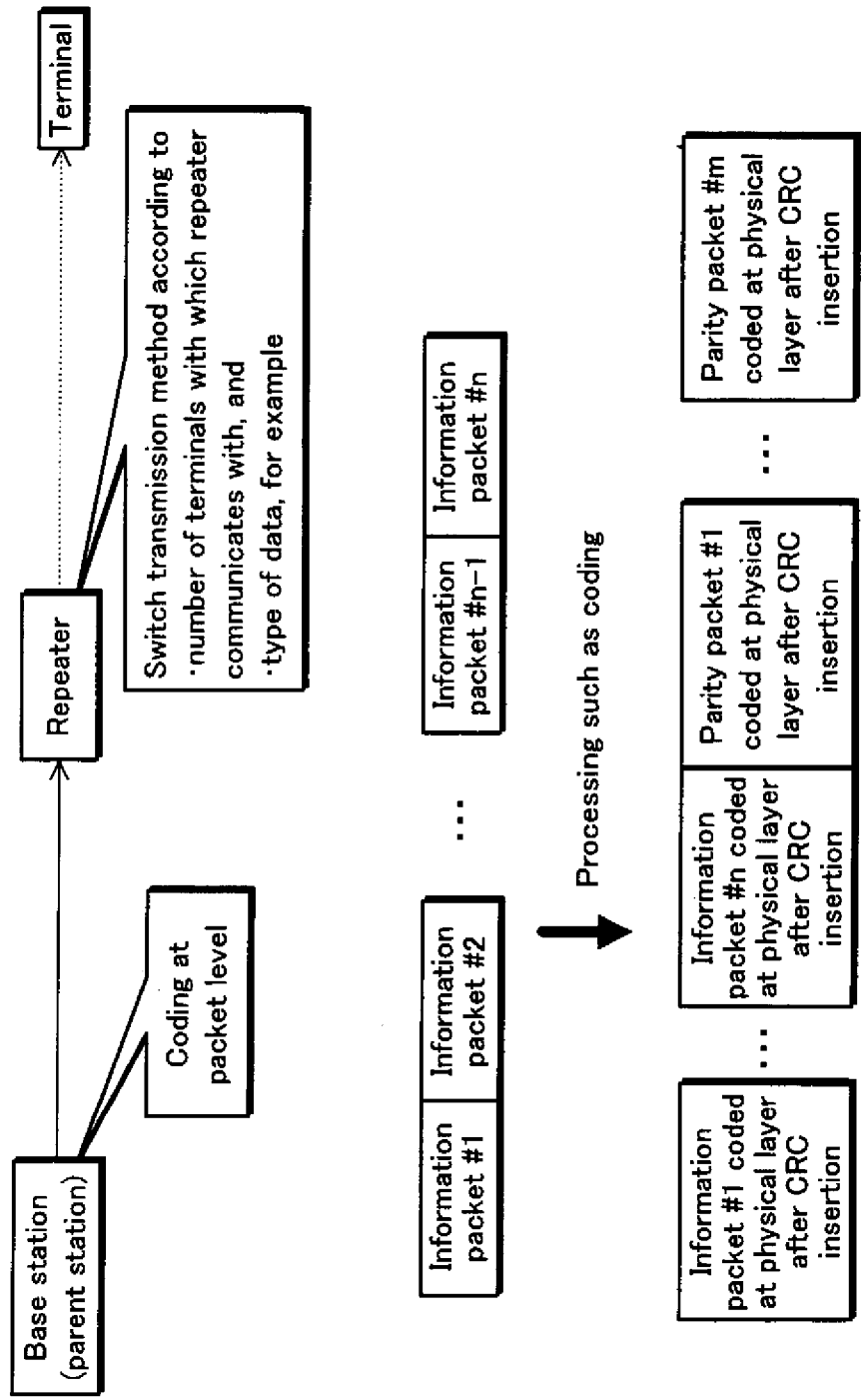
FIG. 32 shows a structure of a packet group in the base station when the base station transmits the packet group to the terminal through the repeater in the eleventh embodiment.

FIG. 32 shows a configuration example of the packet group #A in the base station when the base station transmits the packet group #A to the terminals through the repeater. Since the base station performs the transmission in the multicast communication mode, the base station performs coding at a layer at which signal processing is performed earlier than at the physical layer (i.e. coding at a packet level). Thus, there is a merit that coding at a packet level is suitable for the multicast transmission. However, when the base station transmits the packet group to the terminals through the repeaters, the repeaters make retransmission requests to the base station if transmission error occurs between the base station and the repeaters. However, when many repeaters exist, the number of retransmission requests increases. As a result, the data transmission efficiency dramatically decreases. Therefore, it is suitable that the base station performs the coding at a packet level between the base station and the repeaters.

As shown in FIG. 32, the base station (1) generates the parity packets #1 to #m by coding the information packets #1 to #n at a packet level, (2) inserts the error detection codes (e.g. CRC) into the information packets #1 to #n and the generated parity packets #1 to #m, and (3) generates the information packets #1 to #n (coded at the physical layer after the CRC insertion) and the parity packets #1 to #m (coded at the physical layer after the CRC insertion) by performing the coding at the physical layer. Then, the base station performs predetermined transmission processing on these packets and transmits the resultant packets.

The repeater can switch a method of communicating with the terminals in accordance with the number of terminals the repeaters communicate with and a data type, for example. However, the present embodiment especially describes a case where the multicast retransmission method is adopted in which the repeaters retransmits data to a plurality of terminals. Note that a fourteenth embodiment describes details of switching between communication methods.

Figure 33:
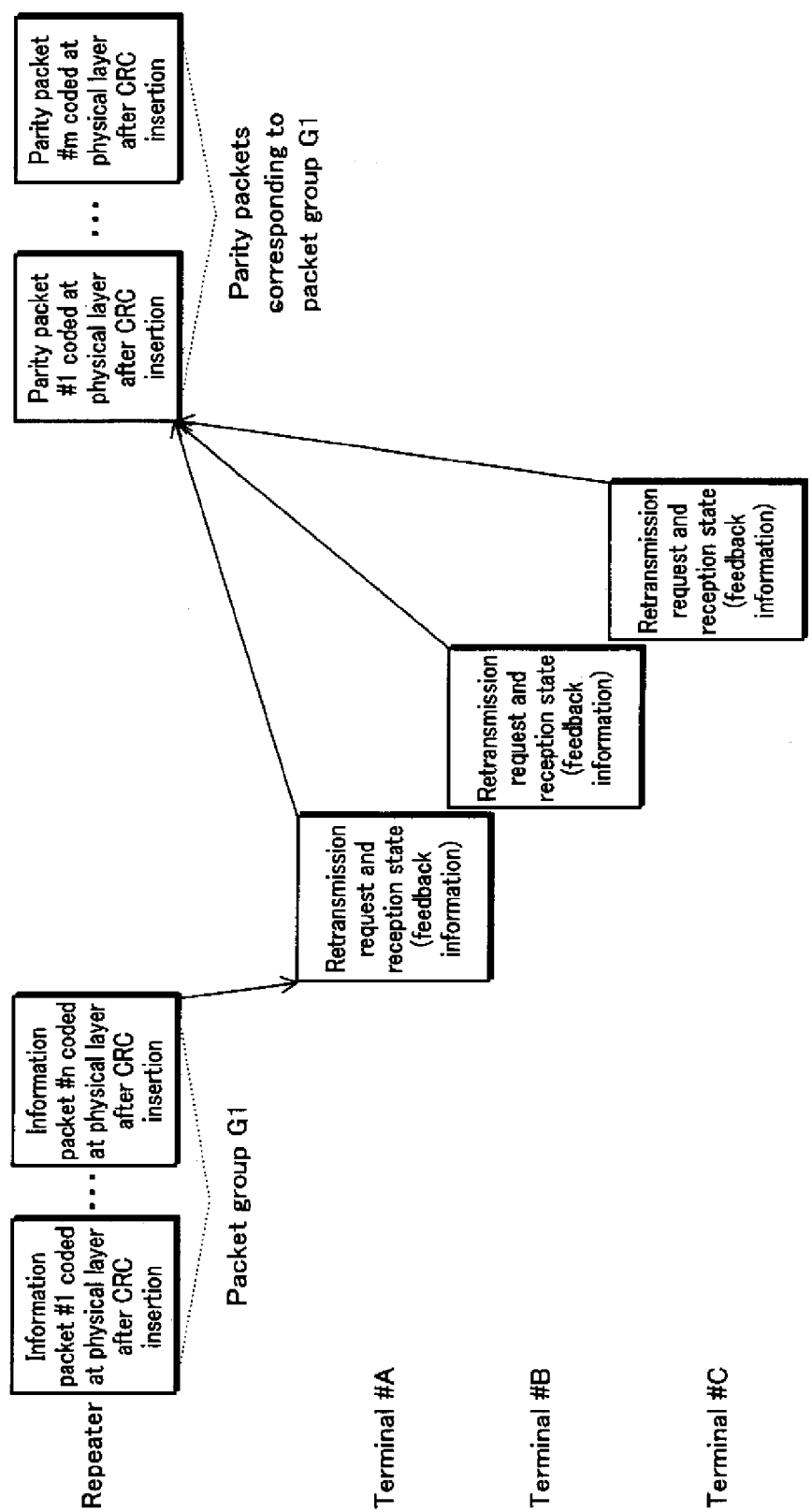
FIG. 33 shows an example of communication among the repeaters and the terminals in the eleventh embodiment.

FIG. 33 shows an example of communication between the repeaters and the terminals in the present embodiment. Each of the repeaters receives the information packets and parity packets that are transmitted from the base station. Each of the repeaters performs decoding at a packet level to obtain the information packets, inserts the error detection codes (e.g. CRC) into each of the information packets, performs the coding at the physical layer, and transmits the information packets #1 to #n (coded at the physical layer after the CRC insertion) to each of the terminals. Here, a packet group to be transmitted is a packet group G1.

Here, it is recited that the repeaters initially transmit only the information packets to each of the terminals. The following describes the reasons for this. It is possible to accurately perform transmission to the terminals that are positioned far from the base station. Also, it is unlikely that the coding at a packet level needs to be adopted because: a transmission distance is often shorter compared to a case where the base station directly communicates with the terminals; and a communication quality between the repeaters and the terminals is high.

Then, each of the repeaters determines the number of parity packets to be retransmitted and the transmission method, with use of a transmission request and the feedback information that are received from one of the terminals #A, #B and #C. Then, each of the repeaters transmits the parity packets (coded at the physical layer after the CRC insertion) (i.e. parity packets corresponding to the packet group G1) as packets for retransmission, as shown in FIG. 33. In this case, a method that is identical to any of the methods described in the first embodiment, the second embodiment and the sixth embodiment can be executed.

An exemplary structure of the base station in the present embodiment is as shown in FIG. 1. Since FIG. 1 is described in the other embodiments, the details of the structure of the base station is omitted.

Figure 34:
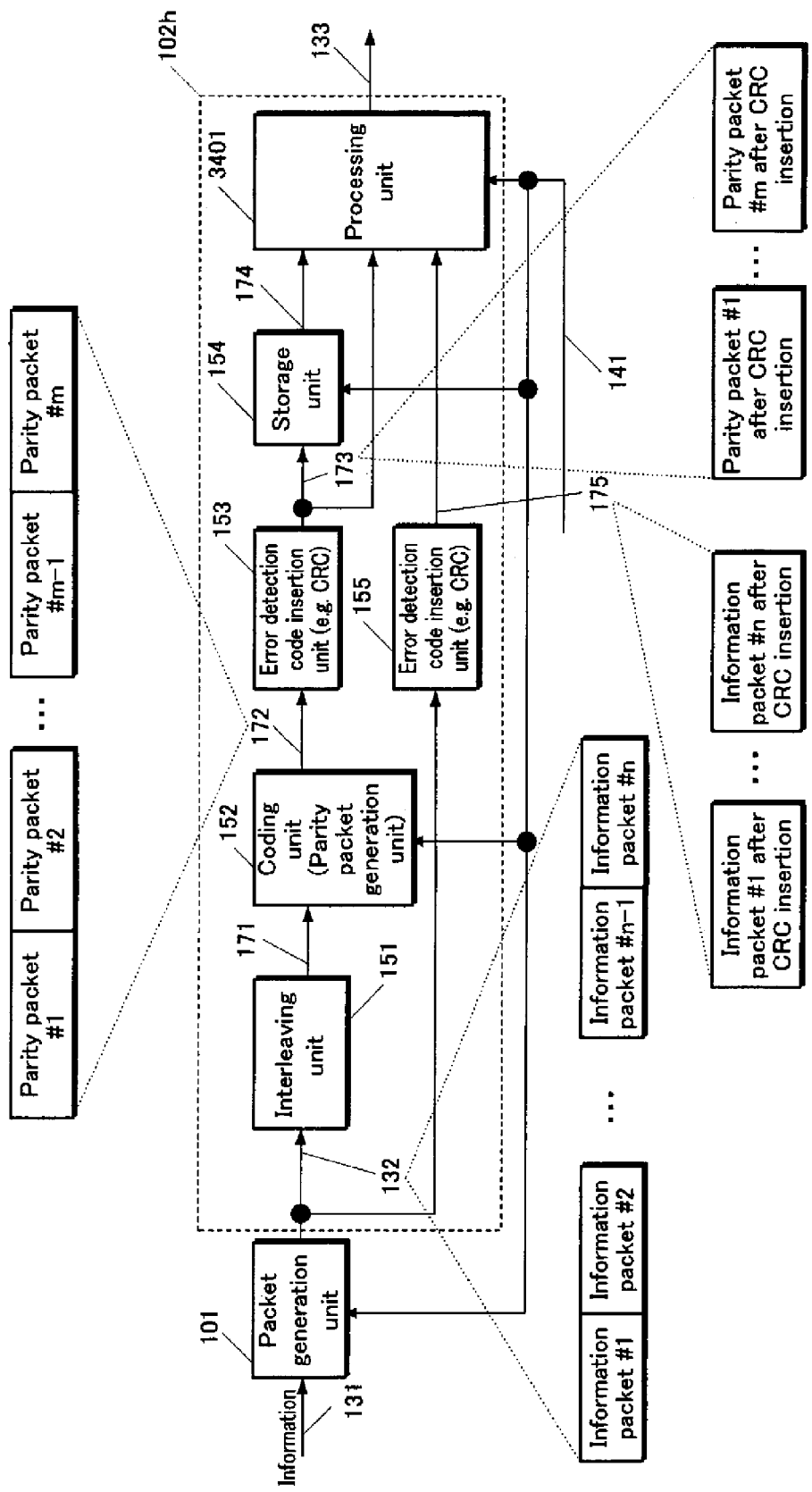
FIG. 34 is a structural diagram of a packet data coding unit of the eleventh embodiment.

The packet data coding unit 102h shown in FIG. 34 is different from the packet data coding unit 102 shown in FIG. 2 in that the packet data coding unit 102h has a processing unit 3401. The base station performs coding at a packet level in the multicast communication mode as described in the above. Examples of the communication are the multicast communication, the unicast communication and a mode in which the base station communicates with the terminal without passing through the repeater. Therefore, the processing unit 3401 outputs the packets that are suitable for each of the communication modes. Accordingly, there are cases; where the base station transmits only the information packets; where the base station transmits the information packets and the parity packets; and where the base station transmits the information packets and transmits the parity packets at the time of retransmission. The processing unit 3401 outputs the packets 133 that are suitable for each of the cases.

Figure 35:
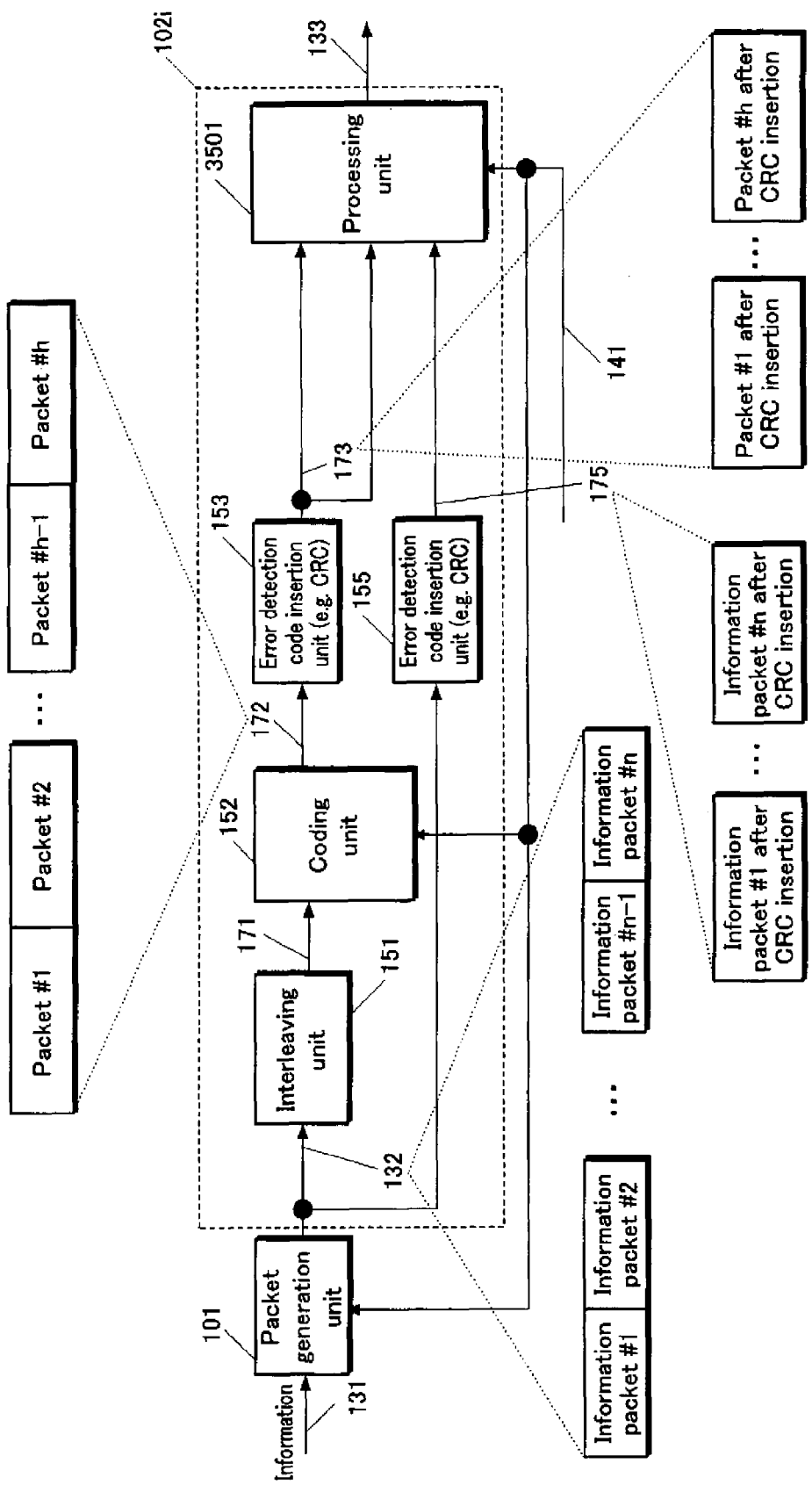
FIG. 35 is a structural diagram of a packet data coding unit of the eleventh embodiment.

FIG. 35 is different from FIG. 34, and shows a structural example of the packet data coding unit 102 of the base station shown in FIG. 1. The same references are given to elements that operate in the same manner as the elements shown in FIG. 2. The packet data coding unit 102i shown in FIG. 35 may be adopted instead of the packet data coding unit 102h shown in FIG. 34. The following describes how a packet coding unit 102i shown in FIG. 35 is different from the packet data coding unit 102h shown in FIG. 34. The coding unit 102i performs the coding at a layer at which signal processing is performed earlier than at the physical layer (i.e. decoding at a packet level) without distinguishing between the information packets and the parity packets to generate the packets composed of both the information pieces and parities. The coding unit 152 shown in FIG. 35 receives the interleaved information 171 as an input. The coding unit 152 codes the interleaved information 171, and outputs the packets 172. In the example shown in FIG. 35, the coding unit 152 outputs the packets #1 to #h. Note that the coder may be a coder for systematic codes, or a coder for non-systematic codes. The base station performs the coding at a packet level in the multicast communication mode as described above. However, the base station actually does not perform the coding in the multicast communication mode in some cases. Therefore, when the coding at a packet level is necessary, a selection unit 3501 selects and outputs the packets #1 to #h. When the coding at a packet level is not necessary, the selection unit 3501 selects and outputs the information packets #1 to #n.

Figure 36:
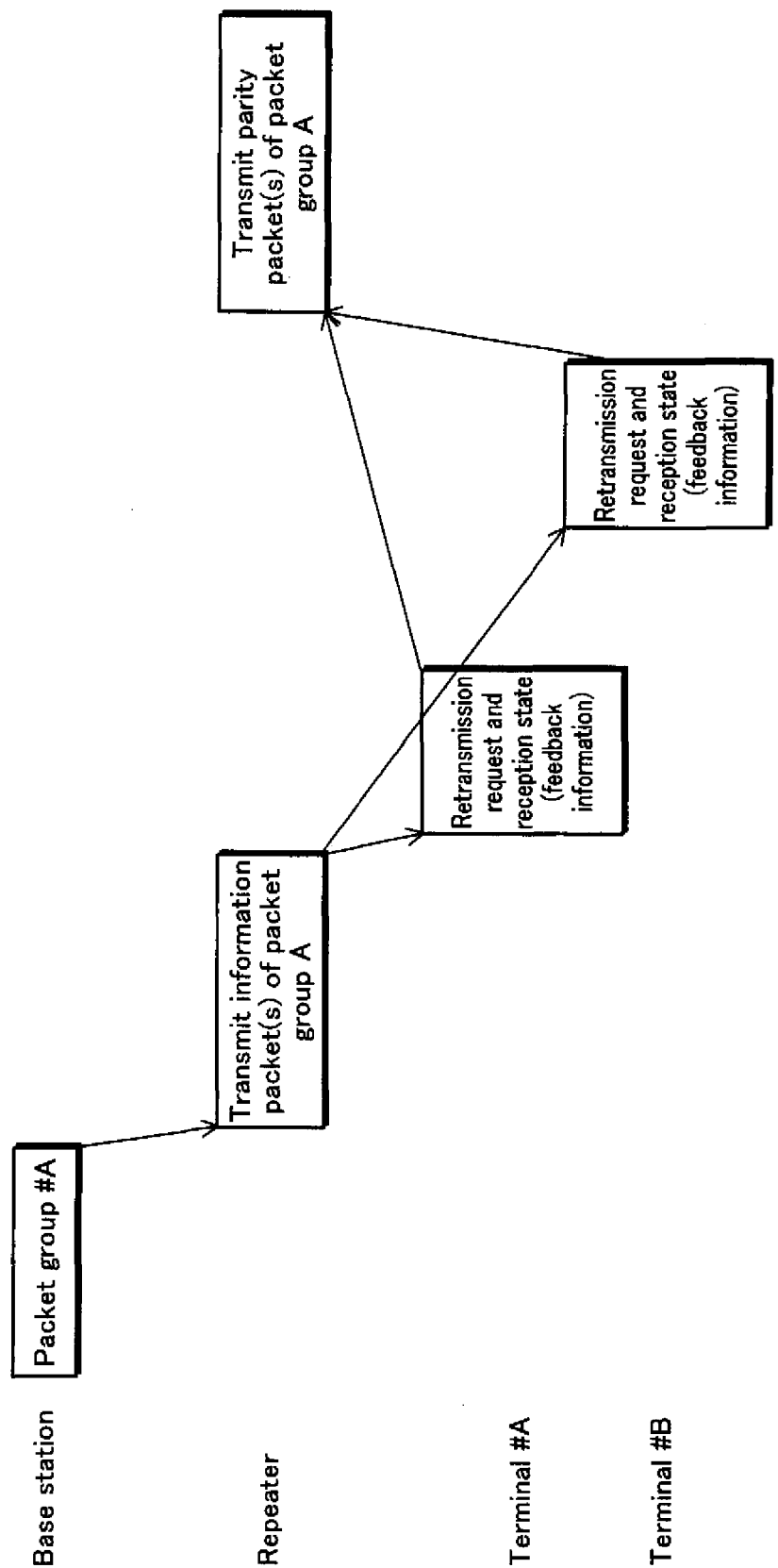
FIG. 36 shows an example of communication among the base station, the repeater and the terminals in the eleventh embodiment.

FIG. 36 shows an example of communication between the base station, the repeaters and the terminals in the present embodiment. As shown in FIG. 36, the base station transmits the packet group #A including missing packets composed of the information packets and the parity packets for the multicast communication.

Each of the repeaters receives the packet group #A including missing packets. The repeater decodes the packet group #A at a packet level, extracts the information packets and transmits the information packets to a plurality of terminals.

A terminal #A receives the information packets transmitted by the repeater. When packet loss occurs, the terminal #A makes a retransmission request to the repeater, and transmits the feedback information such as the number of lost packets and the numbers of the lost information packets. A terminal #B receives the information packets transmitted by the repeaters. When packet loss occurs, the terminal #B makes retransmission requests to the repeaters, and transmits the feedback information such as the number of lost packets and the numbers of the lost information packets.

The repeater determines the retransmission in accordance with the feedback information of the terminals #A and #B, and transmits the parity packets of the packet group #A. Then, each of the terminals decodes the previously received information packets and the received parity packets at a packet level to obtain the information packets.

Figure 37:
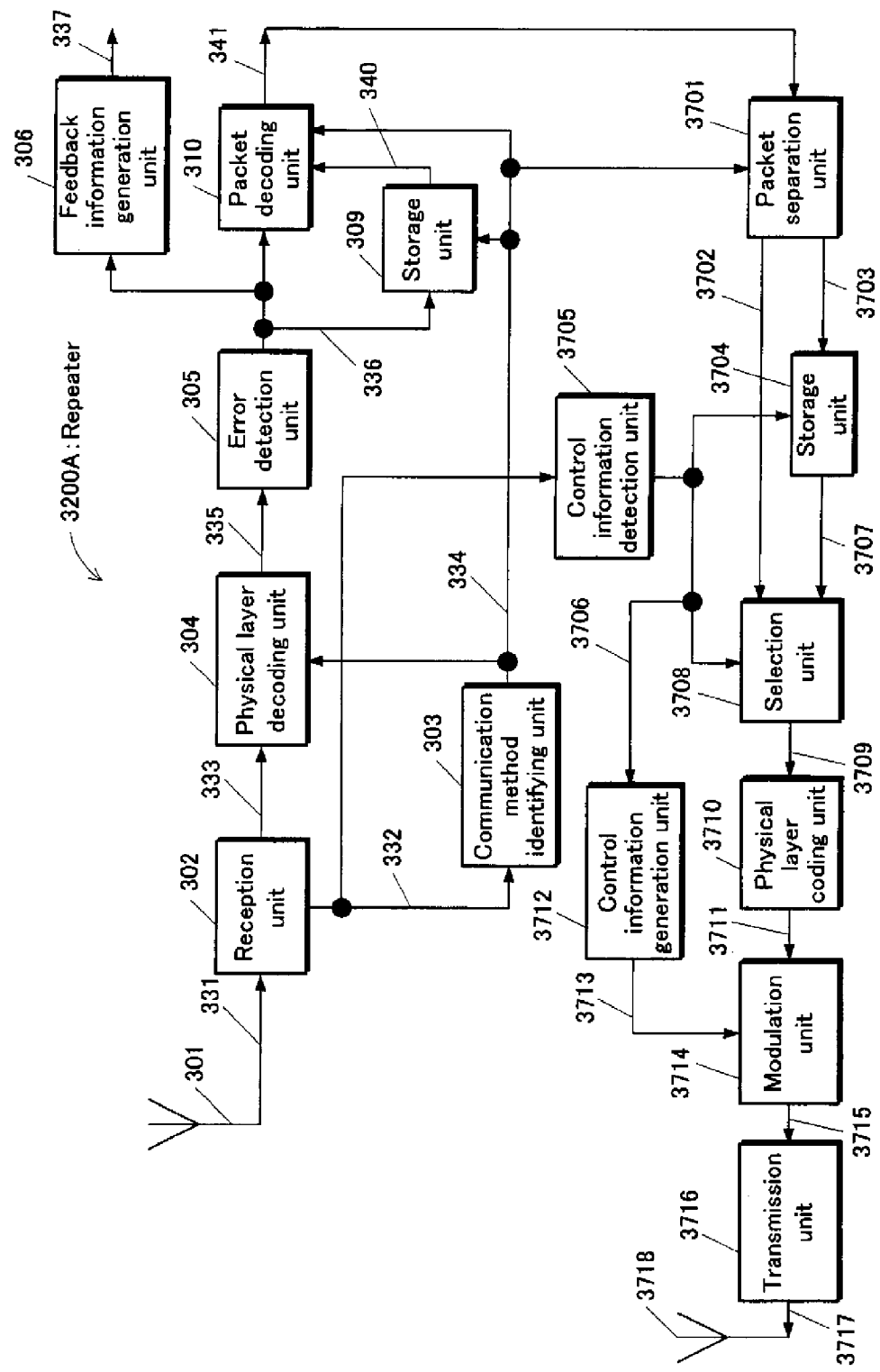
FIG. 37 is a structural diagram of the repeater of the eleventh embodiment.

FIG. 37 shows an example of the structure of a repeater 3200A of the present embodiment. The repeater includes the substantially the same structure as the structure of the receiver shown in the above embodiments. Therefore, the same reference numerals are provided with elements that operate in the same manner as the elements shown in FIG. 4. When the base station 3200A transmits the packet group #A, the reception unit 302 extracts the control information (corresponding to signal 332) transmitted together with the packet group #A. The communication method identifying unit 303 receives the signal 332 as an input. The communication method identifying unit 303 identifies information on the communication method, and outputs communication method information 334.

A packet separation unit 3701 receives, as inputs, the decoded packet 341 and the communication method information 334. In the case of FIG. 37, the packet separation unit 3701 judges that the base station transmits the packets that have been coded at a packet level, with use of the communication method information 334. Then, the packet separation unit 3701 separates the packet group #A of the decoded packets 341 into the information packets and parity packets, and outputs information packets 3702 and parity packets 3903. Note that error detection codes may be inserted into the information packets 3702 and parity packets 3903 at this time. Since the error detection code insertion has been performed in the base station, the repeater 3200A can easily obtain the information packets and parity packets to which the error detection codes have been inserted.

A control information detection unit 3705 extracts, for example, the control information included in data transmitted by the terminals. The control information detection unit 3705 recognizes whether or not the retransmission request is made and a situation of the packet loss occurred in the terminals. Then, the control information detection unit 3705 outputs a control signal 3706 relating to the transmission method of retransmission and whether or not to perform the retransmission. Also, the control information detection unit 3705 extracts the control information included in data transmitted by the base station. When the extracted control information indicates that the data is data for the multicast communication, the control information detection unit 3705 outputs, as the control signal 3706, an instruction showing that the repeater 3200A should transmit the information packets.

The storage unit 3704 receives the parity packets 3903 and the control signal 3706 as inputs, and stores the parity packets 3903 in the storage unit 3704. When the control signal 3706 is information regarding retransmission to the terminals, the storage unit 3704 determines the number of parity packets to be outputted from among the stored parity packets based on the information, and outputs the parity packets 3907 to be retransmitted.

The selection unit 3708 receives, as inputs, the information packets 3702, the parity packets 3907 to be retransmitted and the control signal 3706. When the control signal 3706 indicates transmission of the information packets, the selection unit 3708 selects the information packets 3702 and outputs the selected packets 3702 as the packets 3709. Also, when the control signal 3706 indicates retransmission to the terminals, the selection unit 3708 selects the parity packets 3707 and outputs the selected packets 3707 as the packets 3709.

The physical layer coding unit 3710 receives, as inputs, the packets 3709 selected by the selection unit 3708. The physical layer coding unit 3710 outputs data 3711 that has been coded at the physical layer.

A control signal generation unit 3712 receives the control signal 3706 as an input. The control signal generation unit 3712 outputs the control information 3713 including control information that needs to be transmitted to a communication apparatus (e.g. terminal). Examples of information included in such control information are information on whether or not data is retransmission data, information on the number of retransmissions, information on a modulation method, information on the coding method at a packet level and information on a method of coding at the physical layer.

The modulation unit 3714 receives, as inputs, the data 3711 that has been coded at the physical layer and the control information 3713. The modulation unit 3714 performs modulation (mapping) such as PSK and QAM, and outputs a base band signal 3715.

A transmission unit 3716 receives the base band signal 3715 as an input. The transmission unit 3716 performs OFDM (Orthogonal Frequency Division Multiplexing) and/or processing such as spectral dispersion, frequency conversion and amplification, and outputs the resultant transmission signal 3717 to an antenna 3718. The antenna 3718 outputs the transmission signal 3717.

The structure of each of the terminals is the same as the structure shown in FIG. 4 described in the first embodiment, the second embodiment and the sixth embodiment. Therefore, since the operations of each of the terminals are described in the above embodiments, the descriptions thereof are omitted.

Figure 38:
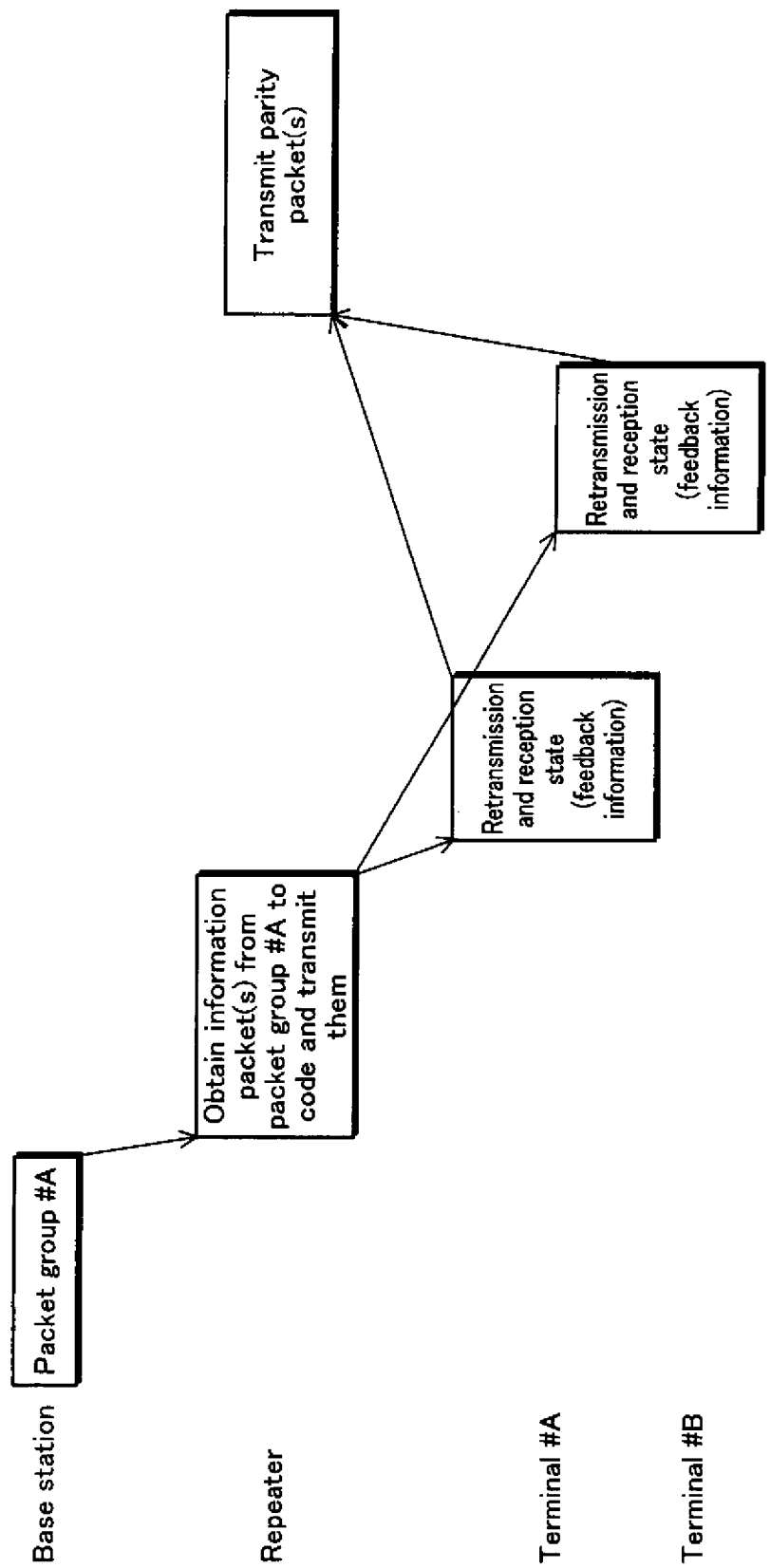
FIG. 38 shows another example (part II) of communication among the base station, the repeater and the terminals in the eleventh embodiment.
Figure 39:
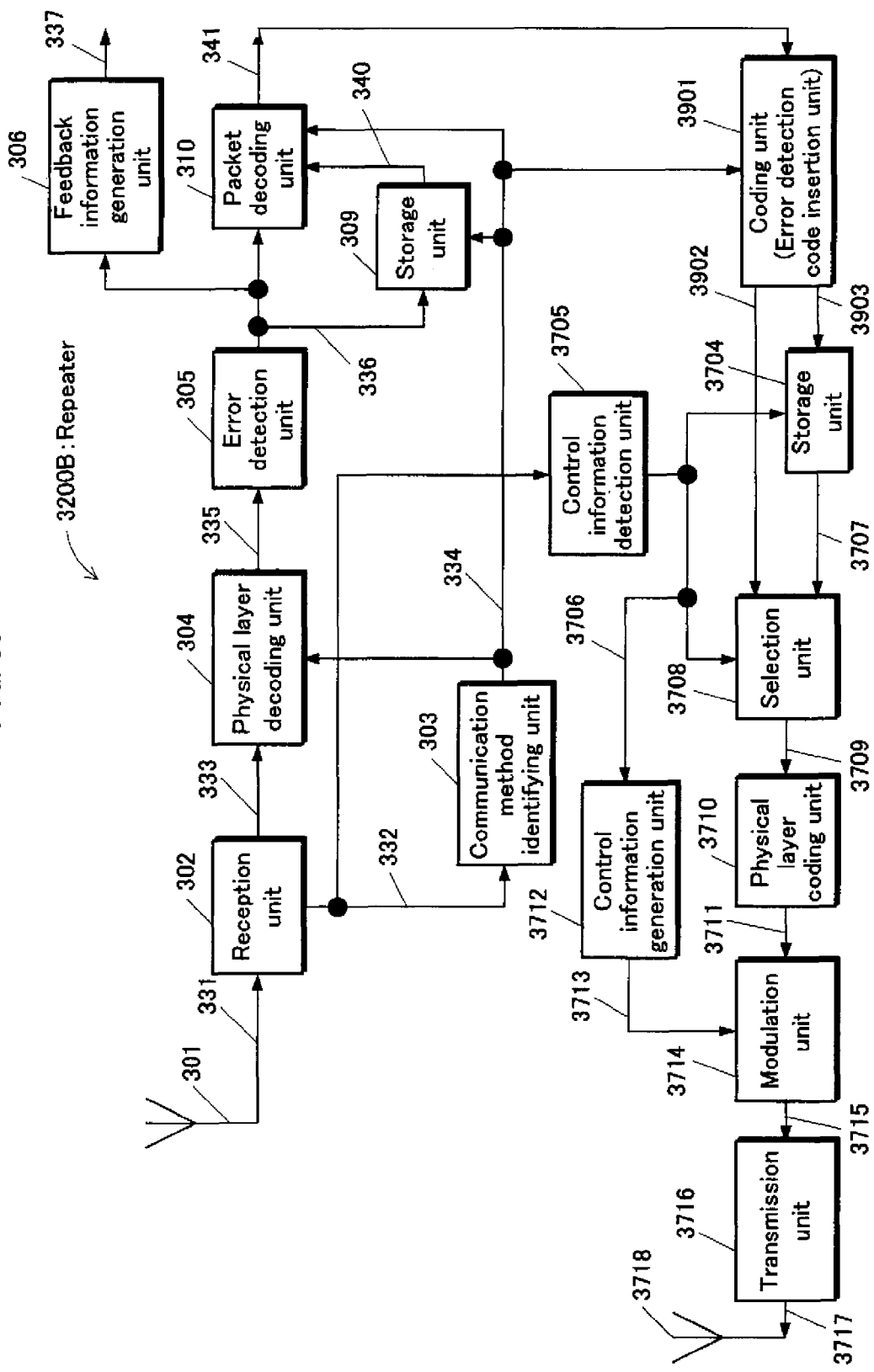
FIG. 39 is another structural diagram (part II) of the repeater of the eleventh embodiment.

FIG. 38 is different from FIG. 36, and shows an example of communication among the base station, the repeater and the terminals. Specifically, FIG. 38 shows an example of communication in a case where the base station either "uses the systematic codes in performing coding at a packet level, and transmits the packets composed of both the information pieces and parities" or "transmits packets that are coded with use of non-systematic codes at a packet level" described with use of FIG. 35. In this case, the base station does not clearly distinguish between the information packets and the parity packets. Therefore, it is difficult for the packet separation unit 3701 to separate the packets as shown in FIG. 37. That is, the packet separation unit 3701 is unable to separate the packets into the information packets and parity packets. Therefore, as shown in FIG. 39 which is a structural diagram of the repeater in this case, the repeater 3200B includes a packet level coding unit 3901 instead of the packet separation unit 3701 shown in FIG. 37.

As shown in FIG. 38, the repeater receives the packet group #A transmitted by the base station, and restores packets of the missing packet group #A by decoding the packet group #A at a packet level. Then, the repeater generates the information packets with use of the restored packets. Then, the repeater transmits the information packets to each of the plurality of terminals.

A terminal #A receives the information packets transmitted by the repeater. When packet loss occurs, the terminal #A makes a retransmission request to the repeater, and transmits the feedback information including the number of lost packets and the numbers of the lost information packets, for example. Similarly, a terminal #B receives the information packets transmitted by the repeater. When packet loss occurs, the terminal #B makes a retransmission request to the repeater, and transmits the feedback information including the number of lost packets and the numbers of the lost information packets, for example.

In this case, when the terminals make retransmission requests (e.g. when the plurality of terminals make retransmission requests), the repeater transmits the parity packets as the data to be retransmitted. Here, the retransmission with use of the parity packets has a merit regarding the retransmission method in the multicast communication mode. However, this case is different from the case shown in FIG. 36 in that the repeater needs to code the information packets at a packet level, and to generate the parity packets.

Therefore, the repeater 3200B is different, as shown in FIG. 39, from the repeater 3200A shown in FIG. 37 as follows. The repeater 3200B receives, as inputs, information packets, and the repeater 3200B includes a coding unit 3901 that performs the coding at a packet level to output the information packets 3902 and the parity packets 3903. Note that although the error detection coding unit is not depicted in FIG. 37, the coding unit 3901 inserts the error detection codes into the packets. Since elements shown in FIG. 39 are the same as the elements shown in FIG. 37 except for the coding unit 3901, the descriptions of these elements are omitted.

As described in the above, when the repeater 3200B relay the packets for the multicast communication (transmitted from the base station), the repeater 3200B generates the information packets and parity packets so as to enable the retransmission in the multicast communication mode. When the plurality of terminals make retransmission requests, the repeater 3200B transmits the parity packets. In such a way, it is possible to improve the data transmission efficiency. Note that the present embodiment describes retransmission with use of the packets. However, when the repeater receives the retransmission requests from the terminals, the repeater may combine the retransmission with use of the packets and the retransmission at the physical layer, as shown in FIGS. 17 and 19.

Also, a description is given of the exemplary case where the base station transmits, to the repeater, the packets that have been coded at a packet level. However, the present invention is not limited to this case. There may be a case where the repeater transmits the packets that have not been coded at a packet level. In this case, when the packet loss occurs, the repeater makes a retransmission request to the base station, and the base station retransmits the packets in accordance with the retransmission request. Also, the repeater may have both of the structures shown in FIG. 37 and FIG. 39.

Twelfth Embodiment

The following describes a twelfth embodiment of the present invention with reference to drawings. The twelfth embodiment describes a multicast relay/retransmission method used in the repeater. Here, this method is capable of shortening time of delay before the packets reach each of the terminals compared to the eleventh embodiment.

FIGS. 40A, 40B, 40C and 40D show an example showing a structure of packets to be transmitted by the base station, the repeaters and the terminals in the present embodiment. FIG. 40A shows packets to be transmitted from the base station to the repeater (also referred to as a direct terminal). The base station performs the coding at a layer at which signal processing is performed earlier than at the physical layer (i.e. coding at a packet level). The base station transmits, to the repeater (also referred to as the direct terminal) information packets #1 to #100 (coded at the physical layer after the CRC insertion) and parity packets #1 to #25 (coded at the physical layer after the CRC insertion).

Then, the repeater receives the packets transmitted by the base station. As shown in FIG. 40B, suppose that: 20 packets (information packets #1, #5, #6, #8, #21, #29, #33, #34, #45, #47, #53, #57, #68, #79, #83 and #90, and parity packets #4, #8, #9 and #24) cannot be obtained as a result of decoding at the physical layer; these 20 packets are missing before the decoding at a packet level; and 105 packets excluding these 20 packets are obtained, for example.

In this case, at first, the repeater transmits, to each of the terminals, 105 packets excluding 20 packets of 4001 shown in FIG. 40C.

When the terminals make retransmission requests, the repeater obtains 20 packets (information packets #1, #5, #6, #8, #21, #29, #33, #34, #45, #47, #53, #57, #68, #79, #83 and #90, and parity packets #4, #8, #9 and #24 that are missing before the decoding at a packet level) shown in FIG. 40D as a result of the decoding at a packet level, and transmits these 20 packets as packets for retransmission. However, FIG. 40A, FIG. 40B, FIG. 40C and FIG. 40D show the exemplary case where 20 packets (information packets #1, #5, #6, #8, #21, #29, #33, #34, #45, #47, #53, #57, #68, #79, #83 and #90, and parity packets #4, #8, #9 and #24) are retransmitted. However, the data transmission efficiency may be prioritized and, the repeater may select the number of packets that is less than 20 from among 20 packets and retransmits the selected packets.

The following is possible, for example. The repeater may select 15 packets from among the above 20 packets at the time of the first retransmission, and transmits the selected packets as the packets for retransmission. When the terminals make retransmission requests again, the repeater transmits five packets that have not been transmitted to each of the terminals from among the above 20 packets, at the time of the second retransmission. In this case, the repeater may notify each of the terminals of the number of packets to be transmitted each time the repeater performs retransmission. The repeater performs the notification by transmitting the number of packets as the control information, for example.

As described in the above, the case shown in FIGS. 40A, 40B, 40C and 40D is characterized in that the repeater transmits, to each of the terminals, the packets obtained before the decoding at a packet level first; and when the terminals make retransmission requests, the repeater transmits restored packets obtained as a result of the decoding at a packet level. Note that a description is given later of an effect of the multicast relay/retransmission method used in the repeater as shown in FIGS. 40A, 40B, 40C and 40D, with use of FIG. 42 and FIG. 43.

FIGS. 41A, 41B, 41C and 41D are different from FIGS. 40A, 40B, 40C and 40D, and show an example showing a structure of packets to be transmitted by the base station, the repeaters and the terminals in the present embodiment. In an example shown below, the data size of one information packet and the data size of one parity packet (excluding control information and information on error detection codes) are identical. FIG. 41A shows packets to be transmitted by the base station to the repeater (also referred to as the direct terminal). The base station performs the coding at a layer at which signal processing is performed earlier than at the physical layer (i.e. coding at a packet level). The base station transmits, to the repeater (also referred to as the direct terminal), information packets #1 to #100 (coded at the physical layer after the CRC insertion) and parity packets #1 to #25 (coded at the physical layer after the CRC insertion). This transmission is performed in the same manner as the transmission shown in FIG. 40A.

Then, the repeater receives the packets transmitted by the base station. As shown in FIG. 41B, suppose that: ten packets (information packets #1, #6, #21, #34, #68, #79 and #90 and parity packets #4 and #24) are missing; and that 115 packets excluding the above ten packets are obtained, for example.

In this case, the number of packets to be initially transmitted is limited in order to improve the data transmission efficiency. In this example, the data size of one information packet and the data size of one parity packet (excluding control information and information on error detection codes) are identical. Therefore, if 101 or more packets (composed of information packets and parity packets) are initially transmitted, each of the terminals can restore the information packets by performing the decoding at a packet level. Therefore, the repeater initially transmits 110 packets in this case. Specifically, the repeater selects 110 packets from among 115 packets obtained by the decoding at the physical layer (e.g. 110 packets shown in FIG. 41C), and initially transmits, to each of the terminals, the selected 110 packets.

When the terminals make retransmission requests, the repeater transmits 15 packets (e.g. 15 packets shown in FIG. 41D) excluding the packets selected and initially transmitted, for example. Note that when the repeater retransmits the packets, the ten packets (information packets #1, #6, #21, #34, #68, #79 and #90 and parity packets #4 and #24) that are missing before the decoding at a packet level are restored by the decoding at a packet level. Therefore, the repeater may also retransmit the packets that have been restored by the decoding at a packet level.

In the example shown in FIGS. 41A, 41B, 41C and 41D, the repeater initially transmits 110 packets, and retransmits 15 packets that have not been initially transmitted. However, the data transmission speed may be prioritized, and the repeater may select, from among 15 packets, the number of packets that is smaller than 15 packets and retransmits the selected packets.

The following example is possible. The repeater selects ten packets from among 15 packets that have not been initially transmitted and transmits the selected packets at the time of the first retransmission. When the terminals make retransmission requests again, the repeater selects five packets that have not been transmitted to the terminals, and retransmits the selected five packets at the time of the second retransmission.

As described in the above, the example shown in FIGS. 41A, 41B, 41C and 41D is characterized in that: the repeater transmits a predetermined number of packets to each of the terminals from among the packets obtained before the decoding at a packet level; and when terminals make retransmission requests, the repeater selects packets to be retransmitted from among the restored packets obtained as a result of the decoding at a packet level and the packets that have not been initially transmitted, and transmits the selected packets. Note that a description is given later of an effect of the multicast relay/retransmission method used in the repeater as shown in FIGS. 41A, 41B, 41C and 41D, with use of FIG. 42 and FIG. 43.

It is natural that the number of packets to be initially transmitted is not limited to 110 packets in FIGS. 41A, 41B, 41C and 41D. Therefore, the number of packets to be initially transmitted may be any number as long as the number is enough to restore the information packets by the decoding at a packet level in each of the terminals. Also, the repeater may change the number (the number of packets to be initially retransmitted) as time lapses. For example, the repeater may recognize a communication state with each of the terminals with use of the feedback information obtained from the terminal, and changes the number of packets to be initially transmitted in accordance with the state. Specifically, when the communication state is judged to be well, the number of packets to be initially transmitted is reduced. When the communication state is judged to be not well, the number of packets to be initially transmitted is increased. The state of the communication state is judged in accordance with reception strength and a packet error rate in each of the terminals, for example. Note that it is preferable that the repeater notifies the terminals of the numbers of packets to be transmitted each time the repeater performs transmission in this case. That is, the repeater preferably transmits the number of packets that have been transmitted, as control information.

Also, in the example described with use of FIGS. 41A, 41B, 41C and 41D, the data size of one information packet and the data size of one parity packet (excluding control information and information on the error detection codes, for example) are identical. However, it is possible to execute the above operations even if the data size of one information packet and the data size of one parity packet are different. However, it is necessary that the amount of information the repeater needs to initially transmit is set such that a total number of bits composing information packets and parity packets to be initially transmitted is larger than X bits. Here, X bits is the number of all information bits composing actual data that is obtained after each of the terminals receives and decodes the packets.

For example, when the number of bits composing one information packet (excluding information other than information such as control information) is 512 bits in FIGS. 41A, 41B, 41C and 41D, the numbers of bits to be transmitted to the terminals are each 51200 bits (512 (the number of bits composing one packet)×100 (number of information packets)). Therefore, the repeater should initially transmit the number of information packets and parity packets so that the number of bits composing all the information packets and parity packets is larger than 51200 bits.

Figure 42:
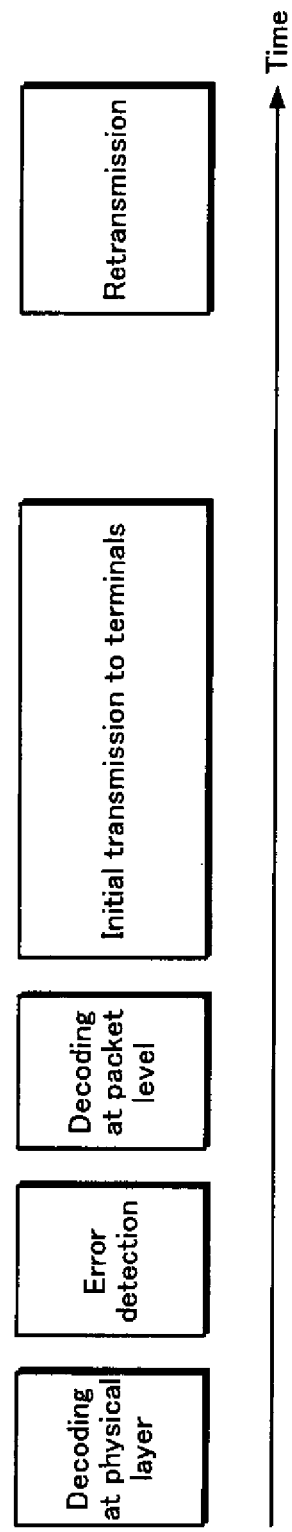
FIG. 42 shows a conceptual diagram showing an example of signal processing timing in the repeater of the eleventh embodiment.
Figure 43:
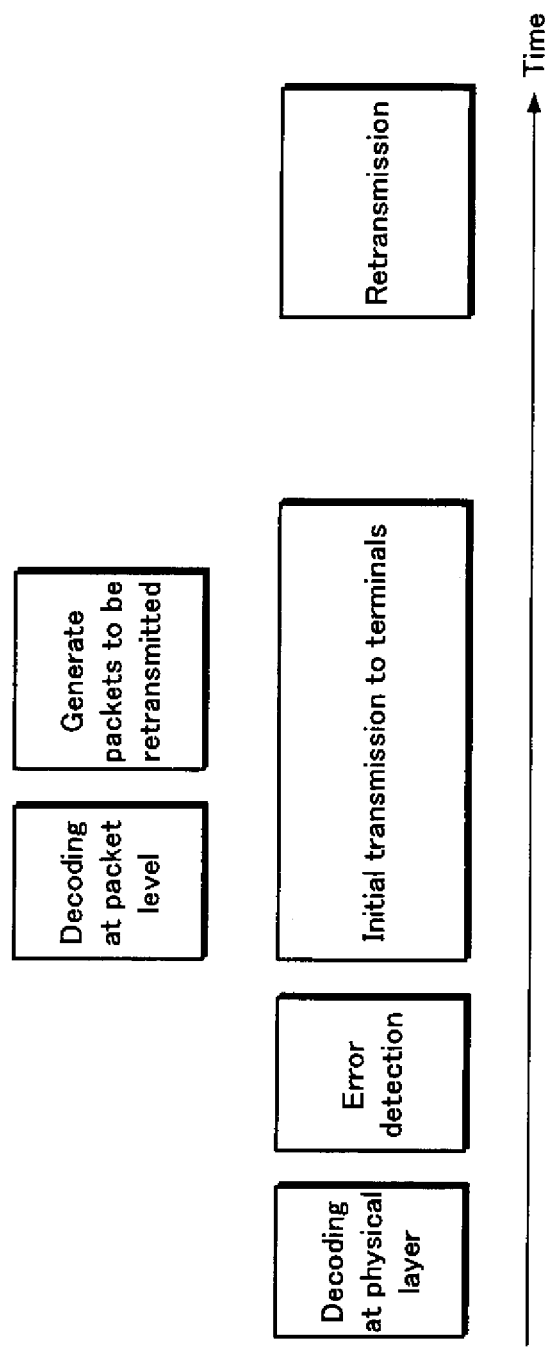
FIG. 43 shows a conceptual diagram showing an example of signal processing timing in the repeater of the twelfth embodiment.

The following describes the effects of the relay method and the multicast relay method used in the repeater (described with use of FIGS. 40A, 40B, 40C and 40D and FIGS. 41A, 41B, 41C and 41D), with use of FIG. 42 and FIG. 43.

FIG. 42 is a conceptual diagram showing one brief example of signal processing timing in a time axis at the time of the relaying and the multicast retransmission described in the eleventh embodiment. As shown in FIG. 42, the repeater performs the decoding at the physical layer, error detection and the decoding at a packet level in the state order. Subsequently, the repeater performs the initial transmission to each of the terminals. Then, when the terminals make retransmission requests, the repeater performs the retransmission to the terminal.

FIG. 43 is a conceptual diagram showing one brief example of signal processing timing in a time axis at the time of the relaying and the multicast retransmission described in the present embodiment. FIG. 43 is different from FIG. 42 in that the repeater performs, in FIG. 43, the initial transmission to each of the terminals without the decoding at a packet level. That is, in the example shown in FIG. 43, the repeater starts the decoding at a packet level in FIG. 42 with timing that the repeater starts the initial transmission. Then, the repeater can perform the decoding at a packet level and generate packets to be retransmitted while performing the initial transmission to each of the terminals.

Therefore, it is possible to shorten time of delay before the packets reach each of the terminals compared to the eleventh embodiment with the multicast relay/retransmission method used in the repeater of the present embodiment.

Figure 44:
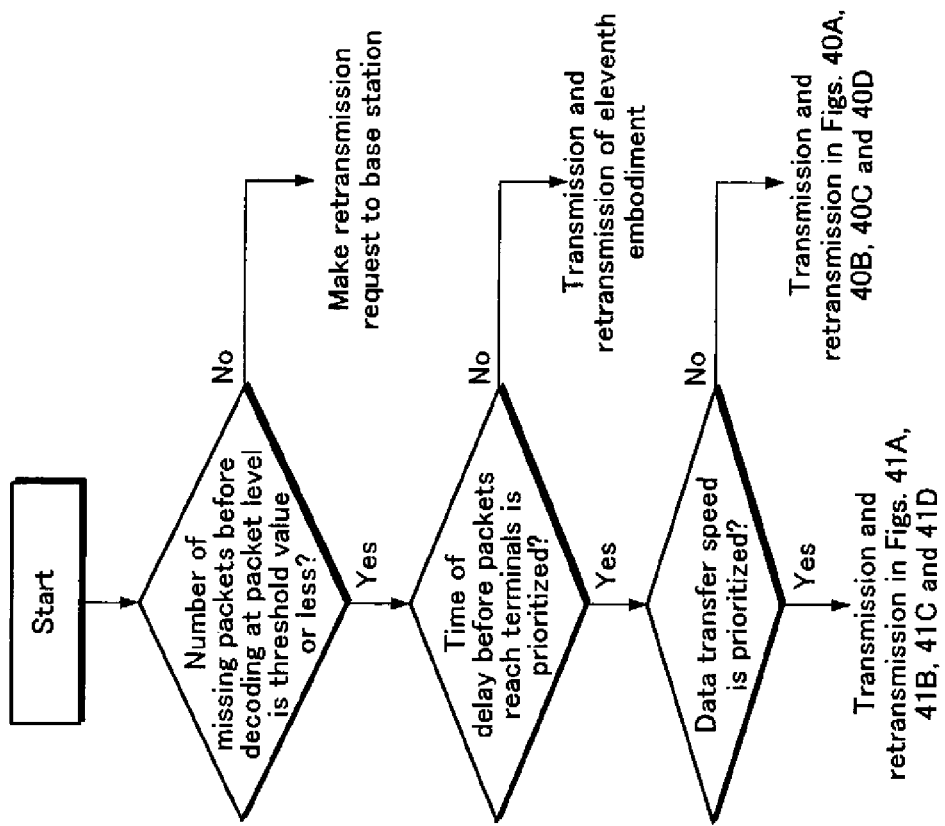
FIG. 44 shows an example of relay operations of the repeater.

FIG. 44 shows an exemplary operation in the repeater. The repeater receives the packets transmitted by the base station, and judges whether or not the number of missing packets before the decoding at a packet level is equal to or less than the threshold value. This is because since the number of bits (or the number of packets) necessary for restoring the packets by the decoding at a packet level is known as described in the above, it is possible to judge whether or not it is worthwhile to perform the decoding at a packet level. When the number of missing packets is not equal to or less than the threshold value, the repeater makes a retransmission request to the base station. When the number of missing packets is equal to or less than the threshold value, processing proceeds to a next step.

Subsequently, the repeater checks whether or not the time of delay before the packets reach each of the terminals should be prioritized. When the time of delay before the packets reach each of the terminals is not prioritized, the repeater selects the relay method or the retransmission method described in the eleventh embodiment, for example. When the time of delay before the packets reach each of the terminals is prioritized, the processing proceeds to a next step.

Next, the repeater checks whether or not data transfer speed is to be prioritized. When the data transfer speed is not prioritized, the repeater selects the relay method and the retransmission method shown in FIGS. 40A, 40B, 40C and 40D. When the data transfer speed is prioritized, the repeater selects the relay method and the retransmission method shown in FIGS. 41A, 41B, 41C and 41D.

Each of the relay methods and the retransmission methods may be a fixed method. However, it is possible to switch among the relay methods and the retransmission methods in accordance with the state as shown in FIG. 44.

Figure 45:
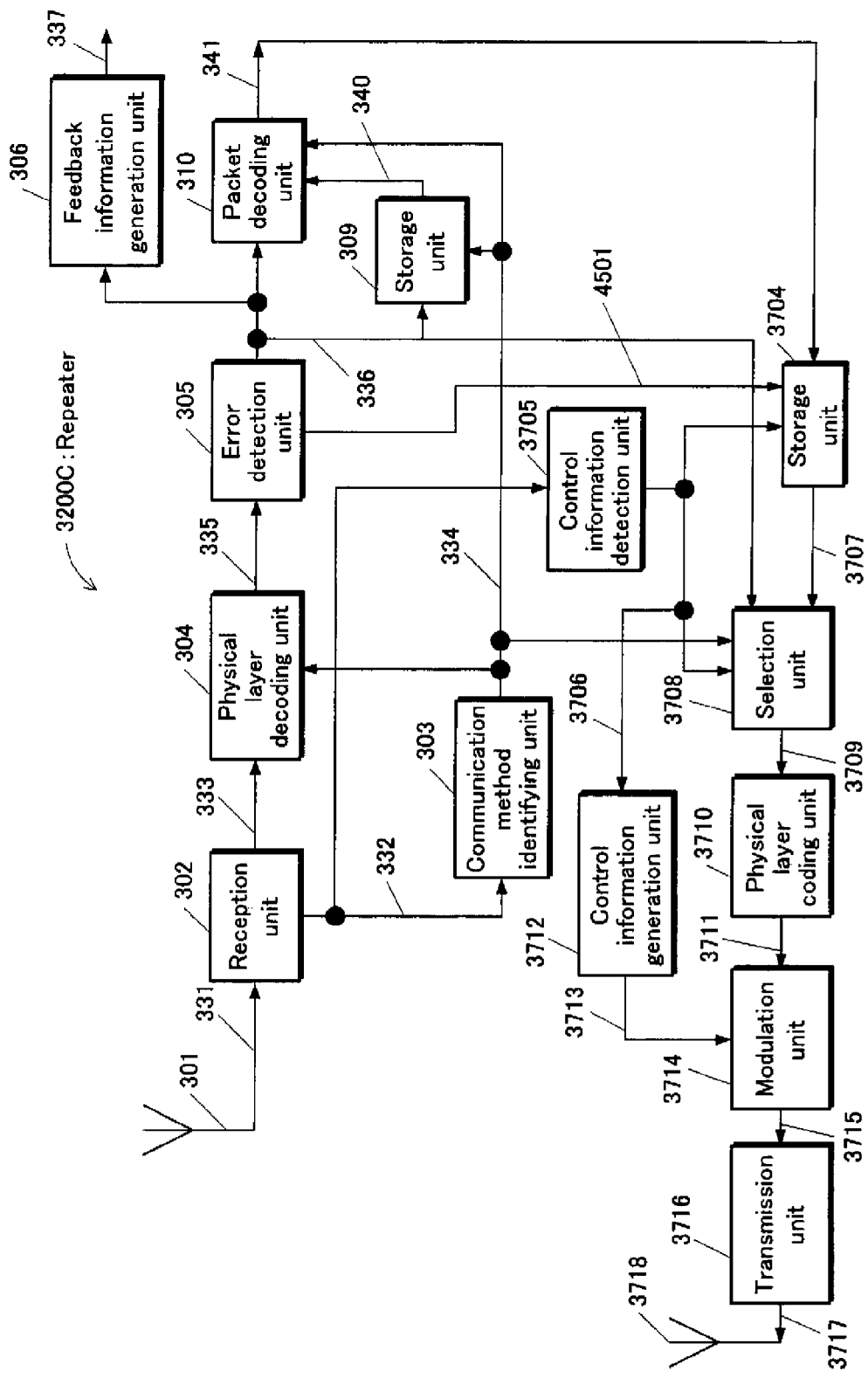
FIG. 45 is a structural diagram of the repeater that executes the relay operations shown in FIGS. 40A, 40B, 40C and 40D.
Figure 46:
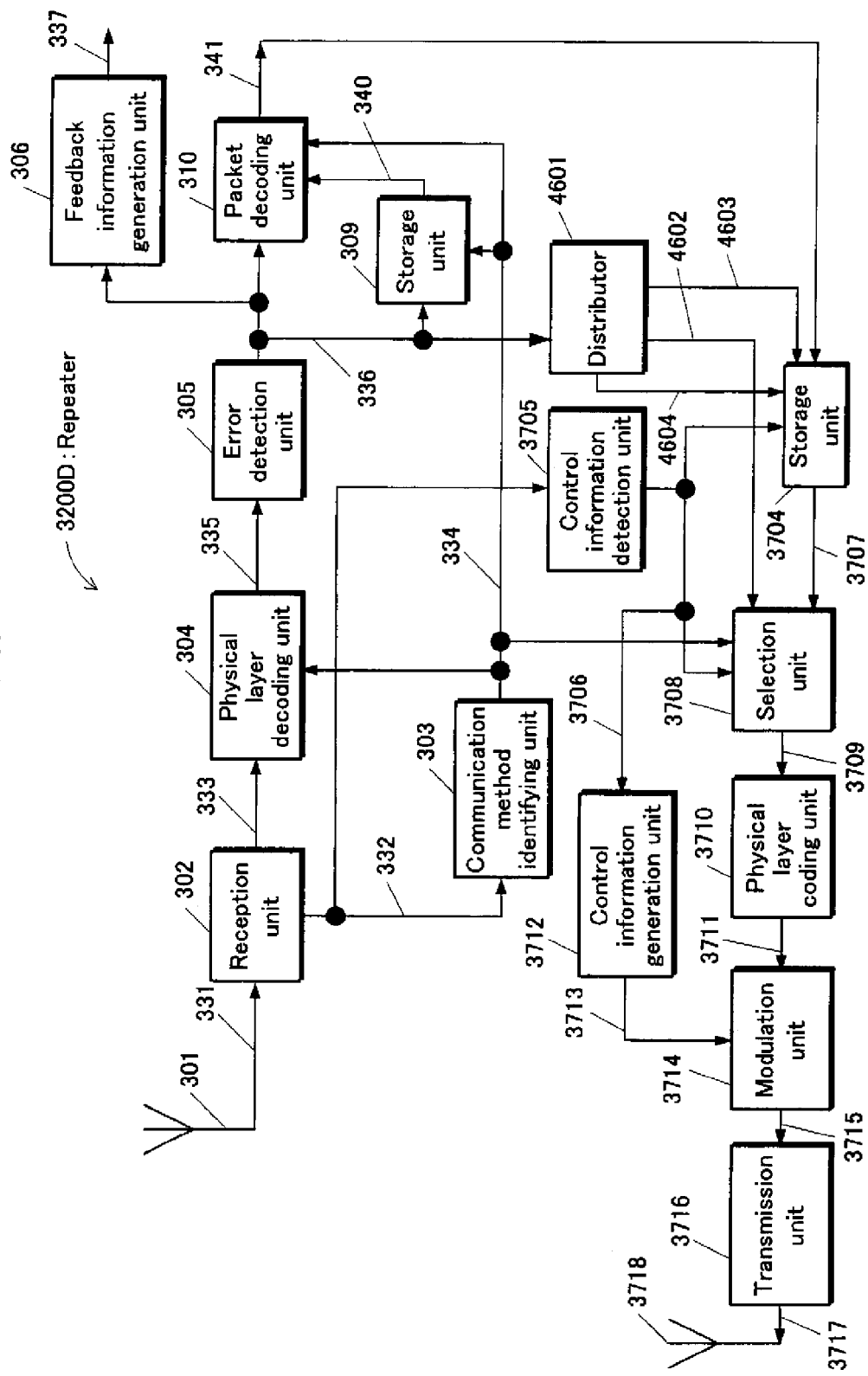
FIG. 46 is a structural diagram of the repeater that executes relay operation shown in FIGS. 41A, 41B, 41C and 41D.

The following describes the operations of each of the elements composing the repeater with use of FIG. 45 and FIG. 46.

FIG. 45 shows an example of the structure of a repeater 3200C that uses the relay and multicast retransmission method shown in FIGS. 40A, 40B, 40C and 40D. Therefore, the same reference numerals are given to the elements that operate in the same manner as the elements shown in FIG. 37. The following describes differences in operations between FIG. 45 and FIG. 37.

In FIG. 45, it is possible to recognize packets having no errors after the decoding at the physical layer with use of the error detection result and the packet data 336. Also, the error detection unit 305 outputs a control signal 4501 relating to the numbers of the erroneous packets.

The storage unit 3704 receives, as inputs, the packets 341 obtained by the decoding at a packet level and a control signal 4501. The storage unit 3704 extracts the packets that have been restored by the decoding at a packet level and stores the decoded packets therein. Also, the storage unit 3704 receives a control signal 3706 as an input. When the control signal 3706 is information relating to the retransmission to each of the terminals, the storage unit 3704 selects the number of packets to be outputted from among the stored packets based on such information, and outputs the packets 3707 to be retransmitted.

The selection unit 3708 receives, as inputs, the error detection result, the packet data 336, the packets 3707 to be retransmitted and the control signal 3706. When the control signal 3706 indicates the initial transmission to the terminal, the selection unit 3708 selects the error detection result and the packet data 336, and outputs the selected packets 3709. The packet data 336 is packets having no error after the decoding at the physical layer. Then, the selection unit 3708 outputs the packets 3707 to be retransmitted when the control signal 3706 indicates retransmission to each of the terminals.

FIG. 46 shows an example of the structure of a repeater 3200D that uses the relay and multicast retransmission method shown in FIGS. 41A, 41B, 41C and 41D. Therefore, the same reference numerals are given to the elements that operate in the same manner as the elements shown in FIG. 37. The following describes differences between FIG. 46 and FIG. 37.

In FIG. 46, it is possible to recognize packets having no errors by the decoding at the physical layer with use of the error detection result and the packet data 336.

A distribution unit 4601 receives, as inputs, the result of the error detection and the packet data 336. The distribution unit 4601 outputs the number of packets to be initially transmitted from among the packets having no error (after the decoding at the physical layer) as packets 4602 to be initially transmitted, and outputs the rest of the packets 4603 as packets for retransmission. Also, the distribution unit 4601 outputs the control signal 4604 relating to the information of the distributed packets.

The storage unit 3704 receives, as inputs, the packets 341 obtained by the decoding at a packet level, the packets 3707 to be retransmitted and the control signal 4604. The storage unit 3704 extracts the packets that have been restored by the decoding at a packet level and stores therein the decoded packets together with the packets 3707 to be retransmitted. Also, the storage unit 3704 receives the control signal 3706 as an input. When the control signal 3706 is information relating to the retransmission to each of the terminals, the storage unit 3704 selects the number of packets to be outputted from among the stored packets based on such information, and outputs the packets 3707 to be retransmitted.

The selection unit 3708 receives, as inputs, initial transmission packets 4602, the packets 3707 to be retransmitted and the control signals 3706. When the control signal 3706 indicates the initial transmission to each of the terminals, the selection unit 3708 selects the packets 3707 to be retransmitted and outputs the selected packets 3709. Then, the selection unit 3708 outputs the packet 3707 to be retransmitted when the control signal 3706 indicates retransmission to each of the terminals.

FIGS. 47A, 47B, 47C and 47D and 48A, 48B, 48C and 48D are different from FIGS. 40A, 40B, 40C and 41D and 41A, 41B, 41C and 41D, and show an example showing a structure of packets to be transmitted by the base station, the repeaters and the terminals in the present embodiment. In an example shown below, the data size of one information packet and the data size of one packet (excluding control information and information on error detection codes) are identical. The following describes how FIGS. 47A, 47B, 47C and 47D and 48A, 48B, 48C and 48D are greatly different from FIGS. 40A, 40B, 40C and 41D and 41A, 41B, 41C and 41D. In FIGS. 40A, 40B, 40C and 41D and 41A, 41B, 41C and 41D, the information packets and the parity packets are distinguished. In FIGS. 47A, 47B, 47C and 47D and 48A, 48B, 48C and 48D, on the other hand, the information packets and the parity packets are not distinguished. Therefore, when the systematic codes are used in the coding at a packet level in FIGS. 47A, 47B, 47C and 47D and 48A, 48B, 48C and 48D, the packets are composed of information pieces and parities. Note that the codes used in the coding at a packet level may be non-systematic codes.

FIG. 47A shows packets to be transmitted by the base station to the repeater (also referred to as the direct terminal). The base station performs the coding at a layer at which signal processing is performed earlier than at the physical layer (i.e. coding at a packet level). The base station codes information packets #1 to #100 (coded at the physical layer after the CRC insertion) to generate parity packets #101 to #125. Then, the base station transmits the packets #1 to #125 to the repeater (also referred to as the direct terminal).

Then, the repeater receives the packets transmitted by the base station. As shown in FIG. 47B, suppose that: 20 packets (packets #1, #5, #6, #8, #21, #29, #33, #34, #45, #47, #53, #57, #68, #79, #83, #90, #104, #108, #109 and #124) cannot be obtained as a result of the coding at the physical layer; these 20 packets are missing before the coding at a packet level; and 105 packets excluding the above 20 packets are obtained, for example.

In this case, the repeater transmits, to each of the terminals, 105 packets (shown in FIG. 47C) excluding 20 packets of 4701 shown in FIG. 40B.

When the terminals make retransmission requests, the repeater obtains 20 packets (packets #1, #5, #6, #8, #21, #29, #33, #34, #45, #47, #53, #57, #68, #79, #83, #90, #104, #108, #109 and #124 that are missing before the decoding at a packet level) by the decoding at a packet level, and retransmits these 20 packets (shown in FIG. 47B). However, FIG. 47A, FIG. 47B, FIG. 47C and FIG. 47D show the exemplary case where 20 packets (packets #1, #5, #6, #8, #21, #29, #33, #34, #45, #47, #53, #57, #68, #79, #83 and #90, #104, #108, #109 and #124) are retransmitted. However, the data transmission efficiency may be prioritized, and the repeater may select the number of packets that is less than 20 from among 20 packets, and retransmits the selected packets.

The following is possible, for example. The repeater may select 15 packets from among the above 20 packets at the time of the first retransmission, and transmits the selected packets as the packets for retransmission. When the terminals make retransmission requests again, the repeater transmits five packets that have not been transmitted to each of the terminals from among the above 20 packets, at the time of the second retransmission. In this case, the repeater may notify each of the terminals of the number of packets to be transmitted each time the repeater performs retransmission. The repeater performs the notification by transmitting the number of packets as the control information, for example.

As described in the above, the case shown in FIGS. 47A, 47B, 47C and 47D is characterized in that the repeater transmits, to each of the terminals, the packets obtained before the decoding at a packet level first; and when the terminals make retransmission requests, the repeater transmits restored packets obtained as a result of the decoding at a packet level.

FIGS. 48A, 48B, 48C and 48D show an example showing a structure of packets to be transmitted by the base station, the repeaters and the terminals in the present embodiment. In an example shown below, the data size of one information packet and the data size of one packet (excluding control information and information on error detection codes) are identical.

FIG. 48A shows packets to be transmitted by the base station to the repeater (also referred to as the direct terminal). The base station performs the coding at a layer at which signal processing is performed earlier than at the physical layer (i.e. coding at a packet level). The base station codes information packets #1 to #100 (coded at the physical layer after the CRC insertion) to generate packets #101 to #125. Then, the base station transmits the packets #1 to #125 to the repeater (also referred to as the direct terminal).

Then, the repeater receives the packets transmitted by the base station. As shown in FIG. 48B, suppose that: 10 packets (packets #1, #6, #21, #29, #34, #68, #79, #90, #104 and #124) cannot be obtained as a result of the coding at the physical layer; these 10 packets are missing before the coding at a packet level; and 115 packets excluding the above 10 packets are obtained, for example.

In this case, the number of packets to be initially transmitted is limited in order to improve the data transmission efficiency. In this example, the data size of one information packet and the data size of one packet (excluding control information and information on error detection codes) are identical. Therefore, if 101 or more packets are initially transmitted, each of the terminals receives 101 or more packets without losing any of the packets. Therefore, each of the terminals can restore the information packets by the decoding at a packet level. Therefore, the repeater initially transmits 110 packets and selects 110 packets from among 115 packets obtained as a result of the decoding at the physical layer. Then, the repeater initially transmits the selected 110 packets shown in FIG. 48C to each of the terminals.

When the terminals make retransmission requests, the repeater transmits 15 packets excluding the initially-transmitted packets, for example. Note that 10 packets (packets #1, #6, #21, #29, #34, #68, #79, #90, #104 and #124 that are missing before the decoding at a packet level) are restored by the decoding at a packet level.

In the case shown in FIGS. 48A, 48B, 48C and 48D, the repeater initially transmits 110 packets and retransmits 15 packets that have not been initially transmitted. However, the data transmission speed may be prioritized, and the repeater may select, from among 15 packets, the number of packets that is smaller than 15 packets, and retransmits the selected packets.

The following is possible, for example. The repeater may select 10 packets from among 15 packets that have not been initially transmitted, and transmits the selected packets as the packets at the time of the first retransmission. When the terminals make retransmission requests again, the repeater transmits five packets that have not been transmitted to each of the terminals, at the time of the second transmission.

As described in the above, the case shown in 48A, 48B, 48C and 48D is characterized in that: the repeater transmits, to each of the terminals, a predetermined number of packets from among packets obtained before the decoding at a packet level first; and when the terminals make retransmission requests, the repeater selects packets to be transmitted from among the restored packets obtained by the decoding at a packet level and packets that have not been initially transmitted, and transmits the selected packets.

Note that when the relay and multicast retransmission method as shown in FIGS. 47A, 47B, 47C and 47D or 48A, 48B, 48C and 48D is used, operations of the repeaters can be performed with use of the repeaters shown in FIG. 45 and FIG. 46.

When the repeater relays packets for the multicast communication that are transmitted by the base station, the repeater initially transmits the packets having no error at the physical layer as shown in the above. The repeater retransmits the packets that are obtained as a result of the decoding at a packet level. In this way, it is possible to improve the data transmission efficiency and to shorten time taken for the packets to reach each of the terminals. Note that the present embodiment describes retransmission with use of the packets. However, when the repeater receives the retransmission request from each of the terminals, the repeater may combine the retransmission with use of the packets and the retransmission at the physical layer, as shown in FIG. 17 and FIG. 19.

Also, a description is given of the exemplary case where the base station transmits, to the repeater, the packets that have been coded at a packet level. However, the present invention is not limited to this case. There may be a case where the repeater transmits the packets that have not been coded at a packet level. In this case, when the packet loss occurs, the repeater makes a retransmission request to the base station, and the base station retransmits the packets in accordance with the retransmission request.

Also, it is described in FIGS. 41A, 41B, 41C and 41D and FIGS. 48A, 48B, 48C and 48D that 110 packets selected by the repeater as packets to be initially transmitted are first 110 packets from among packets having no error. However, the packets can be selected in accordance with any criteria. Therefore, the packets may be selected completely randomly or may be selected in order of the decoding at the physical layer, for example.

Thirteenth Embodiment

The following describes a thirteenth embodiment of the present invention with reference to drawings. The eleventh and twelfth embodiments describe the examples of the multicast retransmission in the repeater. However, the present embodiment describes how the repeater switches the transmission method including the retransmission method as shown in FIG. 32. The repeater switches the transmission method based communication environment such as the type of data and the number of terminals to which the repeater relay the packets (i.e. terminals to which the packets are simultaneously transmitted).

FIGS. 49A and 49B each show an example of the frame structure of a signal transmitted by the base station. FIG. 49A shows an example of the frame structure of the signal transmitted by the base station when the repeater determines the transmission method, and FIG. 49B shows an example of the frame structure of the signal transmitted by the base station when the base station determines, for the repeater, the transmission method.

In FIG. 49A, information 4901 is information relating to the type of data, and including information showing whether the packets to be transmitted are for packets for the multicast communication.

Information 4902 is information relating to need for real-time processing, and is used for indicating whether or not the packets to be transmitted to each of the terminals need to be processed in real time.

Information 4903 is relay number information that shows the number of times the repeater transmits the received packets.

Information 4904 is information relating to a relay/transmission interval and is for setting the number of times the repeater transmits the same packets. Note that the fourteenth embodiment describes how to use the information 4903 and the information 4904.

The information 4904 onwards each show the packets (coded at the physical layer after the CRC insertion) that are transmitted by the base station. The base station transmits the packets #1 to #n. Note that the information packets and the parity packets may be distinguished or not distinguished.

In FIG. 49B, information 4905 is indication information of the relay method in the repeater, and is used by the base station for indicating, to the repeater, the relay method. The information 4905 onwards each show the packets (coded at the physical layer after the CRC insertion) that are transmitted by the base station, as with FIG. 49A.

FIG. 50 shows how the repeater that receives the signal transmitted by the base station selects the transmission (relay) method. In FIG. 50, the repeater receives the signal transmitted by the base station shown in FIGS. 49A and 49B, and selects the transmission (relay) method. As shown in FIG. 49B, when the base station indicates the transmission (relay) method, the repeater transmits the packets in accordance with the indicated transmission method. As shown in FIG. 49A, when the base station transmits the signal from the base station, the terminal, for example, obtains the information pieces 4901 to 4904 transmitted by the base station, and selects the transmission (relay) method based on these information pieces. Then, the terminal transmits the packets in accordance with an appropriate transmission method.

In FIG. 50, 5001 shows a case where the repeater receives the packets transmitted by the base station under condition that no retransmission is performed, and transmits the packets. Specifically, the base station transmits the packets that have been coded at a packet level, and the repeater receives the packets. Then, the repeater completes decoding of the packets at a packet level, and then transmits the information on the packets transmitted by the base station. That is, the repeater transmits the packets that have been coded at a packet level. The case 5001 shown in FIG. 50 shows an exemplary case where the packets transmitted by the base station and the packets to be transmitted by the repeater have the same structure. The present invention is not limited to this case. Therefore, the packets transmitted by the base station and the packets to be transmitted by the repeater may have a difference packet size. Also, some details of the case 5001 shown in FIG. 50 are omitted. Specifically, control information etc. is transmitted together with the packets shown in the case 5001.

5002 shows a case where the repeater receives the packets transmitted by the base station under condition that retransmission is to be performed, and transmits the packets. Specifically, the base station transmits the packets that have been coded at a packet level, and the repeater receives the coded packets. The repeater initially transmits some of the received packets (instead of all of the received packets) as described in the first, second, sixth, eleventh and twelfth embodiments. The repeater receives, from each of the terminals, feedback information relating to the initial transmission. When the retransmission is necessary, the repeater transmits packets for retransmission.

5003 shows a case where the repeater receives the packets transmitted by the base station under condition that retransmission is to be performed, and transmits the packets. Specifically, the base station transmits the packets that have been coded at a packet level, and the repeater receives the coded packets. The repeater performs the communication method of the frame structure shown in FIG. 17 and FIG. 19 as described in the fourth and fifth embodiments. In this case, the repeater receives the packets transmitted by the base station. The repeater initially transmits some of the received packets. Then, the repeater receives, from each of the terminals, the feedback information relating to the initial transmission. Subsequently, the repeater performs the retransmission shown in FIG. 17 and FIG. 19.

Note that there may be a case where the base station does not perform the coding at a packet level. In that case, the repeater transmits a signal transmitted by the base station. The repeater transmits the packets shown by the received signal.

Figure 51:
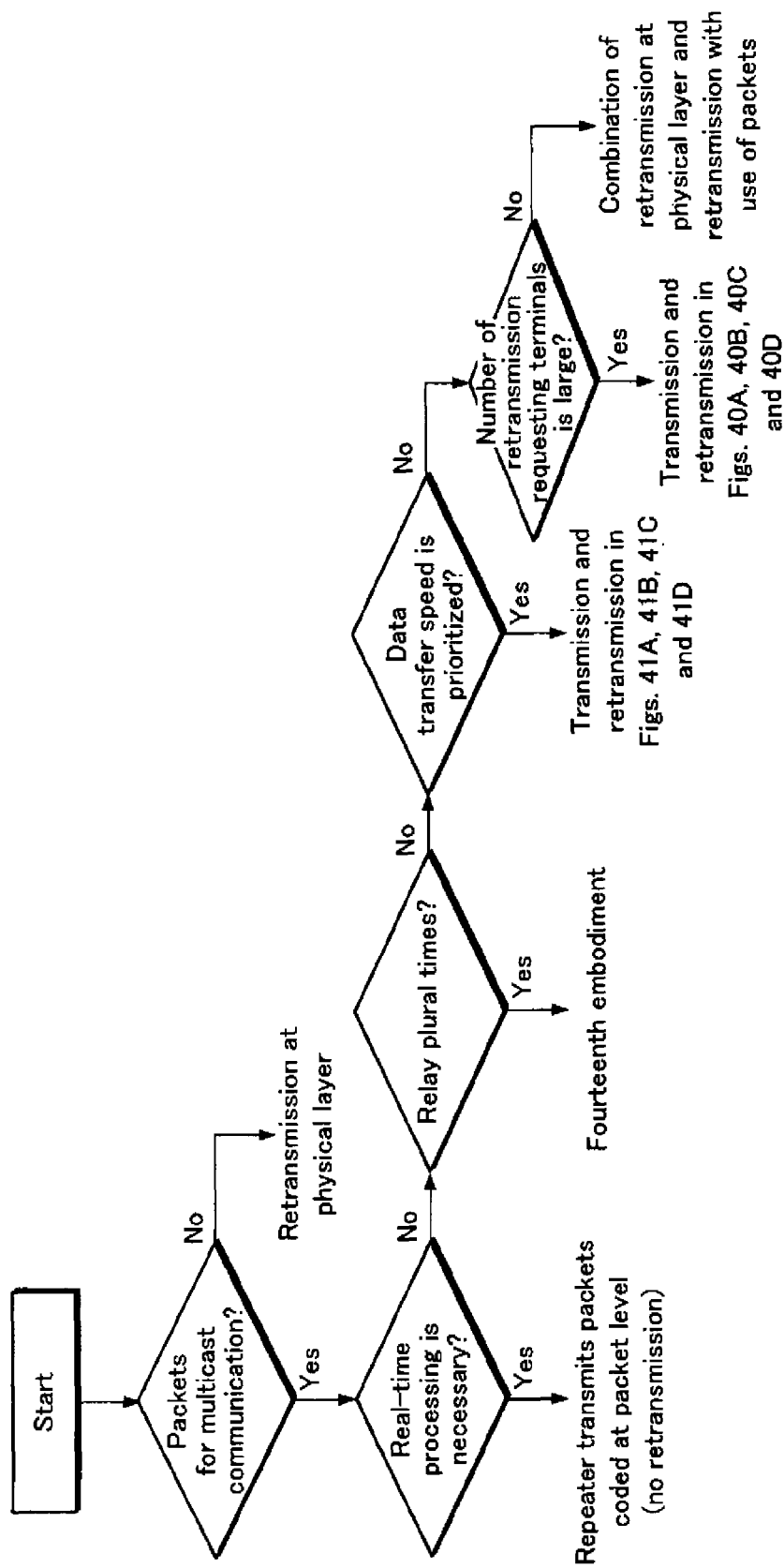
FIG. 51 shows an example of selection operations of the transmission method in the repeater.

FIG. 51 shows an example relating to how to select the relay (transmission) method in the repeater. First of all, when the repeater relays the packets transmitted by the base station, the repeater checks whether or not the packets are for the multicast communication. When the packets are not for the multicast communication, the repeater transmits the packets. Also, the repeater performs the retransmission at the physical layer (e.g. Chase Combining and Hybrid ARQ) when the terminals make retransmission requests.

When the packets are packets for the multicast communication, the repeater subsequently checks whether or not the packets need to be processed in real time (whether or not real-time processing is necessary). When the real-time processing is necessary, the repeater does not respond to retransmission of the terminals, and transmits the packets that have been coded at a packet level. Thus, the terminals can obtain the high reception quality as a result of the decoding at a packet level.

When the real-time processing is not necessary, the repeater checks whether or not to perform the relay a plurality of times (i.e. whether or not the packets are to be transmitted a plurality of times after receiving the packets transmitted by the base station). Then, when the packets need to be transmitted a plurality of times, the repeater adopts the transmission method described in the fourteenth embodiment. Note that since the transmission method is described in detail in the fourteenth embodiment, the descriptions thereof are omitted.

When the packets do not have to be transmitted a plurality of times, the repeater checks whether or not the data transfer speed is to be prioritized. When the data transfer speed is prioritized, the repeater receives the packets transmitted by the base station in the transmission/retransmission method shown in FIGS. 41A, 41B, 41C and 41D. When the terminals make initial transmission/retransmission requests, the repeater adopts the transmission method as shown in FIGS. 41A, 41B, 41C and 41D.

When the data transfer speed is not prioritized, the repeater receives the packets transmitted by the base station first, and transmits packets to be initially transmitted from among the received packets. Next, the repeater checks the number of terminals that have made the retransmission request. Then, when the number of retransmission requests is large, the repeater performs the retransmission shown in FIGS. 40A, 40B, 40C and 40D. When the number of retransmission requests is small, the repeater performs the retransmission shown in FIGS. 17 and 19.

Figure 52:
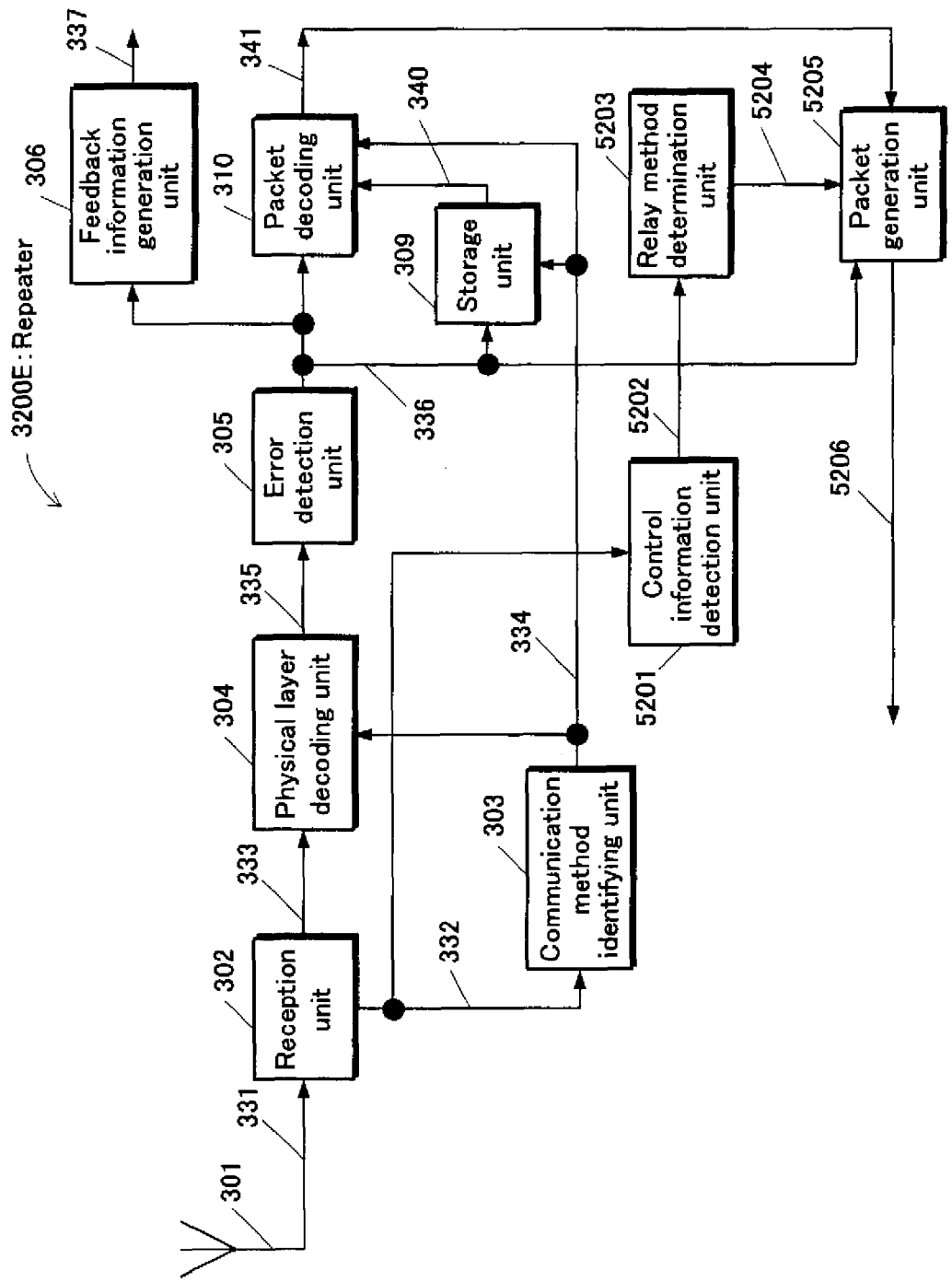
FIG. 52 is a structural diagram showing an example of part of a function of the repeater.

FIG. 52 shows an example of the structure of part of the functions of a repeater E. In FIG. 52, the same reference numerals are given to elements that operate in the same manner as the elements shown in FIG. 4.

When receiving a signal transmitted by the base station, a control information detection unit 5201 extracts control information included in the signal transmitted by the base station, and outputs control information 5202.

A relay method determination unit 5203 receives the control information 5202 as an input. The relay method determination unit 5203 determines the relay method (initial transmission method) and/or the retransmission method, and outputs a determining method signal 5204.

When receiving a signal transmitted by each of the terminals, the control information detection unit 5201 extracts control information included in the signal transmitted by the terminal, and outputs control information 5202.

The relay method determination unit 5203 receives the control information 5202 as an input. The relay method determination unit 5203 detects whether or not the terminals have made the retransmission requests. When the terminal has made the retransmission request, the relay method determination unit 5203 determines the retransmission method, and outputs the determined method signal 5204.

When receiving the signal transmitted by the base station, a packet generation unit 5205 receives, as inputs, the determined method signal 5204 and the decoded packets 341 in any of the cases: where the packet generation unit 5205 receives the signal transmitted by each of the base station; and where the packet generation unit 5205 receives the signal transmitted by each of the terminals. The packet generation unit 5205 generates the packets 5206 for the transmission/retransmission method in accordance with the determined method signal 5204, and outputs the generated packets. Then, the repeater performs predetermined processing on the packets 5206 for the transmission/retransmission method, and transmits, to each of the terminals, the signal corresponding to the transmission/retransmission packets 5206.

As described in the above, the repeater switches the transmission method including the retransmission method in accordance with the communication environment such as the type of data and the number of terminals to which the packets are simultaneously relayed. This makes it possible to improve both the data transfer speed and the packet reception quality in each of the terminals.

Here, a description is given of the exemplary case where the base station transmits, to the repeater, the packets that have been coded at a packet level. However, the present invention is not limited to this case. Therefore, there may be a case where the repeater transmits the packets that have not been coded at a packet level. In this case, when the packet loss occurs, the repeater makes a retransmission request to the base station, and the base station retransmits the packets in accordance with the retransmission request.

Fourteenth Embodiment

The following describes a fourteenth embodiment of the present invention with reference to drawings. The fourteenth embodiment describes the method of transmitting the same packets a plurality of times, as described in the thirteenth embodiment.

Figure 53B:
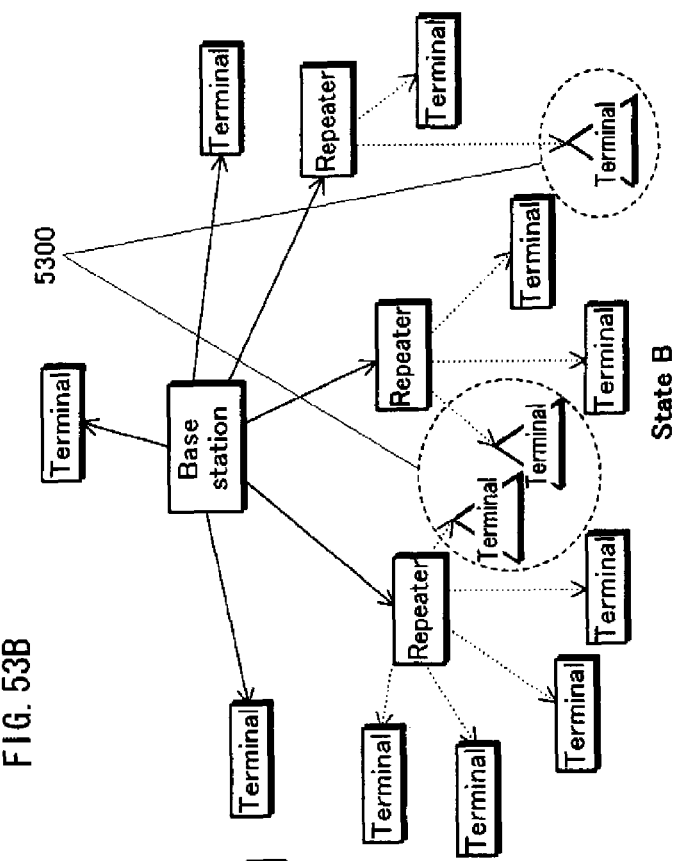
FIGS. 53A and 53B show changes in a state of the network shown in a fourteenth embodiment.
Figure 53A:
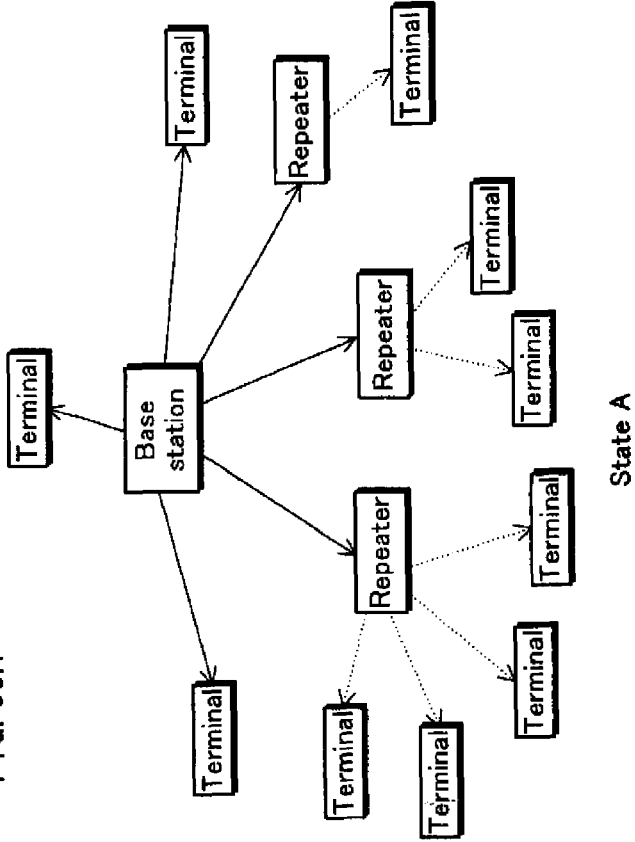

FIGS. 53A and 53B each show an example of a change in the network. Suppose that the base station, the repeater and the terminals are in a state A at a certain time point. After time lapses, the base station, the repeaters and the terminals change to fall in a state B. In this state B, the terminal 5300 newly joins the network.

Figure 54:
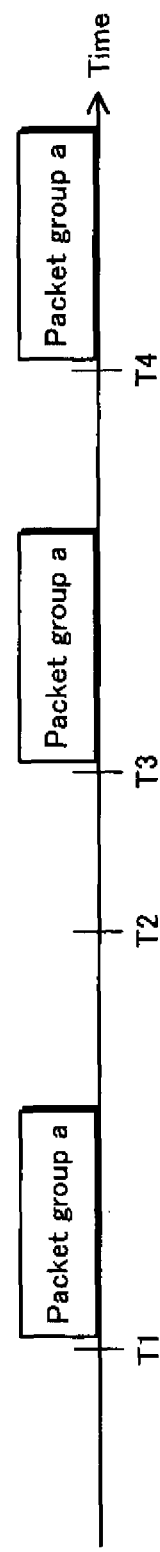
FIG. 54 is a conceptual diagram showing an example of timing at which the repeater transmits packets in accordance with a change in a state of the network.

FIG. 54 shows an example of a transmission state of the packets in the repeater on the time axis. Suppose that the base station indicates, to the repeater, to relay the packets for the multicast communication (that do not need to be transmitted to each of the terminals in real time), as shown in FIG. 49A. The packets are collectively referred to as a packet group #a.

As shown in changes from the state shown in FIG. 53A to the state shown in the state 53B, it is necessary to accurately transmit the packets to each of the terminals that joins the network partway through the retransmissions, in some cases. Normally, a communication mode is not discussed in which certain packets are transmitted to each of a plurality of terminals, and then retransmitted to each of the terminals. However, when apparatuses are controlled, for example, there is a possible case where the packets indicated by the control information are transmitted to the apparatuses. In this case, information on the control packets are not transmitted to each of the apparatuses, and these apparatuses are not controlled any more. It is necessary to introduce a transmission mode that is configured in view of such a case.

In FIG. 54, the base station, the repeaters and the terminals are in the state A shown in FIG. 53A at a time T1. In this case, the base station transmits the packet group #a that needs to be transmitted (relayed) a plurality of times, and each of the repeaters transmits the packet group #a.

Then, the base station, the repeaters and the terminals change to fall in the state B shown in FIG. 53B at a time T2. The repeater transmits the packet group #a for the second time at a time T3. In this case, the repeater does not transmit the packet group #a which is a new packet group received from the base station at the time T1. The repeater transmits the packet group #a according to setting that the packet group #a is to be transmitted a plurality of times. Thus, the packet group #a is transmitted to the terminal 5003 that newly joins the network shown in the state B in FIG. 53B at the time T2.

Note that FIG. 49A shows a frame structure in which the base station sets the number of relays and the relay/transmission interval. When such a setting is not made, the repeater transmits the packet group #a indefinitely. This setting is necessary to prevent such a situation.

Figure 55:
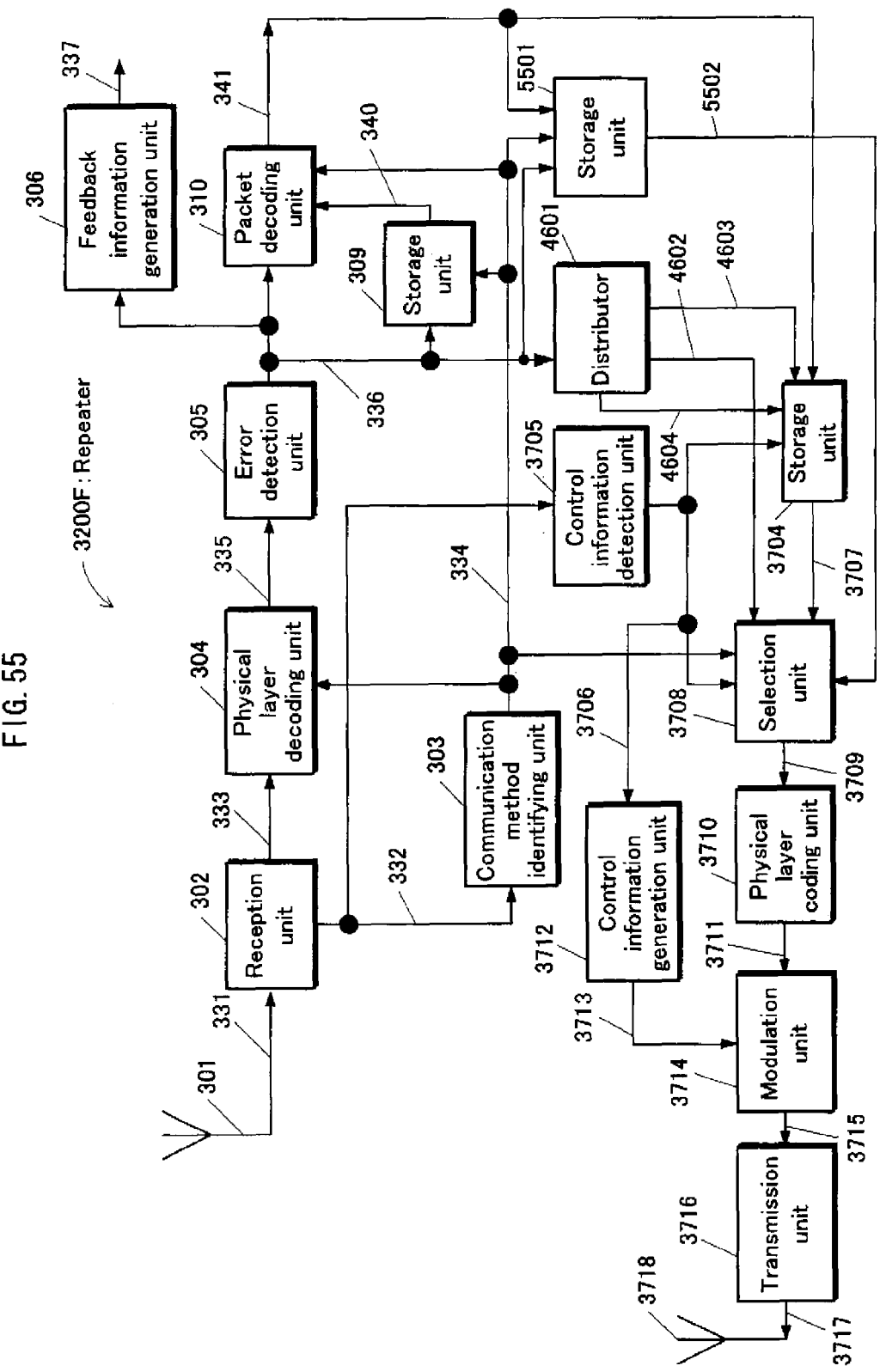
FIG. 55 is a structural diagram of the repeater of the fourteenth embodiment.

FIG. 55 is an example showing a structure of the repeater of the present embodiment. The same reference numerals are given to elements that operate in the same manner as the elements shown in FIG. 46.

A storage unit 5501 receives, as inputs, the result of the error detection, the packet data 336, the decoded packets 341 and the communication method information 334. When the communication method information 334 shown by a signal transmitted by the base station to the repeater indicates the transmission method of performing transmission a plurality of times, the storage unit 5501 stores therein the error detection results, the data 336 and the decoded packets 341. Then, the storage unit 5501 outputs packets 5502 a predetermined number of times, at the transmission interval, based on the information included in the communication (reception) method information 334. Here, the information relates to a transmission interval and the number of transmissions When the inputted packets 5502 need to be transmitted, the selection unit 3708 outputs the packets 3709 as the packets 5502.

Figure 56:
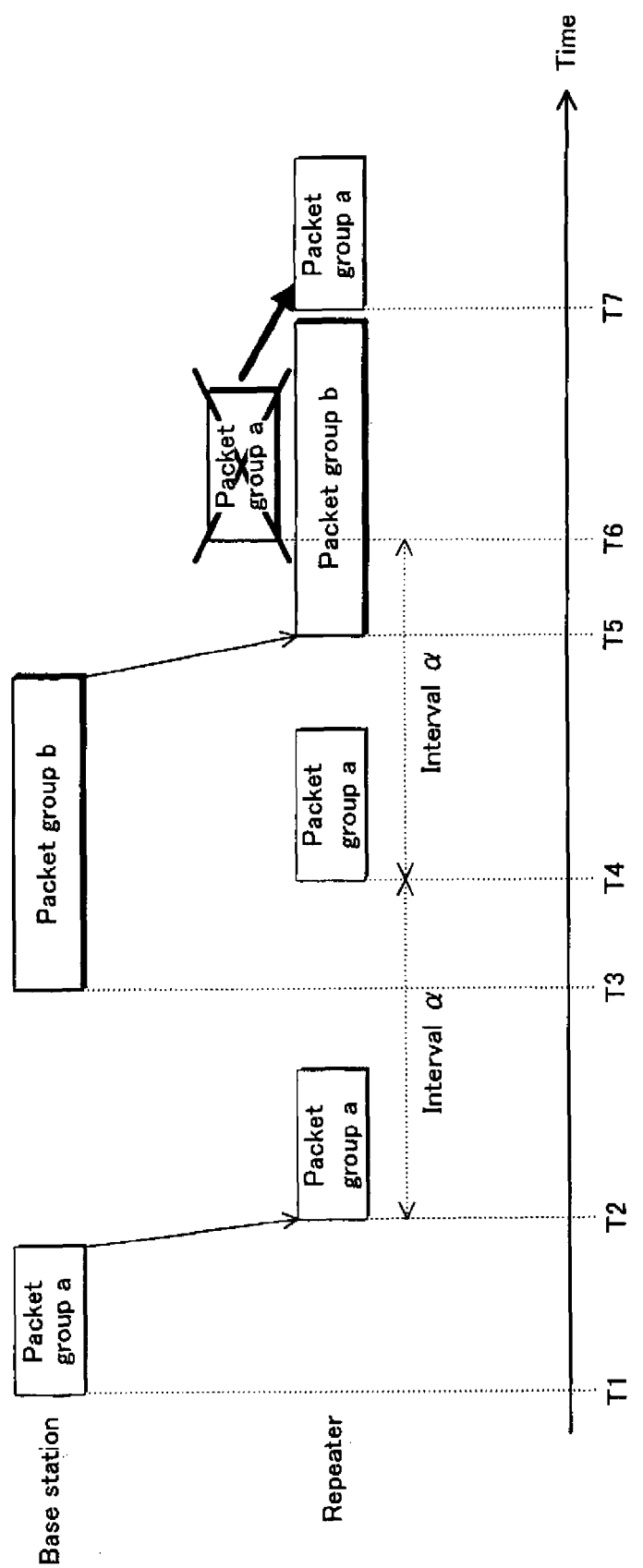
FIG. 56 is a conceptual diagram showing an example of timing at which the base station of the fourteenth embodiment transmits packets and timing at which the repeater of the fourteenth embodiment transmits the packets.

FIG. 56 shows an example of transmission timing of the transmission packets in each of the base station and the repeater. This example is different from the example shown in FIG. 54. Suppose that, in FIG. 56, a packet group #a is a packet group that needs to be transmitted by the repeater a plurality of times and a packet group #b is a packet group needs to be processed in real time (i.e. time of delay before these packets reach each of the terminals needs to be shortened). Also, a packet group a is transmitted a plurality of times at a time interval α.

At this time, a transmission time T6 (at which the packet group #a should be transmitted) is reached while the repeater is transmitting the packet group b (between time points T5 to T7). In such a case, however, the repeater prioritizes transmission of the packet group that needs to be processed in real time. The repeater does not permit interrupt of transmission of the packet group that needs to be transmitted a plurality of times (i.e. the packet group that does not have to be processed in real time). Therefore, an important role of the repeater is to prioritize the transmission of the packets that need to be processed in real time.

As described in the above, the repeater can accurately transmit the packets to each of the terminals that join the network partway through the retransmissions by transmitting (relaying) the packets transmitted by the base station a plurality of times.

Here, a description is given of the exemplary case where the base station transmits, to the repeater, the packets that have been coded at a packet level. However, the present invention is not necessarily limited to this case. Therefore, there may be a case where the repeater transmits the packets that have not been coded at a packet level. In this case, when the packet loss occurs, the repeater makes a retransmission request to the base station, and the base station retransmits the packets in accordance with the retransmission request.

Fifteenth Embodiment

The following describes a fifteenth embodiment of the present invention with reference to drawings. The fifteenth embodiment describes another method (that is different from the method described in the fourteenth embodiment) as to how the repeater transmits the same packets a plurality of times.

Figure 57:
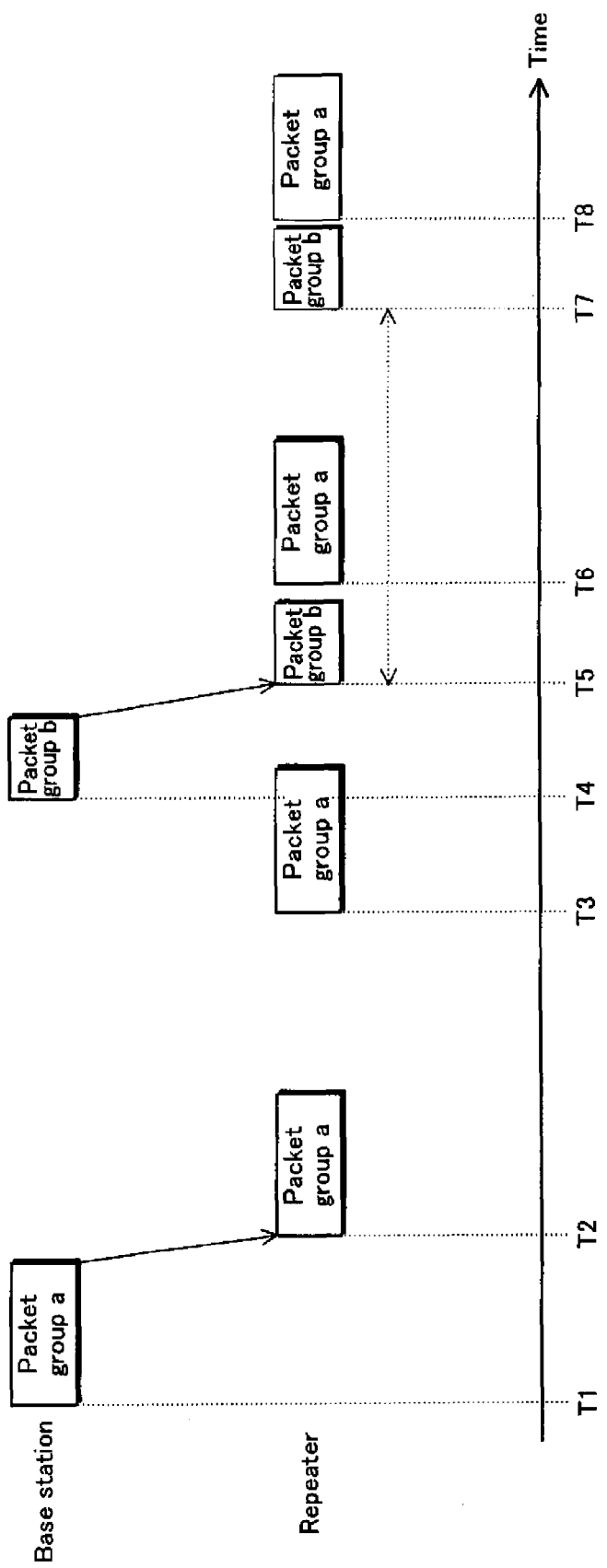
FIG. 57 is a conceptual diagram showing an example of timing at which the base station of the fourteenth embodiment transmits packets a plurality of times and an example of timing at which the repeater of the fourteenth embodiment transmits the packets a plurality of times.

FIG. 57 shows the transmission (relay) method described in the fourteenth embodiment. Suppose that both the packet group #a and the packet group #b are transmitted by the base station, and both of these packet groups are packet groups to be transmitted by the repeater a plurality of times. FIG. 57 shows the above-stated state. After the base station transmits the packet group #a (time T1), the repeater transmits the packet group #a a plurality of times (e.g. time T2 and time T3). Similarly, after the base station transmits the packet group #b, the repeater transmits the packet group #b a plurality of times (e.g. time points T5 and T7).

Figure 58:
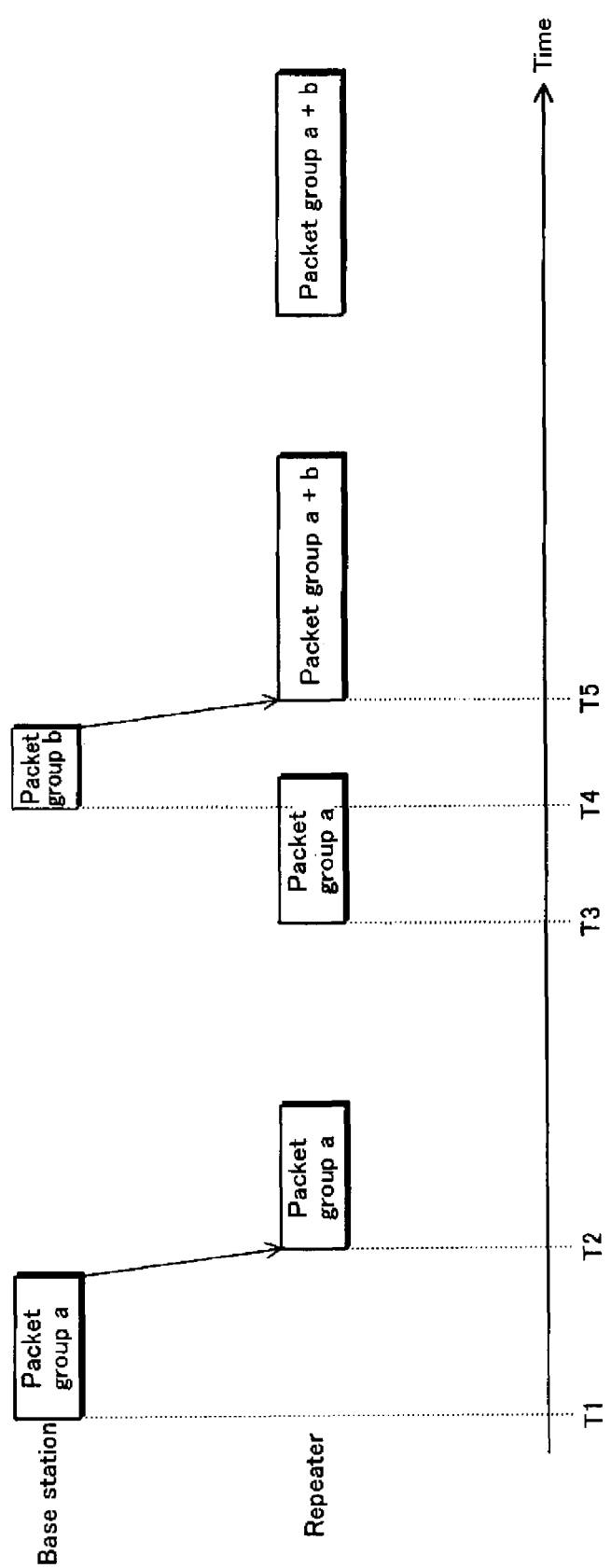
FIG. 58 is a conceptual diagram showing an example of timing at which the base station of a fifteenth embodiment transmits packets and timing at which the repeater of the fifteenth embodiment transmits the packets.

FIG. 58 shows a transmission (relay) method that is different from FIG. 57. Both the packet groups #a and #b are transmitted by the base station (at time T1 and time T4), and both of these packet groups are packet groups to be transmitted by the repeater a plurality of times. FIG. 58 is different from FIG. 57 in that the groups #a and #b are coded at a packet level and a packet group #a+b is transmitted, at a time point (time T5) at which both the packet groups #a and #b are to be transmitted, in FIG. 58. The following describes a method for manufacturing the packet group #a+b, with use of FIG. 59.

Figure 59:
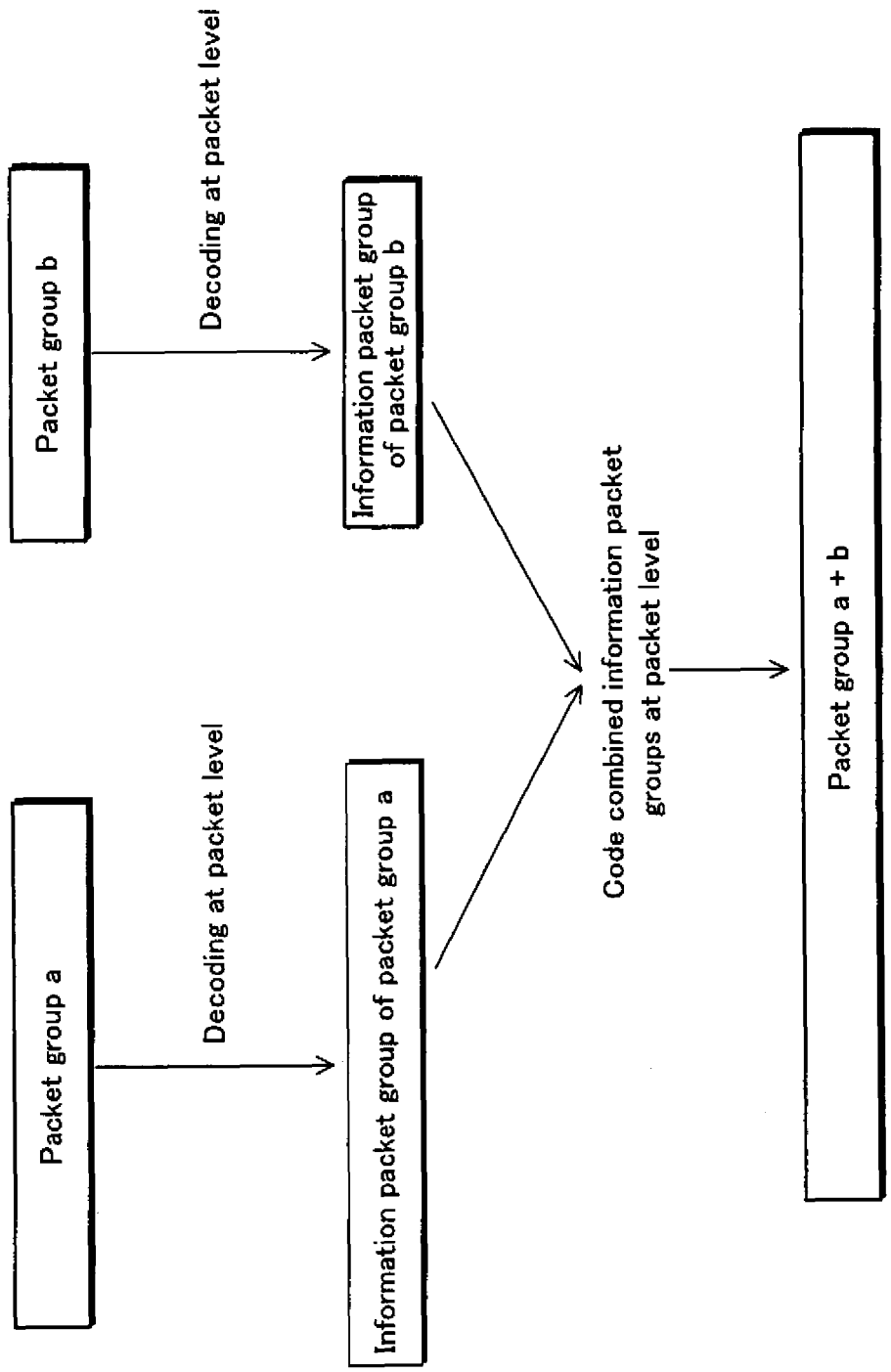
FIG. 59 shows a method of generating a packet group a+b shown in FIG. 58.

FIG. 59 shows a method of generating the packet group #a+b as described in the above. As described in the above, both the packet groups #a and #b need to be transmitted by the repeater a plurality of times.

The repeater receives the packet group #a that has been coded at a packet level and transmitted by the base station. At this time, the repeater has not received the packet group #b. Therefore, the repeater transmits the packet #a at first (at the time T2 in FIG. 58). Then, the repeater receives the packet group #b that has been coded at a packet level and transmitted by the base station. In that case, the repeater extracts an information packet group (hereinafter, referred to as an information packet group of the packet group #a) from the packet group #a, as shown in FIG. 59. Here, the information packet group is included in the packet #a obtained by the decoding at a packet level. Similarly, the repeater extracts an information packet group (hereinafter, referred to as an information packet group of the packet group #b) from the packet group #b. Here, the information packet group is included in the packet group #b obtained by the decoding at a packet level.

Then, the repeater codes the information packet group of the packet #a and the information packet group of the group #b at a packet level to generate the packet group a+b. Note that it is natural that the codes used for the coding may be systematic codes or non-systematic codes as described in the above so far. In the subsequent processing, the repeater transmits the packet group #a+b to each of the terminals. Note that when the repeater receives another new packet group #c from the base station, the repeater generates a packet group #a+b+c obtained by coding an information packet group at a packet level. The information packet group is obtained by combining the information packet groups #a, #b and #c.

When the packet groups #a and #b are short packets, padding bits are inserted into each of the packet groups #a and #b or control information pieces (or packets for controlling) are provided to each of the packet groups #a and #b in addition to the information packets, so as to support short packets. When the packet groups #a and #b are combined such that #a+b, there is a merit that these additional information pieces can be reduced. Thus, the information transfer efficiency can be improved. Also, when the size of the block codes are increased with use of the block codes as the error correction codes for coding that are used for generating the packet group #a+b, the error correction performance is improved. Therefore, there is a merit that the data reception quality in each of the terminals is improved.

Here, a description is given of the exemplary case where the base station transmits, to the repeater, the packets that have been coded at a packet level. However, the present invention is not necessarily limited to this case. Therefore, there may be a case where the repeater transmits the packets that have not been coded, and then the repeater generates the packet group a+b. In this case, when the packet loss occurs, the repeater makes a retransmission request to the base station, and the base station retransmits the packets in accordance with the retransmission request.

As described in the above, the repeater can accurately transmit the packets to each of the terminals that join the network partway, by transmitting (relaying) the packets (transmitted by the base station) a plurality of times at a packet level. Also, the repeater codes altogether the packets (that need to be transmitted a plurality of times) a plurality of times. This makes it possible to obtain merits that the data transfer efficiency and the data reception quality can be improved.

It is natural that although the present embodiment is effective when used alone, the repeater may switch between the method described in the present embodiment and the other transmission (relay) methods. The other transmission (relay) methods are as described in the other embodiments except for the present embodiment.

Supplementary Remarks

The present invention is not limited to the above embodiments, and may be implemented in any forms as long as the object/aims of the present invention, as well as other relevant and accompanying objects/aims, can be achieved. The following cases are also possible, for example.

(1) Although the above-described exemplary embodiments are mainly realized by the coding apparatus and the transmitter, the present invention is not limited to this. Therefore, the present invention may be applied to a power line communication apparatus, for example.

(2) The following is possible. Procedures of the operations in the transmitter described in each of the above embodiments are written in a program. This program is pre-stored in a ROM (Read Only Memory). A CPU (Central Processing Unit) reads and executes the program stored in the ROM. Also, the following is possible. The program in which the procedures of the operations of each of the transmitters are written is stored on a computer readable storage medium. The program stored on the computer readable storage medium is stored in a RAM (Random Access Memory). The CPU of the computer reads and executes the program stored in the RAM.

(3) The elements described in each of the above-described embodiments may be realized as an LSI (Large Scale Integration) which is typically an integrated circuit. These elements may be constituted as separate chips, or all or a portion thereof may be constituted as a single chip.

Note that an integrated circuit generated as described above may also be referred to as an IC (Integrated Circuit), a system LSI, a super LSI, or an ultra LSI, depending on the degree of integration.

The integration is also not limited to LSI implementation, but instead may be realized by a dedicated circuit or a general-purpose process. A FPGA (Field Programmable Gate Array) that can be reprogrammed after LSI manufacture, or a reconfigurable processor in which the connection and settings of circuit cells in the LSI can be restructured after LSI manufacture can also be used.

Furthermore, if integration technology is developed that replaces LSIs due to progressive or derivative semiconductor technology, integration of functional blocks using this technology is naturally possible. For example, the application of biotechnology is a possibility.

(4) It is needless to say that the present invention is not limited to a wireless communication, and is effective for PLC (Power Line Communication), visible light communication and optical communication.

(5) It is needless to say that the frame structures described in the above sixth to eighth embodiments can be applied to the first to fifth embodiments by making appropriate changes.

(6) The above embodiments are described with use of terms (physical layer and application layer). However, these terms are merely definitions and may be referred to as other names.

(7) The error correction codes at the physical layer are generally referred to as "FEC (Forward Error Correction) scheme".

(8) In the above twelfth to fifteenth embodiments, the repeater relays, to each of the terminals, the packets received from the base station. However, the repeater may relay the packets to another repeater other than the terminals.

INDUSTRIAL APPLICABILITY

The present invention is effective in generating retransmission packets with use of LDPC Codes (Low Density Parity Check Codes), for example.

REFERENCE SIGNS LIST 100 transmitter
102 packet data coding unit
103 physical layer error correction coding unit
104 transmission method determination unit
151 interleaving unit
152 coding unit (parity packet generation unit)
153 error detection code insertion unit
154 storage unit
155 error detection code insertion unit
156 selection unit
300 receiver
304 physical layer decoding unit
305 error detection unit
306 feedback information generation unit
309 storage unit
310 packet decoding unit
3200, 3200A to 3200E repeater
3401, 3501 processing unit
3701 packet separation unit
3704 storage unit
3705 control information detection unit
3708 selection unit
3710 physical layer coding unit
3712 control information generation unit
3714 modulation unit
3716 transmission unit
3901 coding unit
4601 distributer
5201 control information detection unit
5203 relay method determination unit
5205 packet generation unit

What is claimed is:

1. A transmission method executed by a transmitting apparatus to transmit a content to a plurality of terminals, wherein
the content has transmission count information indicating a number of times the content is to be transmitted by the transmitting apparatus,
the transmission method comprising:
a first transmission step of generating and transmitting a first transmission signal which transfers at least a first portion of a plurality of data packets including a plurality of content packets, storing data of the content therein, and a plurality of parity packets, generated from the content packets, and
a second transmission step of, when the transmission count information of the content indicates a plurality of times, generating a second transmission signal including at least a second portion of the plurality of data packets, and transmitting the second transmission signal during a period which differs from a period during which the first transmission signal is transmitted.

2. A reception method for receiving a content which are transmitted to a plurality of terminals by a transmitting apparatus, wherein
the content has transmission count information indicating a number of times the content is to be transmitted by the transmitting apparatus,
the reception method comprising:
a reception step of, when the transmission count information of the content indicates a plurality of times, receiving at least one of a first transmission signal and a second transmission signal which are transmitted by the transmitting apparatus during different periods, the first transmission signal transferring at least a first portion of a plurality of data packets including a plurality of content packets, storing data of the content therein, and a plurality of parity packets, generated from the content packets, and the second transmission signal transferring at least a second portion of the plurality of data packets, and
a retransmission request step of judging whether the content packets are restorable by performing error correction processing using data packets which are received without error from the at least one of the first transmission signal and the second transmission signal, and when judging that the content packets are not restorable, identifying data packets which are required in order to restore the content packets and requesting retransmission of the data packets which are identified.

3. A transmitting apparatus for transmitting a content to a plurality of terminals, wherein
the content has transmission count information indicating a number of times the content is to be transmitted by the transmitting apparatus,
the transmitting apparatus comprising,
a transmitting unit configured to:
generate and transmit a first transmission signal which transfers at least a first portion of a plurality of data packets including a plurality of content packets, storing data of the content therein, and a plurality of parity packets, generated from the content packets, and
generate a second transmission signal including at least a second portion of the plurality of data packets when the transmission count information of the content indicates a plurality of times, and transmit the second transmission signal during a period which differs from a period during which the first transmission signal is transmitted.

4. A reception apparatus for receiving a content which are transmitted to a plurality of terminals by a transmitting apparatus, wherein
the content has transmission count information indicating a number of times the content is to be transmitted by the transmitting apparatus,
the reception apparatus comprising:
a reception unit configured to, when the transmission count information of the content indicates a plurality of times, receive at least one of a first transmission signal and a second transmission which are transmitted by the transmitting apparatus during different periods, the first transmission signal transferring at least a first portion of a plurality of data packets including a plurality of content packets, storing data of the content therein, and a plurality of parity packets, generated from the content packets, and the second transmission signal transferring at least a second portion of the plurality of data packets, and
a retransmission unit configured to judge whether the content packets are restorable by performing error correction processing using data packets which are received without error from the at least one of the first transmission signal and the second transmission signal, and when judging that the content packets are not restorable, identify data packets which are required in order to restore the content packets and request retransmission of the data packets which are identified.

* * * * *